US009136541B2

(12) United States Patent
Lee et al.

(10) Patent No.: US 9,136,541 B2
(45) Date of Patent: Sep. 15, 2015

(54) PROCESS FOR PRODUCING FUEL CELL ELECTRODE CATALYST, PROCESS FOR PRODUCING TRANSITION METAL OXYCARBONITRIDE, FUEL CELL ELECTRODE CATALYST AND USES THEREOF

(75) Inventors: Kunchan Lee, Chiba (JP); Ryoko Konta, Chiba (JP); Masaki Horikita, Chiba (JP); Chunfu Yu, Chiba (JP); Yasuaki Wakizaka, Chiba (JP); Kenichiro Ota, Koganei (JP); Ryuji Monden, Chiba (JP); Kazunori Ichioka, Chiba (JP); Takashi Sato, Chiba (JP); Takuya Imai, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 133 days.

(21) Appl. No.: 13/577,843

(22) PCT Filed: Feb. 9, 2011

(86) PCT No.: PCT/JP2011/052689
§ 371 (c)(1),
(2), (4) Date: Aug. 8, 2012

(87) PCT Pub. No.: WO2011/099493
PCT Pub. Date: Aug. 18, 2011

(65) Prior Publication Data
US 2012/0315568 A1   Dec. 13, 2012

(30) Foreign Application Priority Data

Feb. 10, 2010  (JP) .................................. 2010-028025
Nov. 10, 2010  (JP) .................................. 2010-251890
Jan. 14, 2011  (JP) .................................. 2011-006192

(51) Int. Cl.
*H01M 4/04*  (2006.01)
*H01M 4/90*  (2006.01)
(Continued)

(52) U.S. Cl.
CPC .......... *H01M 4/9016* (2013.01); *C01B 21/0828* (2013.01); *H01M 4/8896* (2013.01);
(Continued)

(58) Field of Classification Search
USPC .......... 502/101; 429/209, 221, 223, 224, 523, 429/527, 528

IPC ... H01M 4/04,4/047, 4/139, 4/90, 4/9008; B01J 21/063, 21/066, 23/74, 23/745, 23/75, 23/755, B01J 23/8474, 23/8476, 37/00, 37/08, 37/086, B01J 37/088, 37/18

See application file for complete search history.

(56) References Cited

U.S. PATENT DOCUMENTS

| 7,585,585 B2 | 9/2009 | Ozaki et al. |
| 7,906,452 B2 * | 3/2011 | Behl et al. .................... 502/185 |

(Continued)

FOREIGN PATENT DOCUMENTS

| CN | 101224421 A | 7/2008 |
| EP | 0 674 019 A1 | 9/1995 |

(Continued)

OTHER PUBLICATIONS

Yang, et al., "Simple and Effective Preparation of N-doped $TiO_2$ Nanocrystallites with Visible-light Activities", Journal of Inorganic Materials (Chinese) vol. 20, No. 4, pp. 785-788, 2005.

(Continued)

*Primary Examiner* — Patricia L Hailey
(74) *Attorney, Agent, or Firm* — Sughrue Mion, PLLC

(57) ABSTRACT

Provided is a process for producing a fuel cell electrode catalyst having high catalytic activity which uses a transition metal, e.g., titanium, which process comprises thermal treatment at relatively low temperature, i.e., not including thermal treatment at high temperature (calcining) step. The process for producing a fuel cell electrode catalyst comprises a step (1) of mixing at least a transition metal-containing compound, a nitrogen-containing organic compound and a solvent to provide a catalyst precursor solution; a step (2) of removing the solvent from the catalyst precursor solution; and a step (3) of thermally treating a solid residue obtained in the step (2) at a temperature of 500 to 1100° C. to provide an electrode catalyst; wherein the transition metal-containing compound is partly or wholly a compound comprising at least one transition metal element (M1) selected from the group 4 and 5 elements of the periodic table as a transition metal element.

10 Claims, 30 Drawing Sheets

(51) Int. Cl.
*B01J 23/74* (2006.01)
*B01J 23/75* (2006.01)
*B01J 37/00* (2006.01)
*B01J 37/08* (2006.01)
*B01J 37/18* (2006.01)
*C01B 21/082* (2006.01)
*H01M 4/88* (2006.01)
*H01M 8/10* (2006.01)

(52) U.S. Cl.
CPC ......... *H01M8/1004* (2013.01); *C01P 2002/72* (2013.01); *C01P 2006/40* (2013.01); *Y02E 60/521* (2013.01)

(56) References Cited

U.S. PATENT DOCUMENTS

| | | | |
|---|---|---|---|
| 8,519,131 B2* | 8/2013 | Matsunaga et al. | 546/10 |
| 2004/0058808 A1 | 3/2004 | Lu et al. | |
| 2004/0096728 A1 | 5/2004 | Campbell | |
| 2010/0086823 A1 | 4/2010 | Koshino et al. | |
| 2010/0129698 A1 | 5/2010 | Okada et al. | |
| 2010/0227253 A1 | 9/2010 | Monden et al. | |
| 2010/0255404 A1 | 10/2010 | Kurozumi et al. | |
| 2010/0331172 A1 | 12/2010 | Monden et al. | |
| 2011/0008709 A1 | 1/2011 | Shishikura et al. | |
| 2011/0015058 A1 | 1/2011 | Maki | |
| 2011/0020729 A1 | 1/2011 | Monden et al. | |
| 2013/0288154 A1* | 10/2013 | Monden et al. | 429/482 |
| 2014/0120454 A1* | 5/2014 | Takahashi et al. | 429/482 |
| 2014/0178790 A1* | 6/2014 | Ichioka et al. | 429/480 |

FOREIGN PATENT DOCUMENTS

| | | |
|---|---|---|
| JP | 7-252664 A | 10/1995 |
| JP | 2002-321907 A | 11/2002 |
| JP | 2004-303664 A | 10/2004 |
| JP | 2005-19332 A | 1/2005 |
| JP | 2005-347216 A | 12/2005 |
| JP | 2008-258150 A | 10/2008 |
| JP | 2009-023887 A | 2/2009 |
| JP | 2009-255053 A | 11/2009 |
| WO | 2007/072665 A1 | 6/2007 |
| WO | 2008/111570 A1 | 9/2008 |
| WO | 2009/028408 A1 | 3/2009 |
| WO | 2009/031383 A1 | 3/2009 |
| WO | 2009/104500 A1 | 8/2009 |
| WO | 2009/107518 A1 | 9/2009 |
| WO | 2009/119523 A1 | 10/2009 |

OTHER PUBLICATIONS

Yin, Fengxiang, et al. "Improved catalytic performance of nitrided Co-Ti and Fe-Ti catalysts for oxygen reduction as non-noble metal cathodes in acidic media" Electrochemistry Communications vol. 12, Issue (2010), pp. 1177-1179.
Chinese Office Action issued in 201180008291.3 dated May 5, 2014.
International Search Report of PCT/JP2011/052689 dated May 31, 2011.
Japanese Office Action issued in application No. 2012-553549 dated May 12, 2015.
European Search Report issued in application No. 11742236 dated Jun. 30, 2015.

\* cited by examiner

[Fig. 59]
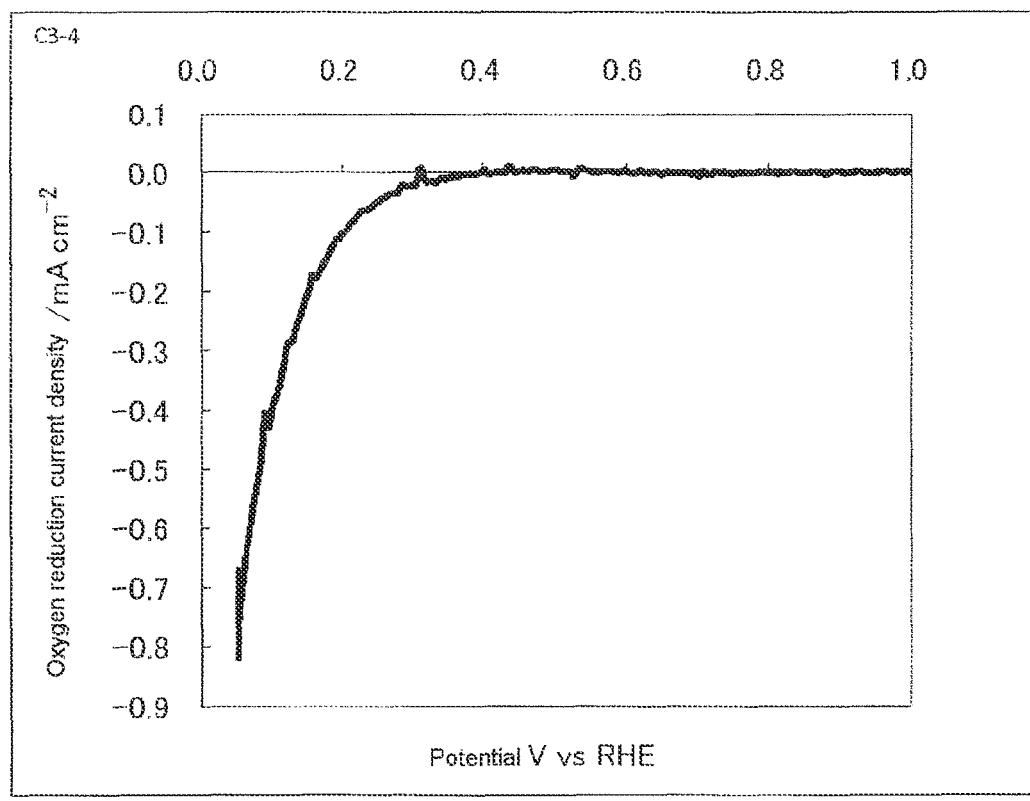
[Fig. 60]
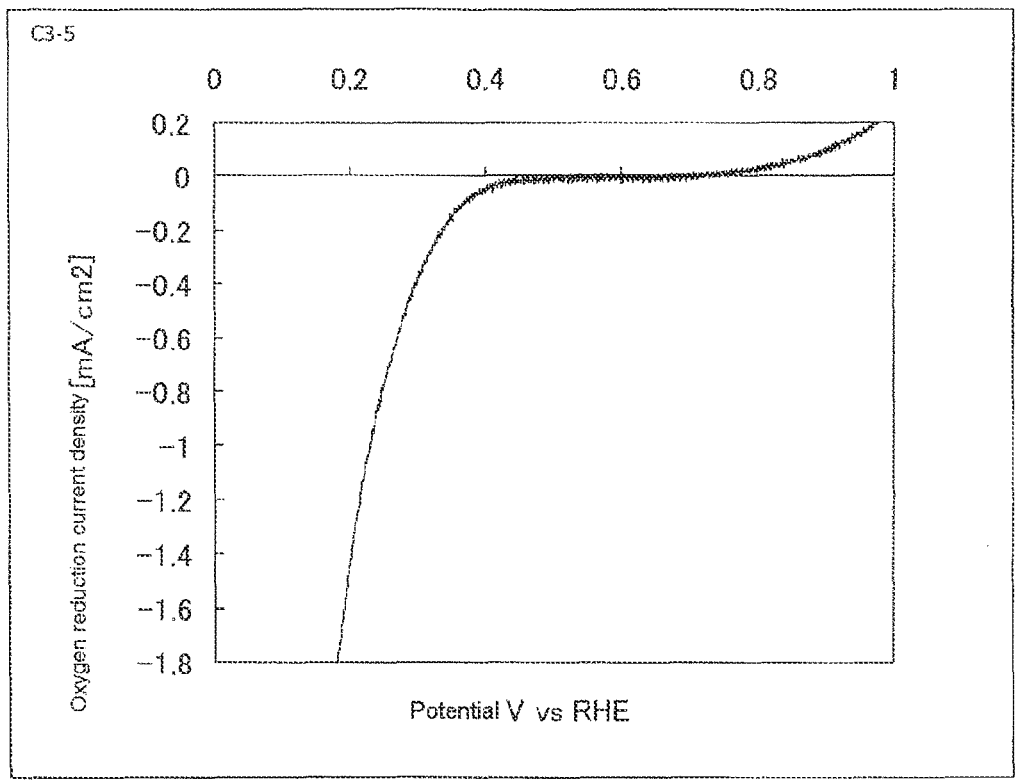

PROCESS FOR PRODUCING FUEL CELL ELECTRODE CATALYST, PROCESS FOR PRODUCING TRANSITION METAL OXYCARBONITRIDE, FUEL CELL ELECTRODE CATALYST AND USES THEREOF

CROSS REFERENCE TO RELATED APPLICATIONS

This application is a National Stage of International Application No. PCT/JP2011/052689 filed Feb. 9, 2011, claiming priority based on Japanese Patent Application Nos. 2010-028025 filed Feb. 10, 2010, JP 2010-251890 filed Nov. 10, 2010 and JP 2011-006192 filed Jan. 14, 2011, the contents of all of which are incorporated herein by reference in their entirety.

TECHNICAL FIELD

The present invention relates to a process for producing a fuel cell electrode catalyst; a process for producing a transition metal oxycarbonitride; and a fuel cell electrode catalyst; and uses thereof.

BACKGROUND ART

A polymer electrolyte fuel cell has a solid polymer electrolyte sandwiched between an anode and a cathode. A fuel is fed to the anode, and oxygen or air is fed to the cathode, whereby oxygen is reduced at the cathode to produce electricity. The fuel is primarily hydrogen, methanol or the like.

To increase the reaction rate in the fuel cell and enhance the energy conversion efficiency of the fuel cell, a layer containing a catalyst (hereinafter, also referred to as a "fuel cell catalyst layer") is conventionally provided on the surface of a cathode (an air electrode) or an anode (a fuel electrode) of the fuel cell.

As such a catalyst, noble metals are generally used. Of them, noble metals which are stable at high potential and have high catalytic activity, such as platinum or palladium, have been primarily used. However, since these noble metals are expensive and limited in resource amount, alternative catalysts have been desired.

Further, the noble metals used on the cathode surface are sometimes dissolved in an acidic atmosphere and are not suited in applications requiring long-term durability. Accordingly, it has been strongly demanded that catalysts are developed which are not corroded in an acidic atmosphere and have excellent durability and high oxygen reducing activity.

As a catalyst alternative to noble metals, those entirely free of noble metals, such as base metal carbides, base metal oxides, base metal oxycarbonitrides, chalcogen compounds and carbon catalysts, have been reported (for example, see Patent Literature 1 to Patent Literature 4). These materials are inexpensive and exist abundantly as compared with noble metal materials such as platinum.

However, catalysts containing base metal materials described in Patent Literature 1 and Patent Literature 2 have a problem in terms of their failure to provide oxygen reducing activity that is sufficient on a practical basis.

Catalysts described in Patent Literature 3 and Patent Literature 4, although showing high oxygen reducing catalytic activity, have a problem in terms of their extremely low stability under fuel cell operation conditions.

As a catalyst alternative to noble metals, Nb oxycarbonitrides and Ti oxycarbonitrides disclosed in Patent Literature 5 and Patent Literature 6 efficiently show the above performance and thus have been attracting particular attention.

Although the catalysts described in Patent Literature 5 and Patent Literature 6 have extremely high performance as compared with conventional catalysts alternative to noble metals, the production process thereof needs to include heating treatment under a high temperature of from 1600 to 1800° C. (for example, Example 1 of Patent Literature 5 or Example 1 of Patent Literature 6).

Performing such high-temperature heating treatment is not impossible on an industrial basis, but involves difficulty and invites increase in equipment cost and difficulty in operation control, leading to the increase in the production cost. Thus, the development of a process that achieves production at a lower cost has been desired.

Patent Literature 7 reports a technique relating to the production of a carbon-containing titanium oxynitride that contains carbon, nitrogen and oxygen.

However, according to the production process described in Patent Literature 7, the production of the carbon-containing titanium oxynitride requires two-stage synthesis: the preparation of a titanium oxynitride by reacting a nitrogen-containing organic compound with a titanium precursor, and the preparation of a carbon-containing titanium oxynitride by reacting a phenol resin with the titanium oxynitride precursor, and thus involves complicated steps. In particular, the preparation of the titanium oxynitride precursor requires complicated steps including stirring, heating and refluxing at 80° C. as well as cooling and concentrating under reduced pressure, thus resulting in high cost.

In addition, since the phenol resin is a thermosetting resin having a three-dimensional network structure, it is difficult to homogenously mix and react the phenol resin with a metal oxide. In particular, since the thermal decomposition temperature of the phenol resin ranges from 400 to 900° C., at a temperature of not higher than 1000° C., the carbonization reaction is unlikely to take place due to the complete decomposition of the phenol resin.

Patent Literature 7 and Non-Patent Literature 1 only describe applications to a thin film for a solar energy collector and a photocatalyst, failing to disclose or study a process for producing a metal oxycarbonitride having particulate or fibrous shape that is highly useful as an electrode catalyst and an application thereof.

Patent Literature 8 discloses a process for producing electrode catalyst characterized by calcining a mixed material of an oxide and a carbon material precursor. The production process, however, cannot provide an electrode catalyst having sufficient catalytic performance.

Patent Literature 9 discloses a fuel cell electrode catalyst obtained by using a polynuclear complex such as cobalt. This catalyst, however, has problems in terms of highly toxicity of the raw material, high cost and insufficient catalytic activity.

Non-Patent Literature 2 discloses a process for producing electrode catalyst characterized by calcining a mixed material of a titanium alkoxide and a carbon material precursor. The production process, however, does not use a nitrogen-containing organic substance and thus cannot provide an electrode catalyst having sufficient catalytic performance.

CITATION LIST

Patent Literatures

[Patent Literature 1] JP-A-2004-303664
[Patent Literature 2] WO07/072665
[Patent Literature 3] US-A-2004/0096728

[Patent Literature 4] JP-A-2005-19332
[Patent Literature 5] WO2009/031383
[Patent Literature 6] WO2009/107518
[Patent Literature 7] JP-A-2009-23887
[Patent Literature 8] JP-A-2009-255053
[Patent Literature 9] JP-A-2008-258150

Non-Patent Literatures

[Non-Patent Literature 1] Journal of Inorganic Materials (Chinese) 20, 4, P785
[Non-Patent Literature 2] Electrochemistry Communications Volume 12, Issue 9, September 2010, Pages 1177-1179

SUMMARY OF INVENTION

Technical Field

The present invention seeks to overcome such problems as seen in conventional techniques.

It is an object of the present invention to provide a process for producing a fuel cell electrode catalyst having high catalytic activity which uses a transition metal, e.g., titanium, which process comprises thermal treatment at relatively low temperature, i.e., the process does not include thermal treatment at high temperature (calcining) step.

It is another object of the present invention to provide a process for producing a transition metal oxycarbonitride that can provide a transition metal oxycarbonitride having high catalytic activity at low cost.

Solution to Problem

The present invention relates to, for example, the following (1) to (25).

(1) A process for producing a fuel cell electrode catalyst comprising:
a step (1) of mixing at least a transition metal-containing compound, a nitrogen-containing organic compound and a solvent to provide a catalyst precursor solution,
a step (2) of removing the solvent from the catalyst precursor solution, and
a step (3) of thermally treating a solid residue obtained in the step (2) at a temperature of 500 to 1100° C. to provide an electrode catalyst,
wherein the transition metal-containing compound is partly or wholly a compound comprising at least one transition metal element (M1) selected from the group 4 and 5 elements of the periodic table as a transition metal element.

(2) The process for producing a fuel cell electrode catalyst as described in the above (1), wherein the transition metal element (M1) is at least one element selected from titanium, zirconium, niobium and tantalum.

(3) The process for producing a fuel cell electrode catalyst as described in the above (1) or (2), wherein in the step (1), a solution of the transition metal-containing compound is mixed with the nitrogen-containing organic compound.

(4) The process for producing a fuel cell electrode catalyst as described in anyone of the above (1) to (3), wherein the nitrogen-containing organic compound is a compound capable of forming a chelate together with a transition metal in the transition metal-containing compound.

(5) The process for producing a fuel cell electrode catalyst as described in in any one of the above (1) to (4), wherein in the step (1), a precipitation suppressant comprising a compound having a diketone structure is further mixed.

(6) The process for producing a fuel cell electrode catalyst as described in the above (5), wherein in the step (1), a solution of the transition metal-containing compound is mixed with the precipitation suppressant, and then the resultant solution is mixed with the nitrogen-containing organic compound.

(7) The process for producing a fuel cell electrode catalyst as described in any one of the above (1) to (6), wherein the transition metal-containing compound is partly a compound comprising at least one transition metal element (M2) selected from iron, nickel, chromium, cobalt, vanadium and manganese as a transition metal element.

(8) The process for producing a fuel cell electrode catalyst as described in any one of the above (1) to (7), wherein the transition metal-containing compound is at least one compound selected from the group consisting of a metal nitrate, a metal organic acid salt, a metal oxychloride, a metal alkoxide, a metal halide, a metal perchlorate and a metal hypochlorite.

(9) The process for producing a fuel cell electrode catalyst as described in any one of the above (1) to (8), wherein the nitrogen-containing organic compound has, in the molecule, at least one kind selected from amino group, nitrile group, imide group, imine group, nitro group, amide group, azide group, aziridine group, azo group, isocyanate group, isothiocyanate group, oxyme group, diazo group, nitroso group, pyrrole ring, porphyrin ring, imidazole ring, pyridine ring, pyrimidine ring and pyrazine ring.

(10) The process for producing a fuel cell electrode catalyst as described in any one of the above (1) to (9), wherein the nitrogen-containing organic compound has, in the molecule, at least one group selected from hydroxyl group, carboxyl group, aldehyde group, oxyhalide group, sulfo group, phosphoric acid group, ketone group, ether group and ester group.

(11) The process for producing a fuel cell electrode catalyst as described in any one of the above (1) to (10), wherein in the step (3), the solid residue is thermally treated in an atmosphere containing 0.01% by volume to 10% by volume of a hydrogen gas.

(12) The process for producing a fuel cell electrode catalyst as described in any one of the above (1) to (11), wherein the step (3) is a step in which the solid residue obtained in the step (2) is thermally treated at a temperature of 500 to 1100° C. and the resultant thermally-treated product is disintegrated to provide an electrode catalyst.

(13) A fuel cell electrode catalyst obtained by the process for producing a fuel cell electrode catalyst as described in any one of the above (1) to (12), wherein the proportions of the number of atoms of the transition metal element, carbon, nitrogen and oxygen that constitute the catalyst (the transition metal element: carbon: nitrogen: oxygen) satisfy 1:x:y:z wherein $0<x\leq 7$, $0<y\leq 2$ and $0<z\leq 3$.

(14) A fuel cell electrode catalyst obtained by the process for producing a fuel cell electrode catalyst as described in the above (7), wherein the proportions of the number of atoms of the transition metal element (M1), the transition metal element (M2), carbon, nitrogen and oxygen that constitute the catalyst (the transition metal element (M1): the transition metal element (M2): carbon: nitrogen: oxygen) satisfy $(1-a)$:a:x:y:z wherein $0<a\leq 0.5$, $0<x\leq 7$, $0<y\leq 2$ and $0<z\leq 3$.

(15) A process for producing a transition metal oxycarbonitride comprising thermally treating a mixture of a nitrogen-containing organic compound and a transition metal compound containing oxygen in the molecule at a temperature of 500 to 1000° C.

(16) A transition metal oxycarbonitride obtained by the process for producing a transition metal oxycarbonitride as described in the above (15), wherein the compositional formula of the transition metal oxycarbonitride is represented by $mC_xN_yO_z$, wherein "m" is a transition metal element; "x", "y" and "z" are each a proportion of the number of atoms; and $0<x\leq3$, $0<y\leq2$ and $0<z\leq3$.

(17) A fuel cell electrode catalyst comprising the transition metal oxycarbonitride as described in the above (16).

(18) The fuel cell electrode catalyst as described in the above (13), (14) or (17), which has a specific surface area as calculated by BET method of 30 to 350 m²/g.

(19) A fuel cell catalyst layer comprising the fuel cell electrode catalyst as described in the above (13), (14), (17) or (18).

(20) The fuel cell catalyst layer as described in the above (19), further comprising electron conductive particles.

(21) An electrode comprising the fuel cell catalyst layer as described in the above (20) and a porous support layer.

(22) A membrane electrode assembly comprising a cathode, an anode and an electrolyte membrane interposed between the cathode and the anode, wherein the cathode and/or the anode is the electrode as described in the above (21).

(23) A fuel cell comprising the membrane electrode assembly as described in (22).

(24) The fuel cell as described in the above (23), which is a polymer electrolyte fuel cell.

(25) An article equipped with a function selected from the group consisting of electricity generating function, light emitting function, heat generating function, acoustic generating function, movement function, display function and charging function, which article comprises the fuel cell as described in the above (23) or (24).

Advantageous Effect of Invention

According to the process for producing a fuel cell electrode catalyst of the present invention, a fuel cell electrode catalyst having high catalytic activity which uses a transition metal, e.g., titanium, can be produced through thermal treatment at relatively low temperature, i.e., without performing thermal treatment at high temperature (calcining) step.

According to the process for producing a transition metal oxycarbonitride of the present invention, a transition metal oxycarbonitride can be produced at lower temperature as compared with conventional techniques, and thus production cost can be reduced and production process safety can be increased.

BRIEF DESCRIPTION OF THE DRAWINGS

FIG. 59 shows an oxygen reduction current density potential curve evaluating the oxygen reducing activity of a fuel cell electrode of Comparative Example 3-4.

FIG. 60 shows an oxygen reduction current density potential curve evaluating the oxygen reducing activity of a fuel cell electrode of Comparative Example 3-5.

DESCRIPTION OF EMBODIMENTS

Figure 1:
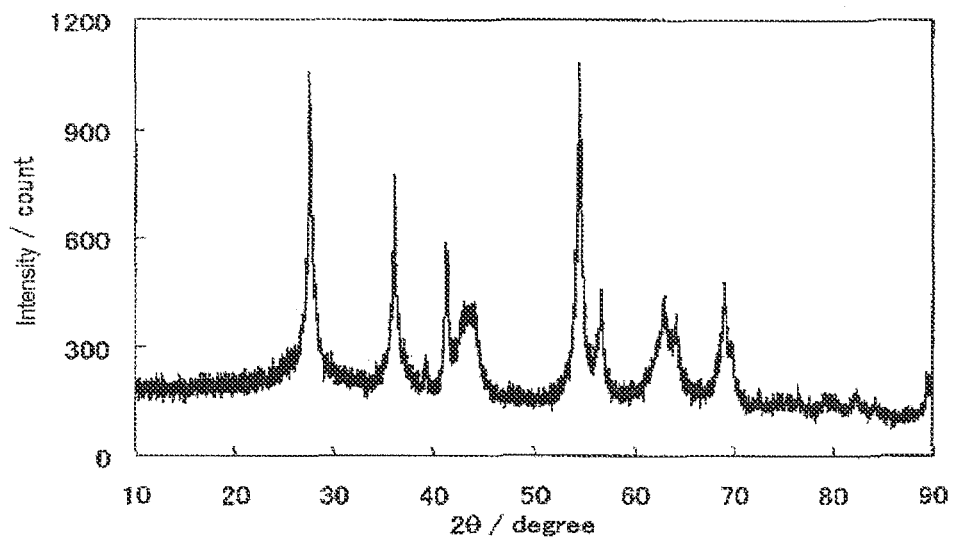
FIG. 1 is a powder X-ray diffraction spectrum of a catalyst (1) of Example

Process for Producing a Fuel Cell Electrode Catalyst

The process for producing a fuel cell electrode catalyst of the present invention comprises:

a step (1) of mixing at least a transition metal-containing compound, a nitrogen-containing organic compound and a solvent to provide a solution (in the present specification, also referred to as a "catalyst precursor solution"), a step (2) of removing the solvent from the catalyst precursor solution, and a step (3) of thermally treating a solid residue obtained in the step (2) at a temperature of 500 to 1100° C. to provide an electrode catalyst, wherein the transition metal-containing compound is partly or wholly a compound comprising at least one transition metal element (M1) selected from the group 4 and 5 elements of the periodic table as a transition metal element. In the present specification, an atom and an ion are not strictly distinguished from each other unless special circumstance requires otherwise, and are referred to as an "atom".

(Step (1))

In the step (1), at least a transition metal-containing compound, a nitrogen-containing organic compound and a solvent are mixed with one another to provide a catalyst precursor solution.

Exemplary mixing procedures are:

procedure (i): into one container, a solvent is prepared, and thereto, the transition metal-containing compound and the nitrogen-containing organic compound are added and dissolved, to mix these components; and procedure (ii): a solution of the transition metal-containing compound and a solution of the nitrogen-containing organic compound are prepared, and these solutions are mixed.

When a solvent does not allow each component to have high solubility therein, the procedure (ii) is preferable. When the transition metal-containing compound is, for example, a metal halide described later, the procedure (i) is preferable. When the transition metal-containing compound is, for example, a metal alkoxide or a metal complex described later, the procedure (ii) is preferable.

When a first transition metal-containing compound and a second transition metal-containing compound, each of which is described later, are used as the transition metal-containing compound, a preferable procedure in the procedure (ii) is:

procedure (ii'): a solution of the first transition metal-containing compound, and a solution of the second transition metal-containing compound and the nitrogen-containing organic compound are prepared, and these solutions are mixed with each other.

The mixing operation is preferably performed with stirring, in order to increase the dissolution rate of each component in a solvent.

When the solution of the transition metal-containing compound is mixed with the solution of the nitrogen-containing organic compound, it is preferable that one solution is supplied to the other solution at a constant rate with a pump or the like.

It is also preferable that the solution of the transition metal-containing compound is added little by little to the solution of the nitrogen-containing organic compound (i.e., the whole amount is not added at a time).

The catalyst precursor solution is considered to contain a reaction product of the transition metal-containing compound and the nitrogen-containing organic compound. The solubility of this reaction product in a solvent varies depending on e.g., the combination of the transition metal-containing compound, the nitrogen-containing organic compound and a solvent.

Thus, when the transition metal-containing compound is, for example, a metal alkoxide or a metal complex, it is preferable that the catalyst precursor solution does not contain a precipitate and a dispersion medium, although this depends on the type of solvent and the type of the nitrogen-containing organic compound. Even if the precipitate and the dispersion medium are contained, it is preferable that the amount thereof is low (for example, the amount is 10 wt % or less, preferably 5 wt % or less, more preferably 1 wt % or less of the whole amount of the solution). Furthermore, the catalyst precursor solution is preferably transparent. For example, the value as measured in accordance with the method for measuring see-through property of liquid described in JIS K0102 of the catalyst precursor solution is preferably 1 cm or more, more preferably 2 cm or more, still more preferably 5 cm or more.

On the other hand, when the transition metal-containing compound is, for example, a metal halide, the catalyst precursor solution easily has a precipitate generated therein, although this depends on the type of solvent and the type of the nitrogen-containing organic compound. The precipitate is considered to be the reaction product of the transition metal-containing compound and the nitrogen-containing organic compound.

In the step (1), the transition metal-containing compound, the nitrogen-containing organic compound and a solvent may be introduced in a pressure-applicable container such as an autoclave and pressurized at a pressure of ordinary pressure or more to mix these components.

The temperature in mixing the transition metal-containing compound, the nitrogen-containing organic compound and a solvent is, for example, 0 to 60° C. In view of a complex being considered to be formed from the transition metal-containing compound and the nitrogen-containing organic compound, if this temperature is excessively high and the solvent contains water, it is considered that the complex is hydrolyzed to cause a hydroxide precipitate, leading to the failure to provide an excellent catalyst, whereas if this temperature is excessively low, it is considered that the transition metal-containing compound is precipitated before the complex is formed, leading to the failure to provide an excellent catalyst.

<Transition Metal-Containing Compound>

The transition metal-containing compound is partly or wholly a compound comprising at least one transition metal element (M1)) selected from group 4 and 5 elements of the periodic table as a transition metal element. Specific examples of the transition metal element (M1) include titanium, zirconium, hafnium, vanadium, niobium and tantalum. These may be used singly or two or more kinds may be used in combination.

Of the transition metal elements (M1), in terms of cost and performance of the resultant catalyst, titanium, zirconium, niobium and tantalum are preferable; and titanium and zirconium are more preferable.

The transition metal-containing compound preferably contains at least one atom selected from an oxygen atom and a halogen atom. Specific examples thereof include metal phosphates, metal sulfates, metal nitrates, metal organic acid salts, metal oxyhalides (intermediate hydrolysates of metal halides), metal alkoxides, metal halides, metal halogen acid salts and metal hypohalous acid salts and metal complexes. These may be used singly or two or more kinds may be used in combination.

As the metal alkoxides, methoxide, propoxide, isopropoxide, ethoxide, butoxide, and isobutoxide of the transition metals are preferable; and isopropoxide, ethoxide and butoxide of the transition metals are more preferable. The metal alkoxide may have one kind of alkoxy group, or may have two or more kinds of alkoxy groups.

As the transition metal-containing compound having an oxygen atom, alkoxides, acetylacetone complexes, oxychlorides and sulfates of the transition metals are preferable; in terms of cost, alkoxides and acetylacetone complexes are more preferable; in terms of solubility in a solvent in the liquid phase, alkoxides and acetylacetone complexes are more preferable.

As the metal halides, chlorides, bromides and iodides of the transition metals are preferable. As the metal oxyhalides, oxychlorides, oxybromides and oxyiodides of the transition metals are preferable.

As the metal perhalogen acid salts, metal perchlorates are preferable. As the metal hypohalous acid salts, metal hypochlorites are preferable.

Specific examples of the transition metal-containing compound include:

titanium compounds such as titanium tetramethoxide, titanium tetraethoxide, titanium tetrapropoxide, titanium tetraisopropoxide, titanium tetrabutoxide, titanium tetraisobutoxide, titanium tetrapentoxide, titanium tetraacetylacetonato, titanium oxydiacetylacetonato, tris(acetylacetonato)titanium (II) chlorides ($[Ti(acac)_3]_2[TiCl_6]$), titanium tetrachloride, titanium trichloride, titanium oxychloride, titanium tetrabromide, titanium tribromide, titanium oxybromide, titanium tetraiodide, titanium triiodide and titanium oxyiodide;

niobium compounds such as niobium pentamethoxide, niobium pentaethoxide, niobium pentaisopropoxide, niobium pentabutoxide, niobium pentapentoxide, niobium pentachloride, niobium oxychloride, niobium pentabromide, niobium oxybromide, niobium pentaiodide and niobium oxyiodide;

zirconium compounds such as zirconium tetramethoxide, zirconium tetraethoxide, zirconium tetrapropoxide, zirconium tetraisopropoxide, zirconium tetrabutoxide, zirconium tetraisobutoxide, zirconium tetrapentoxide, zirconium tetraacetylacetonato, zirconium tetrachloride, zirconium oxychloride, zirconium tetrabromide, zirconium oxybromide, zirconium tetraiodide and zirconium oxyiodide;

tantalum compounds such as tantalum pentamethoxide, tantalum pentaethoxide, tantalum pentaisopropoxide, tantalum pentabutoxide, tantalum pentapentoxide, tantalum tetraethoxyacetylacetonato, tantalum pentachloride, tantalum oxychloride, tantalum pentabromide, tantalum oxybromide, tantalum pentaiodide and tantalum oxyiodide;

hafnium compounds such as hafnium tetramethoxide, hafnium tetraethoxide, hafnium tetrapropoxide, hafnium tetraisopropoxide, hafnium tetrabutoxide, hafnium tetraisobutoxide, hafnium tetrapentoxide, hafnium tetraacetylacetonato, hafnium tetrachloride, hafnium oxychloride, hafnium bromide, hafnium oxybromide, hafnium iodide and hafnium oxyiodide; and vanadium compounds such as vanadium oxytrimethoxide, vanadium oxytriethoxide, vanadium oxytriisopropoxide, vanadium oxytributoxide, vanadium(III) acetylacetonato, vanadium(IV) acetylacetonato, vanadium pentachloride, vanadium oxychloride, vanadium pentabromide, vanadium oxybromide, vanadium pentaiodide and vanadium oxyiodide. These may be used singly or two or more kinds may be used in combination.

Of these compounds, in view of allowing the resultant catalyst to be fine particles having a uniform particle diameter and to have high activity, preferred are:

titanium tetraethoxide, titanium tetrachloride, titanium oxychloride, titanium tetraisopropoxide, titanium tetraacetylacetonato, niobium pentaethoxide, niobium pentachloride, niobium oxychloride, niobium pentaisopropoxide, zirconium tetraethoxide, zirconium tetrachloride, zirconium oxychloride, zirconium tetraisopropoxide, zirconium tetraacetylacetonato, tantalum pentamethoxide, tantalum pentaethoxide, tantalum pentachloride, tantalum oxychloride, tantalum pentaisopropoxide, and tantalum tetraethoxyacetylacetonato are preferable.

More preferred are titanium tetraisopropoxide, titanium tetraacetylacetonato, niobium ethoxide, niobium isopropoxide, zirconium oxychloride, zirconium tetraisopropoxide and tantalum pentaisopropoxide.

The transition metal-containing compound may be a combination of the transition metal-containing compound that comprises the transition metal element (M1) of the group 4 or the group 5 of the periodic table as a transition metal element (hereinafter also referred to as a "first transition metal-containing compound") and a transition metal-containing compound that comprises at least one transition metal element (M2) selected from iron, nickel, chromium, cobalt, vanadium and manganese as a transition metal element, the transition metal element (M2) differing from the transition metal element (M1) (hereinafter also referred to as a "second transition metal-containing compound"). The use of the second transition metal-containing compound improves the performance of the resultant catalyst.

It is presumed from the observation of XPS spectrum of the catalyst that the use of the second transition metal-containing compound promotes the formation of a bond between the transition metal element (M1) (e.g., titanium) and a nitrogen atom and consequently the performance of the catalyst is improved.

As the transition metal element (M2) in the second transition metal-containing compound, in terms of the balance between cost and the performance of the resultant catalyst, iron and chromium are preferable; and iron is more preferable.

Specific examples of the second transition metal-containing compound include:

iron compounds such as iron(II) chloride, iron(III) chloride, iron(III) sulfate, iron(II) sulfide, iron(III) sulfide, potassium ferrocyanide, potassium ferricyanide, ammonium ferrocyanide, ammonium ferricyanide, iron ferrocyanide, iron (II) nitrate, iron(III) nitrate, iron(II) oxalate, iron(III) oxalate, iron(II) phosphate, iron(III) phosphate ferrocene, iron(II) hydroxide, iron (III) hydroxide, iron (II) oxide, iron(III) oxide, triirontetraoxide, iron(II) acetate, iron(II) lactate and iron(III) citrate;

nickel compounds such as nickel (II) chloride, nickel (II) sulfate, nickel(II) sulfide, nickel(II) nitrate, nickel(II) oxalate, nickel(II) phosphate, nickelocene, nickel(II) hydroxide, nickel(II) oxide, nickel (II) acetate and nickel (II) lactate;

chromium compounds such as chromium(II) chloride, chromium (III) chloride, chromium(III) sulfate, chromium (III) sulfide, chromium(III) nitrate, chromium(III) oxalate, chromium(III) phosphate, chromium(III) hydroxide, chromium(II) oxide, chromium(III) oxide, chromium(IV) oxide, chromium(VI) oxide, chromium(II) acetate, chromium(III) acetate and chromium(III) lactate;

cobalt compounds such as cobalt(II) chloride, cobalt(III) chloride, cobalt(II) sulfate, cobalt(II) sulfide, cobalt(II) nitrate, cobalt(III) nitrate, cobalt(II) oxalate, cobalt(II) phosphate, cobaltocene, cobalt(II) hydroxide, cobalt(II) oxide, cobalt(III) oxide, tricobalt tetraoxide, cobalt(II) acetate and cobalt(II) lactate;

vanadium compounds such as vanadium(II) chloride, vanadium(III) chloride, vanadium(IV) chloride, vanadium (IV) oxysulfate, vanadium(III) sulfide, vanadium(IV) oxyoxalate, vanadium metallocene, vanadium(V) oxide, vanadium acetate and vanadium citrate; and manganese compounds such as manganese(II) chloride, manganese(II) sulfate, manganese(II) sulfide, manganese(II) nitrate, manganese(II) oxalate, manganese(II) hydroxide, manganese(II) oxide, manganese(III) oxide, manganese(II) acetate, manganese(II) lactate and manganese citrate.

These may be used singly or two or more kinds may be used in combination.

Of these compounds, preferred are:

iron(II) chloride, iron(III) chloride, potassium ferrocyanide, potassium ferricyanide, ammonium ferrocyanide, ammonium ferricyanide, iron(II) acetate, iron(II) lactate, nickel(II) chloride, nickel(II) acetate, nickel(II) lactate, chromium(II) chloride, chromium(III) chloride, chromium (II) acetate, chromium(III) acetate, chromium(III) lactate, cobalt(II) chloride, cobalt(III) chloride, cobalt(II) acetate, cobalt(II) lactate, vanadium(II) chloride, vanadium(III) chloride, vanadium (IV) chloride, vanadium(IV) oxysulfate, vanadium acetate, vanadium citrate, manganese(II) chloride, manganese(II) acetate, manganese(II) lactate.

Further preferred are iron(II) chloride, iron(III) chloride, potassium ferrocyanide, potassium ferricyanide, ammonium ferrocyanide, ammonium ferricyanide, iron(II) acetate, iron (II) lactate, chromium(II) chloride, chromium(III) chloride, chromium(II) acetate, chromium(III) acetate and chromium (III) lactate.

<Nitrogen-Containing Organic Compound>

As the nitrogen-containing organic compound, preferred is a compound capable of becoming a ligand that can be coordinated to a metal atom in the transition metal-containing compound (preferable is a compound capable of forming a mononuclear complex); and more preferred is a compound capable of becoming a multidentate ligand (preferable is a bidentate ligand or a tridentate ligand) (compound capable of forming a chelate).

The nitrogen-containing organic compounds may be used singly, or two or more kinds may be used in combination.

The nitrogen-containing organic compound preferably has a functional group such as amino group, nitrile group, imide group, imine group, nitro group, amide group, azide group, aziridine group, azo group, isocyanate group, isothiocyanate group, oxyme group, diazo group and nitroso group, or a ring such as pyrrole ring, porphyrin ring, imidazole ring, pyridine ring, pyrimidine ring and pyrazine ring (these functional groups and rings are also collectively referred to as a "nitrogen-containing molecular group").

The nitrogen-containing organic compound, by containing the nitrogen-containing molecular group in the molecule, after subjected to the mixing in the step (1), is considered to be more strongly coordinated to a transition metal atom derived from the transition metal-containing compound.

Among the nitrogen-containing molecular group, amino group, imine group, amide group, pyrrole ring, pyridine ring and pyrazine ring are more preferable; and amino group, imine group, pyrrole ring and pyrazine ring are still more preferable. Amino group and pyrazine ring are particularly preferable because of allowing the resultant catalyst to have particularly high activity.

Specific examples of the nitrogen-containing organic compound wherein the compound does not contain an oxygen atom include melamine, ethylenediamine, ethylenediamine.dihydrochloride, triazole, acetonitrile, acrylonitrile, ethyleneimine, aniline, pyrrole and polyethyleneimine. Of these, ethylenediamine and ethylenediamine.dihydrochloride are preferable because of allowing the resultant catalyst to have high activity.

The nitrogen-containing organic compound preferably has hydroxyl group, carboxyl group, aldehyde group, oxyhalide group, sulfo group, phosphoric acid group, ketone group, ether group or ester group (these are also collectively referred to as an "oxygen-containing molecular group"). The nitrogen-containing organic compound, by containing the oxygen-containing molecular group in the molecule, after subjected to the mixing in the step (1), is considered to be more strongly coordinated to a transition metal atom derived from the transition metal-containing compound.

Among the oxygen-containing molecular group, carboxyl group and aldehyde group are particularly preferable because of allowing the resultant catalyst to have particularly high activity.

As the nitrogen-containing organic compound that contains an oxygen atom in the molecule, compounds having the nitrogen-containing molecular group and the oxygen-containing molecular group are preferable. Such compounds, after subjected to the step (1), are considered to be particularly strongly coordinated to a transition metal atom derived from the transition metal-containing compound.

As the compounds having the nitrogen-containing molecular group and the oxygen-containing molecular group, amino acids having amino group and carboxyl group, and derivatives thereof are preferable.

As the amino acids, preferred are alanine, arginine, asparagine, asparagine acid, cysteine, glutamine, glutamic acid, glycine, histidine, isoleucine, leucine, lysine, methionine, phenylalanine, serine, threonine, tryptophan, tyrosine, valine, norvaline, glycylglycine, triglycine and tetraglycine. Because of allowing the resultant catalyst to have high activity, alanine, glycine, lysine, methionine, tyrosine are more preferable. Because of allowing the resultant catalyst to have extremely high activity, alanine, glycine and lysine are particularly preferable.

As the nitrogen-containing organic compound that contains an oxygen atom in the molecule, specific examples include, in addition to the above amino acids, acylpyrroles such as acetylpyrrole, pyrrolecarboxylic acid, acylimidazoles such as acetylimidazole, carbonyldiimidazole, imidazolecarboxylic acid, pyrazole, acetanilide, pyrazinecarboxylic acid, piperidinecarboxylic acid, piperazinecarboxylic acid, morpholine, pyrimidinecarboxylic acid, nicotinic acid, 2-pyridinecarboxylic acid, 2,4-pyridinedicarboxylic acid, 8-quinolinol, and polyvinylpyrrolidone. Because of allowing the resultant catalyst to have high activity, preferred are compounds capable of becoming a bidentate ligand: specifically, preferred are pyrrole-2-carboxylic acid, imidazole-4-carboxylic acid, 2-pyrazinecarboxylic acid, 2-piperidinecarboxylic acid, 2-piperazinecarboxylic acid, nicotinic acid, 2-pyridinecarboxylic acid, 2,4-pyridinedicarboxylic acid and 8-quinolinol; and more preferred are 2-pyrazinecarboxylic acid and 2-pyridinecarboxylic acid.

The ratio (B/A) of the number of all atoms "B" of carbon of the nitrogen-containing organic compound used in the step (1) to the number of all atoms "A" of a transition metal element of the transition metal-containing compound used in the step (1) is preferably 200 or less, more preferably 150 or less, still more preferably 80 or less, particularly preferably 30 or less, in terms of allowing the thermal treatment in the step (3) to be performed while decreasing components eliminating as carbon compounds such as carbon dioxide and carbon monoxide, i.e., decreasing an emission gas during catalyst production. The ratio is preferably 1 or more, more preferably 2 or more, still more preferably 3 or more, particularly preferably 5 or more in terms of obtaining a catalyst having good activity.

The ratio (C/A) of the number of all atoms "C" of nitrogen of the nitrogen-containing organic compound used in the step (1) to the number of all atoms "A" of a transition metal element of the transition metal-containing compound used in the step (1) is preferably 28 or less, more preferably 17 or less, still more preferably 12 or less, particularly preferably 8.5 or less, in terms of obtaining a catalyst having good activity. The ratio is preferably 1 or more, more preferably 2.5 or more, still more preferably 3 or more, particularly preferably 3.5 or more, in terms of obtaining a catalyst having good activity.

When the proportions of the first transition metal-containing compound and the second transition metal-containing compound that are used in the step (1) are represented in terms of the molar ratio (M1:M2) of the atoms of the transition metal element (M1) to the atoms of the transition metal element (M2) as M1:M2=(1−a):a, the range of "a" is preferably $0.01 \leq a \leq 0.5$, more preferably $0.02 \leq a \leq 0.4$, particularly preferably $0.05 \leq a \leq 0.3$.

<Solvent>

Examples of the solvent include water, alcohols and acids. As the alcohols, ethanol, methanol, butanol, propanol and ethoxyethanol are preferable; and ethanol and methanol are more preferable. As the acids, acetic acid, nitric acid (aqueous solution), hydrochloric acid, phosphoric acid aqueous solution and citric acid aqueous solution are preferable; and acetic acid and nitric acid are more preferable. These may be used singly or two or more kinds may be used in combination.

When the transition metal-containing compound is a metal halide, the solvent is preferably methanol.

<Precipitation Suppressant>

When the transition metal-containing compound contains halogen atoms, i.e., when the transition metal-containing compound is e.g., titanium chloride, niobium chloride, zirconium chloride, tantalum chloride or the like, in general, these compounds are easily hydrolyzed by water to cause precipitates of hydroxides, oxychlorides and the like. Thus, when the transition metal-containing compound contains halogen atoms, it is preferable that 1 wt % or more of a strong acid is added. For example, when the acid is hydrochloric acid, by adding the acid in such a manner that the concentration of hydrogen chloride in the solution becomes 5 wt % or more, more preferably 10 wt % or more, a transparent catalyst precursor solution can be obtained while preventing the occurrence of precipitates derived from the transition metal-containing compound.

In the case where the transition metal-containing compound is a metal complex with the solvent being water alone or a combination of water and another compound, too, it is preferable to use the precipitation suppressant. In this case, the precipitation suppressant is preferably a compound having a diketone structure; more preferably diacetyl, acetylacetone, 2,5-hexanedione or dimedone; still more preferably acetylacetone or 2,5-hexanedione.

The precipitation suppressant is added preferably in an amount of 1 to 70 wt %, more preferably 2 to 50 wt %, still more preferably 15 to 40 wt %, in 100 wt % of the solution of the transition metal-containing compound (solution that contains the transition metal-containing compound and does not contain the nitrogen-containing organic compound).

The precipitation suppressant is added preferably in an amount of 0.1 to 40 wt %, more preferably 0.5 to 20 wt %, still more preferably 2 to 10 wt % in 100 wt % of the catalyst precursor solution.

The precipitation suppressant may be added in any stage of the step (1).

In the step (1), in a preferable embodiment, a solution that contains both the transition metal-containing compound and the precipitation suppressant is prepared, and then this solution is mixed with the nitrogen-containing organic compound, to thereby provide a catalyst precursor solution. In the case where the first transition metal-containing compound and the second transition metal-containing compound are used as the transition metal-containing compound, in the step (1), it is preferable that a solution that contains both the first transition metal-containing compound and the precipitation suppressant is prepared, and then this solution is mixed with the nitrogen-containing organic compound and the second transition metal-containing compound, to thereby provide a catalyst precursor solution. By performing the step (1) in this way, the occurrence of precipitates can be prevented with more certainty.

(Step (2))

In the step (2), the solvent is removed from the catalyst precursor solution obtained in the step (1).

The solvent removal may be performed in air, or may be performed under an atmosphere of an inert gas (for example, nitrogen, argon, helium). As the inert gas, in terms of cost, nitrogen and argon are preferable; and nitrogen is more preferable.

The temperature in the solvent removal may be ordinary temperature when the vapor pressure of the solvent is large, but in terms of mass production of the catalyst, temperature is preferably 30° C. or higher, more preferably 40° C. or higher, still more preferably 50° C. or higher. In terms of preventing the decomposition of the catalyst precursor that is presumed to be a metal complex, such as a chelate, contained in the solution obtained in the step (1), the temperature is preferably 250° C. or lower, more preferably 150° C. or lower, still more preferably 110° C. or lower.

The solvent removal may be performed under atmospheric pressure when the vapor pressure of the solvent is large, but may be performed under reduced pressure (e.g., 0.1 Pa to 0.1 MPa) in order to remove the solvent within a shorter period of time. For the solvent removal under reduced pressure, for example, an evaporator may be used.

The solvent removal may be performed with the mixture obtained in the step (1) being allowed to stand still. However, in order to obtain a homogenous solid residue, preferred is the solvent removal with the mixture being rotated.

When the weight of a container holding the mixture is large, it is preferable that the solution is rotated using e.g., a stirring rod, a stirring blade and a stirring bar.

When the solvent removal is performed while regulating the vacuum degree of a container holding the mixture, in which case the drying is performed in a sealable container, it is preferable that the solvent removal is performed while the whole container is rotated: for example, it is preferable that the solvent removal is performed using e.g., a rotary evaporator.

Depending on solvent-removal methods or properties of the transition metal-containing compound or the nitrogen-containing organic compound, the solid residue obtained in the step (2) may have a non-uniform composition or be at a non-uniform agglomeration state. In this case, the solid residue may be subjected to mixing and disintegrating to provide more uniform and finer powders to be used in the step (3), whereby a catalyst can be obtained which has more uniform particle diameter.

For the mixing and disintegrating of the solid residue, for example, a roll-rotating mill, a ball mill, a small-diameter ball mill (bead mill), a medium-stirring mill, a gas stream pulverizing machine, a mortar, an automatic kneading mortar, a disintegrating tank, or a jet mill is employable. When the solid residue has been provided in a small amount, a mortar, an automatic kneading mortar or a batch-type ball mill is preferably used. When the solid residue has been provided in a large amount and is to be subjected to continuous mixing or disintegrating treatment, a jet mill is preferably used.

(Step (3))

In the step (3), the solid residue obtained in the step (2) is thermally treated to provide an electrode catalyst.

The temperature in this thermal treatment is 500 to 1100° C., preferably 600 to 1050° C., more preferably 700 to 950° C.

If the temperature in this thermal treatment is so higher than the above range, calcining and particle growth occur between particles of the resultant electrode catalyst, consequently decreasing the specific surface area of the electrode catalyst. This leads to inferior processability when the particles are processed to a catalyst layer by coating method. On the other hand, if the temperature in this thermal treatment is so lower than the above range, a catalyst which has high activity cannot be obtained.

Exemplary methods of the thermal treatment method include standing method, stirring method, dropping method and powder capturing method.

Under the standing method, the solid residue obtained in the step (2) placed in a stationary electric furnace or the like is heated. During heating, the solid residue that has been weighed may be placed in a ceramic container such as an alumina board and a quartz board. The standing method is preferable in terms of being able to heat a large amount of the solid residue.

Under the stirring method, the solid residue introduced into an electric furnace such as a rotary kiln is heated while being stirred. The stirring method is preferable in terms of being able to heat a large amount of the solid residue, and also in terms of being able to prevent the aggregation and growth of the particles of the resultant electrode catalyst. Furthermore, the stirring method is preferable also in terms of being able to continuously produce the electrode catalyst by using a gradient heating furnace.

Under the dropping method, an induction furnace is heated to a predetermined heating temperature while flowing an atmosphere gas through the furnace; a thermal equilibrium is maintained at the temperature; and the solid residue is dropped and heated in a crucible which is a heating zone in the furnace. The dropping method is preferable in terms of being able to minimizing the aggregation and growth of particles of the resultant electrode catalyst.

Under the powder capturing method, the solid residue is caused to suspend as particles in an inert gas atmosphere containing a trace amount of an oxygen gas, and the solid residue is captured and heated in a vertical tubular furnace kept at a predetermined heating temperature.

When the thermal treatment is performed by the standing method, the heating rate, which is not particularly limited, is preferably about 1° C./min to 100° C./min, more preferably 5° C./min to 50° C./min. The heating time is preferably 0.1 to 10 hours, more preferably 0.5 to 5 hours, still more preferably 0.5 to 3 hours. When the heating by the standing method is performed in a tubular furnace, the heating time of the electrode catalyst particles is 0.1 to 10 hours, preferably 0.5 to 5 hours. The heating time in this range is preferable, leading to the tendency of the formation of uniform electrode catalyst particles.

Under the stirring method, the heating time of the solid residue is usually 10 minutes to 5 hours, preferably 30 minutes to 2 hours. Under this method, when the solid residue is continuously heated, for example, by using a gradient furnace, the heating time is defined as an average retention time as calculated from the sample flowing amount in a constant furnace.

Under the dropping method, the heating time of the solid residue is usually 0.5 to 10 minutes, preferably 0.5 to 3 minutes. The heating time within this range is preferable, leading to the tendency of the formation of uniform electrode catalyst particles.

Under the powder capturing method, the heating time of the solid residue is 0.2 second to 1 minute, preferably 0.2 to 10 seconds. The heating time within this range is preferable, leading to the tendency of the formation of uniform electrode catalyst particles.

When the thermal treatment is performed under the standing method, a heating furnace employing LNG (liquefied natural gas), LPG (liquefied petroleum gas), light oil, heavy oil, electricity or the like as a heat source may be used as a thermal treatment apparatus. In this case, since the atmosphere in thermally treating the solid residue is important in the present invention, a preferable apparatus is not a heating apparatus that holds fuel flame within the furnace and thereby provides heating from the inside of the furnace, but a heating apparatus that provides heating from the outside of the furnace.

When a heating furnace is used which provides the solid residue in an amount of 50 kg or more per one batch, in terms of cost, a heating furnace employing LNG or LPG as a heat source is preferable.

When an electrode catalyst having particularly high catalytic activity is desired, it is preferable to use an electric furnace employing electricity as a heat source, which allows for the strict controlling of temperature.

Exemplary shapes of the furnace include a tubular furnace, a top cover-type furnace, a tunnel furnace, a box-type furnace, a sample table elevating-type furnace (elevator-type furnace) and a furnace truck. Of these, preferred are a tubular furnace, a top cover-type furnace, a box-type furnace and a sample table elevating-type furnace; more preferable are a tubular furnace and a box-type furnace, which allow for the strict controlling of atmosphere.

When the stirring method is adopted, the above heat source is employable. However, especially when the solid residue is continuously thermally treated by the stirring method using a gradient rotary kiln, it is likely that the equipment size becomes larger and a large amount of energy is needed; and thus it is preferable to use a heat source derived from fuels such as LPG.

The atmosphere in performing the thermal treatment is preferably atmosphere containing an inert gas as a main component, which allows the resultant electrode catalyst to have increased activity. Among the inert gases, in view of relatively low cost and easy availability, nitrogen, argon, helium are preferable; and nitrogen and argon are more preferable. These inert gases may be used singly, or two or more kinds may be used in combination. Although these gases are commonly recognized as being inert, there is a possibility that in the thermal treatment of the step (2), these inert gases, i.e., nitrogen, argon and helium, are reacted with the solid residue.

The presence of a reactive gas in the atmosphere in performing the thermal treatment may allow the resultant electrode catalyst to have higher catalytic performance.

For example, when the thermal treatment is performed under the atmosphere of a nitrogen gas; an argon gas; a mix gas of a nitrogen gas and an argon gas; or a mixed gas of at least one gas selected from a nitrogen gas and an argon gas and at least one gas selected from a hydrogen gas, an ammonia gas and an oxygen gas, an electrode catalyst having high catalytic performance tends to be obtained.

When the atmosphere in performing the thermal treatment contains a hydrogen gas, the concentration of the hydrogen gas is, for example, 100% by volume or lower, preferably 0.01 to 10% by volume, more preferably 1 to 5% by volume.

When the atmosphere in performing the thermal treatment contains an oxygen gas, the concentration of the oxygen gas is, for example, 0.01 to 10% by volume, more preferably 0.01 to 5% by volume.

When none of the transition metal-containing compound, the nitrogen-containing organic compound and the solvent contains an oxygen atom, the thermal treatment is performed preferably under the atmosphere containing an oxygen gas.

A thermally-treated product obtained by the thermal treatment may be used as it is, as an electrode catalyst; or may be used after disintegrated, as an electrode catalyst. In the present specification, an operation of pulverizing the thermally-treated product, such as disintegrating and crushing, is indicated as "disintegrating" without making particular distinction. Performing the disintegrating can improve the processability in using the resultant electrode catalyst to produce an electrode, and properties of the resultant electrode. For the disintegrating, for example, a roll-rotating mill, a ball mill, a small-diameter ball mill (bead mill), a medium-stirring mill, a gas stream pulverizing machine, a mortar, an automatic kneading mortar, a disintegrating tank or a jet mill may be used. When the electrode catalyst has been provided in a small amount, a mortar, an automatic kneading mortar, a batch-type ball mill is preferable. When the thermally-treated product is to be continuously treated in a large amount, a jet mill or a continuous-type ball mill is preferable. Among the continuous-type ball mills, a bead mill is more preferable.

The above disintegrating is preferably performed under the following conditions.

Disintegrating Conditions:

Impact force (mechanical energy) applied to the thermal treatment is in the range of 2 to 100 G.

In using a ball mill, the rotating centrifugal acceleration is in the range of 2 to 20 G.

Hereinafter, the disintegrating conditions are described in greater detail with reference to the disintegrating using a ball mill as an example.

The disintegrating can be achieved also by employing a batch-type ball mill, e.g., a pot-type ball mill, or a continuous-type ball mill, when an appropriate rotating centrifugal acceleration is set.

The acceleration generated by rotation of not less than 2 G can shorten the disintegrating time, leading to advantage for industrial production of catalysts, while the acceleration of not more than 20 G reduces the damage of the surface of the catalyst, leading to the provision of a catalyst with high activity.

When the disintegrating is performed using a ball mill such that the thermally-treated product slurry is circulated through the mill, i.e., a continuous-type ball mill exemplified by a grain mill manufactured by Asada Iron Works Co., Ltd., the disintegrating time refers to a time during which the thermally-treated product is substantially present in a mill crushing chamber (disintegrating chamber) of the ball mill. Thus, when the thermally-treated product slurry is circulated through the entire mill in a volume twice as much as the capacity of the mill crushing chamber (disintegrating chamber), "the disintegrating time using a ball mill" is half of the time during which the mill is actually operated; and when the thermally-treated product slurry is circulated through the entire mill in a volume three times as much as the capacity of the mill crushing chamber (disintegrating chamber), "the disintegrating time using a ball mill" is one third of the time during which the mill is actually operated.

The ball in the ball mill preferably has a diameter of 0.01 to 5.0 mm, more preferably 0.05 to 3.0 mm, still more preferably 0.1 to 1.0 mm. The use of the ball having a diameter within such a range allows the resultant fuel cell catalyst to have high catalytic performance (oxygen reducing activity).

Examples of a material of the ball in the ball mill and the container of the ball mill include zirconia, glass and alumina. A preferable material of the ball is zirconia, which has a high abrasion resistance.

The ball in the ball mill is added preferably in an amount 10 to 100 times the mass of the thermally-treated product to be supplied to a mill container.

The rotating centrifugal acceleration in disintegrating using a ball mill is preferably 2 to 20 G, more preferably 4 to 18 G, still more preferably 6 to 16 G. The rotating centrifugal acceleration falling within the above range allows the resultant fuel cell catalyst to have high catalytic performance (oxygen reducing activity).

In the present invention, the rotating centrifugal acceleration in disintegrating using a ball mill is determined from the following relation.

Rotating centrifugal acceleration (unit: gravitational acceleration G)=$1118 \times R_1 \times N_1^2 \times 10^{-8}$, wherein $R_1$ is a rotation radius (cm) and $N_1$ is the number of rotation revolution (rpm).

When the ball mill is a planetary ball mill, the orbital centrifugal acceleration in disintegrating using the planetary ball mill is preferably 5 to 50 G, more preferably 8 to 45 G, still more preferably 10 to 35 G. The orbital centrifugal acceleration falling within the above range allows the resultant fuel cell catalyst to have high catalytic performance (oxygen reducing activity).

In the present invention, the orbital centrifugal acceleration in disintegrating using the planetary ball mill is determined from the following relation.

Orbital centrifugal acceleration (unit: gravitational acceleration G)=$1118 \times R_2 \times N_2^2 \times 10^{-8}$ wherein $R_2$ is an orbital radius (cm) and $N_2$ is the number of orbital revolution (rpm).

When the disintegrating is performed by wet process, the mixing ratio of the thermally-treated product to a dispersion medium (mass of thermally-treated product: mass of dispersion medium) is preferably in the range of 1:1 to 1:50, more preferably 1:3 to 1:20, still more preferably 1:5 to 1:10.

Preferred examples of the dispersion medium include:

alcohols such as methanol, ethanol, 1-propanol, 2-propanol, 1-butanol, 2-butanol, isobutylalcohol, tert-butylalcohol, pentanol, 2-heptanol and benzylalcohol;

ketones such as acetone, methylethylketone, methylpropylketone, methylbutylketone, methylisobutylketone, methylamylketone, acetonitrileacetone, diethylketone, dipropylketone and diisobutylketone;

ethers such as tetrahydrofuran, diethyleneglycoldimethylether, anisole, methoxytoluene, diethylether, dipropylether and dibutylether;

amines such as isopropylamine, butylamine, isobutylamine, cyclohexylamine and diethylamine;

esters such as propyl formate, isobutyl formate, amyl formate, methyl acetate, ethyl acetate, propyl acetate, butyl acetate, isobutyl acetate, pentyl acetate and isopentyl acetate; and polar solvents such as acetonitrile, dimethylformamide, dimethylacetamide, N-methylpyrrolidone, ethylene glycol, diethylene glycol and propylene glycol. These may be used singly, or two or more kinds may be used in combination.

Preferably, the dispersion medium substantially does not contain water. Specifically, the content of water in the dispersion medium is preferably 0 to 0.1% by mass.

The dispersion medium is added preferably in such an amount ranging from 10 to 30% of the whole volume of a mill container, with the thermally-treated product and the balls being placed in the mill container.

The disintegrating by dry process (i.e., the disintegrating without the use of any dispersion medium) is preferable in terms of facilitating the catalyst collection after the disintegrating.

The disintegrating is usually performed under ordinary temperature and ordinary pressure, but may be performed under controlled temperature and pressure.

Fuel Cell Electrode Catalyst

The fuel cell electrode catalyst of the present invention is produced by the aforementioned process for producing a fuel cell electrode catalyst of the present invention (hereinafter, the fuel cell electrode catalyst produced by the aforementioned process for producing a fuel cell electrode catalyst of the present invention is also referred to as a "catalyst (A)").

When the proportions of the number of atoms of a transition metal element (the transition metal element (M1) and the transition metal element (M2) are not distinguished from each other), carbon, nitrogen and oxygen that constitute the catalyst (A) is represented as the transition metal element: carbon:nitrogen:oxygen=1:x:y:z, the following is preferably satisfied: $0 < x \leq 7$, $0 < y \leq 2$ and $0 < z \leq 3$.

In terms of allowing the electrode catalyst to have high activity, the range of "x" is more preferably $0.15 \leq x \leq 5.0$, still more preferably $0.2 \leq x \leq 4.0$, particularly preferably $1.0 \leq x \leq 3.0$. The range of "y" is more preferably $0.01 \leq y \leq 1.5$, still more preferably $0.02 \leq y \leq 0.5$, particularly preferably $0.03 \leq y \leq 0.4$. The range of "z" is more preferably still more preferably $0.9 \leq z \leq 2.0$, particularly preferably $1.3 \leq z \leq 1.9$.

In the case where the catalyst (A) contains, as an transition metal element, one transition metal element (M1) selected from the group consisting of the group 4 and the group 5 elements of the periodic table, and at least one transition metal element (M2) selected from iron, nickel, chromium, cobalt, vanadium and manganese, when the proportions of the number of atoms of the transition metal element (M1), the transition metal element (M2), carbon, nitrogen and oxygen that constitute the catalyst (A) are represented as the transition metal element (M1): the transition metal element (M2): carbon:nitrogen:oxygen=$(1-a):a:x:y:z$, the following is preferably satisfied: $0<a \leq 0.5$, $0<x \leq 7$, $0<y \leq 2$ and $0<z \leq 3$. The catalyst (A), by containing (M2) in this proportion, has higher performance.

In terms of allowing the electrode catalyst to have high activity, preferable ranges of "x", "y" and "z" are as described above. The range of "a" is more preferably $0.01 \leq a \leq 0.5$, still more preferably $0.02 \leq a \leq 0.4$, particularly preferably $0.05 \leq a \leq 0.3$.

The values of "a", "x", "y" and "z" are those as measured by the method adopted in Examples described later.

<Effects Expected as a Result of the Presence of Transition Metal Element (M2)>

The effects expected as a result of the presence of the transition metal element (M2) (metal element that differs from (M1) and is at least one element selected from iron, nickel, chromium, cobalt, vanadium and manganese) are as follows.

(1) The transition metal element (M2) or a compound that contains the transition metal element (M2) works as a catalyst for forming a bond between the transition metal element (M1) atom and a nitrogen atom during the synthesis of the electrode catalyst.

(2) Even when the electrode catalyst is used at such a high potential under such a highly oxidative atmosphere as to cause the elution of the transition metal element (M1), the transition metal element (M2) is passivated to prevent further elution of the transition metal element (M1).

(3) In the thermal treatment of the step (3), the transition metal element (M2) prevents the sintering of the thermally-treated product, i.e., prevents the decrease in a specific surface area of the thermally-treated product.

(4) The presence in the electrode catalyst of the transition metal element (M1) and the transition metal element (M2) causes the bias of charge at a part where atoms of both the metal elements are adjacent to each other. This leads to adsorption or reaction of reactants or elimination of products that would not be achievable in the electrode catalyst containing the transition metal element (M1) alone as a metal element.

The catalyst (A) of the present invention preferably has a transition metal element atom, a carbon atom, a nitrogen atom and an oxygen atom, and has a crystalline structure of an oxide, a carbide or a nitride of the transition metal element, or a plurality of crystalline structures thereof. The results of the study of the crystalline structures by X-ray diffraction analysis and the elemental analysis of the catalyst (A) lead to the presumption that the catalyst (A) has an oxide structure of the transition metal element with the site of the oxygen atom of the oxide structure being substituted with a carbon atom or nitrogen atom; or has a carbide, nitride or carbonitride structure of the transition metal element with the site of the carbon atom or the nitrogen atom being substituted with an oxygen atom; or has a mixed structure containing such structures.

<BET Specific Surface Area>

According to the process for producing a fuel cell electrode catalyst of the present invention, a fuel cell electrode catalyst having a large specific surface area is produced. The specific surface area as calculated by BET method of the catalyst (A) of the present invention is preferably 30 to 350 $m^2/g$, more preferably 50 to 300 $m^2/g$, still more preferably 100 to 300 $m^2/g$. The specific surface area as calculated by BET method of a catalyst (B), described later, also is the same as that of the catalyst (A).

In the measurement method (A) described below, the potential at which the reduction current starts to differ by 0.05 $mA/cm^2$ or more between the reduction current under the oxygen atmosphere and that under the nitrogen atmosphere (oxygen reduction potential E@0.05 $mA/cm^2$) of the catalyst (A) is preferably 0.6 V (vs. RHE) or more, more preferably 0.7 V (vs. RHE) or more, still preferably 0.8 V or more, on the basis of a reversible hydrogen electrode.

[Measurement Method (A):

The catalyst dispersed in carbon, which is an electron conductive substance, is added to a solvent so that the catalyst and the carbon account for 1% by mass. The mixture is ultrasonically stirred to give a suspension. The carbon herein is carbon black (specific surface area: 100 to 300 $m^2/g$) (e.g., VULCAN (registered trade mark) XC-72 manufactured by Cabot Corporation), and the catalyst is dispersed therein with a catalyst:carbon mass ratio of 95:5. The solvent is a mixture of isopropyl alcohol:water (mass ratio)=2:1.

While ultrasonicating the suspension, a 10 µl portion thereof is collected and is quickly dropped on a glassy carbon electrode (diameter: 5.2 mm) and dried under 120° C. for 5 minutes to form a fuel cell catalyst layer containing the catalyst on the glassy carbon electrode. This dropping and drying operation is repeated until 1.0 mg or more of the fuel cell catalyst layer is formed on the carbon electrode surface.

Subsequently, 10 µL of NAFION (registered trade mark) (a 5% NAFION (registered trade mark) solution (DE521) manufactured by DuPont) diluted ten times with isopropyl alcohol is dropped on the fuel cell catalyst layer and is dried at 120° C. for 1 hour.

The electrode thus obtained is polarized in a 0.5 mol/L sulfuric acid aqueous solution at 30° C. under an oxygen atmosphere and a nitrogen atmosphere at a potential scanning rate of 5 mV/sec, thereby measuring a current-potential curve. As a reference electrode, a reversible hydrogen electrode is used in a sulfuric acid aqueous solution of the same concentration. In the current-potential curve, the potential at which the reduction current starts to differ by 0.2 $\mu A/cm^2$ or more between the reduction current under the oxygen atmosphere and that under the nitrogen atmosphere is defined as the oxygen reduction onset potential.] In the present invention, the oxygen reduction current density can be determined in such a manner as described below.

At first, from the result of the measurement method (A), a difference between the reduction current under oxygen atmosphere and the reduction current under nitrogen atmosphere at a specific potential (e.g., 0.7 V (vs. RHE)) is calculated. The calculated value is divided by an area of the electrode to provide a value and this value is defined as an oxygen reduction current density ($mA/cm^2$).

<Process for Producing a Transition Metal Oxycarbonitride>

The process for producing a transition metal oxycarbonitride of the present invention comprises thermally treating a mixture of an organic compound containing nitrogen in the molecule and a transition metal compound containing oxygen in the molecule at a temperature of 500 to 1000° C.

Examples of the transition metal compound containing oxygen in the molecule include a metal oxide, a metal hydroxide and a mixture of the metal oxide and the metal hydroxide each containing at least one metal selected from the group consisting of titanium, vanadium, chromium, manganese, iron, cobalt, nickel, copper, zinc, zirconium, niobium, molybdenum, tantalum and tungsten (hereinafter also referred to as a "metal(m)", or simply "(m)"); in the case where two or more kinds of metals are contained, (m) is followed by number: "metal(m1)" or simply "(m1)".

In the present invention, when the raw material of the transition metal oxycarbonitride is a mixture of the organic compound containing nitrogen in the molecule and the transition metal compound containing oxygen in the molecule, carbonization and nitridation reactions can be made at a low temperature of not higher than 1000° C. and thereby the transition metal oxycarbonitride can be produced.

In conventional embodiments using carbon black or the like as a carbon source, the carbonization of metal oxides requires high temperature of not lower than about 1300° C.

Further, the nitridation of metal oxides using a nitrogen gas requires thermal treatment temperature of not lower than about 1200° C. When ammonia is used instead of the nitrogen gas, the thermal treatment temperature is possible at not higher than 1000° C. However, since ammonia has a low ignition point of 651° C., and has combustibility, inflammability and corrosiveness as well as being harmful to humans and environment, i.e., being dangerous in many respects, and thus the safety of ammonia is extremely low.

The present invention uses the mixture of the organic compound containing nitrogen in the molecule and the transition metal compound containing oxygen in the molecule, and allows carbonization reaction and nitridation reaction to be made through one-stage thermal treatment step from the transition metal oxides or the transition metal hydroxides at not higher than 1000° C.; and therefore can provide the transition metal oxycarbonitride with much lower cost and more safety as compared with conventional production processes.

The present invention also allows the production of the metal oxycarbonitride having various shapes such as particulate shape and fibrous shape as a fuel cell electrode catalyst.

The method of mixing the organic compound containing nitrogen in the molecule and the transition metal compound containing oxygen in the molecule is not particularly limited as long as being a method by which these compounds can be homogenously mixed.

The mixing of the transition metal compound and/or a sol composed of this compound with the organic compound containing nitrogen in the molecule may be performed in a solvent, followed by stirring and heating, to provide a homogenous mixture.

The transition metal compound and the organic compound may be kneaded with each other using a mill or the like to provide a physically-homogenous mixture.

In the mixture of the organic compound containing nitrogen in the molecule and the transition metal compound containing oxygen in the molecule, the mixing ratio of the transition metal compound to the organic compound, when represented in terms of the molar ratio of the number of moles of a metal contained in the transition metal compound (when two or more kinds of metals are contained, the total number of moles of all the metals is meant here) to the number of moles of an organic compound (when two or more kinds of organic compounds are contained, the total number of moles of all the organic compounds is meant here; in the case of a polymer compound, the number of moles of a monomer is meant here), preferably satisfies:the number of moles of a metal component:the number of moles of an organic compound=1:0.01 to 1:20. The mixing ratio of the transition metal compound to the organic compound is more preferably in the range of 1:0.1 to 1:10.

When the mixing ratio is within the above range, appropriate carbonization and nitridation reactions of a metal oxide or a metal hydroxide easily take place, and a metal oxycarbonitride having preferable compositional proportions of carbon, nitrogen and oxygen is easily obtained. If the amount of the organic compound is more than the above molar ratio range, carbonization or nitridation easily proceeds, and a preferable metal oxycarbonitride may be difficult to obtain.

If the amount of the organic compound is less than the above molar ratio range, carbonization reaction or nitridation reaction is unlikely to take place and a metal oxycarbonitride having preferable compositional proportions of carbon, nitrogen and oxygen may be difficult to obtain.

The temperature in thermally treating the mixture is preferably 500 to 1000° C., more preferably 600 to 950° C., still more preferably 700 to 900° C.

The thermal treatment temperature being within the range is preferable because the resultant transition metal oxycarbonitride has good crystallinity and uniformity, and thus the transition metal oxycarbonitride has high activity as a fuel cell catalyst (the fuel cell catalyst comprising the above the transition metal oxycarbonitride is also referred to as a "catalyst (B)") Further, decrease in production cost and improvement in the safety of production process can be achieved.

If the thermal treatment temperature is higher than the above range, in which case carbonization and nitridation easily take place, it is difficult to obtain a metal oxycarbonitride having preferable compositional proportions of carbon, nitrogen and oxygen, and the resultant catalytic activity tends to be lower.

If the thermal treatment temperature is lower than the above range, in which case carbonization and nitridation reactions do not proceed sufficiently, it is highly likely that a preferable metal oxycarbonitride cannot be obtained.

When the thermal treatment temperature is higher than the above range and lower than the above range, decrease in production cost and improvement in the safety of production process cannot be achieved.

In the process for producing a transition metal oxycarbonitride of the present invention, the thermal treatment is performed at lower temperature than in conventional processes, to provide the transition metal oxycarbonitride; and therefore, the process for producing a transition metal oxycarbonitride of the present invention can provide the transition metal oxycarbonitride with safety at lower cost. In the present invention, the provision of the transition metal oxycarbonitride having good crystallinity and uniformity as well as having high activity as a fuel cell catalyst even through the thermal treatment at lower temperature is considered to be accomplished by the mechanism in which a carbon component and a nitrogen component activated as a result of the thermal decomposition of an organic compound in a temperature range of not higher than 1000° C. are easily reacted with a metal oxide or a metal hydroxide and replace part of the oxygen of the metal oxide or the metal hydroxide, and thereby a fibrous metal oxycarbonitride having preferable compositional proportions of carbon, nitrogen and oxygen is obtained.

The thermal treatment of the mixture may be performed, for example, under a gas atmosphere containing nitrogen and/or argon. Further, the thermal treatment may be performed under a gas atmosphere obtained by mixing hydrogen in such an amount as to be in the range of more than 0% by volume to not more than 5% by volume of the whole gas. Further, the thermal treatment may be performed under a gas atmosphere obtained by mixing oxygen in such an amount as to be in the range of more than 0% by volume to not more than 10% by volume of the whole gas.

Of these, in terms of the easiness of controlling nitridation reaction and the easiness of removing excessive carbon arising from carbonization reaction, argon, a mix gas of a hydrogen gas and a nitrogen gas, and a gas containing these gases and a trace amount of an oxygen gas are preferable. In the production process of the present invention, a nitrogen source contained in an organic substance can be used as a nitrogen source of the metal oxycarbonitride, and thus the thermal treatment atmosphere does not necessarily contain a nitrogen source.

The concentration of the oxygen gas to be added to the above gas, which depends on heating time and heating temperature, is preferably 0.01 to 10% by volume, more preferably 0.05 to 5% by volume. The oxygen concentration being within the range is preferable in terms of being able to form a uniform metal oxycarbonitride.

The pressure of the gas atmosphere is not particularly limited. In view of production stability, cost and the like, the thermal treatment may be performed under atmospheric pressure: under this condition, too, a preferable metal oxycarbonitride can be obtained.

With regard to the thermal treatment time of the mixture, the heating rate in the thermal treatment is not particularly limited. For example, the heating rate is preferably about 1° C./min to 100° C./min, more preferably 5° C./min to 50° C./min. The holding time after heating, in view of preferable carbonization and nitridation reactions, particle size of the metal oxycarbonitride and production cost and the like, is preferably 10 minutes to 5 hours, more preferably 30 minutes to 3 hours.

The transition metal oxycarbonitride is not particularly limited in terms of its shape as long as having a metal oxycarbonitride that has preferable compositional proportions of carbon, nitrogen and oxygen and having an activity as a fuel cell catalyst. Exemplary shapes are particulate shape, fibrous shape, sheet shape and porous structure.

The transition metal oxycarbonitride, when used as a fuel cell electrode catalyst, is required to have high conductivity and stability and high surface area. In view of this, during the above production process or after the above production process, the metal oxycarbonitride may be supported on a carrier.

The carrier is not particularly limited as long as having high conductivity and stability and having wide surface area. Examples thereof include carbon black, carbon nanotube, carbon nanofiber, porous carbon, carbon nanohorn, fullerene, graphite, graphene, black lead, conductive ceramic and porous conductive ceramic. The shape and size of the carrier is not particularly limited. In view of the activity of the metal oxycarbonitride to be supported, the carrier preferably has a particles diameter of 10 to 1000 nm, more preferably 10 to 100 nm.

When the transition metal oxycarbonitride is used as the catalyst (B), the transition metal oxycarbonitride may be used after disintegrated. Examples of the disintegrating method include methods using a roll-rotating mill, a ball mill, a medium-stirring mill, a gas stream pulverizing machine, a mortar and a disintegrating tank. Of these, in terms of allowing the transition metal oxycarbonitride to be finer particles, the method using a gas stream pulverizing machine is preferable. In terms of facilitating the treatment of the transition metal oxycarbonitride in small amount, the method using a mortar is preferable.

<Catalyst>

The transition metal oxycarbonitride obtained by the above production process is an oxycarbonitride of at least one transition metal, for example, selected from the group consisting of titanium, vanadium, chromium, manganese, iron, cobalt, nickel, copper, zinc, zirconium, niobium, molybdenum, tantalum and tungsten.

When the transition metal oxycarbonitride is subjected to measurement by powder X-ray diffraction method (Cu—Kα ray), at least one X-ray diffraction peak corresponding to a structure of an oxide, a carbide, a nitride, an oxynitride, an oxycarbide or an oxycarbonitride of a transition metal contained in the transition metal oxycarbonitride is observed.

The X-ray diffraction peak refers to a peak that is observed at a specific diffraction angle and a specific diffraction intensity when a sample (crystal) is irradiated with X-rays at various angles.

In the present invention, a signal that is detected with a signal (S) to noise (N) ratio (S/N) of 2 or more is regarded as a single diffraction peak.

Here, the noise (N) is the width of the baseline.

As an apparatus for X-ray diffraction measurement, for example, a powder X-ray analysis apparatus: RIGAKU RAD-RX is employable. The measurement can be performed under measurement conditions: X-ray output: (Cu—K=): 50 kV, 180 mA, scanning axis: θ/2θ, measurement range (2θ): 10° to 89.98°, measurement mode: FT, reading width: 0.02°, sampling time: 0.70 sec, DS, SS, RS: 0.5°, 0.5°, 0.15 mm, goniometer radius: 185 mm.

The compositional formula of the transition metal oxycarbonitride wherein the metal oxycarbonitride contains one kind of metal is represented by, for example, $mC_xN_yO_z$, wherein "m" is a transition metal element, "x","y" and "z" are each a proportion of the number of atoms; and $0<x\leq3$, $0<y\leq2$ and $0<z\leq3$.

The compositional formula of the transition metal oxycarbonitride wherein the metal oxycarbonitride contains two or more kinds of metals is represented by, for example, $m1_am2_bC_xN_yO_z$, wherein "m1" is one metal selected from the group consisting of titanium, vanadium, chromium, manganese, iron, cobalt, nickel, copper, zinc, zirconium, niobium, molybdenum, tantalum and tungsten; "m2" is at least one metal selected from the above group but differs from "m1"; "a", "b", "x", "y" and "z" are each a proportion of the number of atoms; and $0.5\leq a<1$, $0<b\leq0.5$, $0<x\leq3$, $0<y\leq2$, $0<z\leq3$ and $a+b=1$.

Thus, in the transition metal oxycarbonitride represented by the above compositional formula, there is at least one kind of metal occupying 50% or more of the number of all atoms of metals contained in this oxycarbonitride, i.e., a main metal. When two kinds of metals each occupy 50% of the number of all atoms, these two metals are each a main metal. This transition metal oxycarbonitride may consist of the main metal alone as a metal, or may comprise one or more kinds of metals other than the main metal. When two or more kinds of metals other than the main metal are contained, the proportions of the contents of these two or more kinds of metals are arbitrarily determined.

The proportion of the number of the atoms of each component being within the above range is preferable because the oxygen reduction potential tends to be increased.

The compositional formula of the transition metal oxycarbonitride can be determined by e.g., elemental analysis described later.

The transition metal oxycarbonitride produced by the above production process can be used as a catalyst. This catalyst can be suitably used particularly as a fuel cell catalyst. The catalyst comprising the transition metal oxycarbonitride obtained in the present invention may be a single compound or a mixture from which at least a transition metal, carbon, nitrogen and oxygen are detected when the catalyst is subjected to elemental analysis.

The use of the transition metal oxycarbonitride as the catalyst (B) sometimes involves the blending of an additive material for imparting conductivity, specific examples of which include carbon blacks, which are electron conductive particles, typified by VULCAN XC72 and ketjen black. When the present invention is carried out, the conductive particles are sometimes used. However, the catalyst comprising the transition metal oxycarbonitride obtained in the present invention, even without containing this "additive material for imparting conductivity", allows for the detection of carbon when subjected to elemental analysis.

The catalyst (B) preferably has an oxygen reduction onset potential as measured in accordance with the above-mentioned measurement method (A) of 0.5 V (vs. RHE) or more on the basis of a reversible hydrogen electrode.

The oxygen reduction current density of the catalyst (B) can be determined by a method as described below.

At first, from the result of the measurement method (A) described above, a difference between the reduction current under oxygen atmosphere and the reduction current under nitrogen atmosphere at 0.7 V (vs. RHE)) is calculated. The calculated value is divided by an area of the electrode to provide a value and this value is defined as an oxygen reduction current density ($mA/cm^2$).

Uses

The catalyst (A) and the catalyst (B) of the present invention can be used as a catalyst alternative to a platinum catalyst.

The fuel cell catalyst layer of the present invention comprises the catalyst (A) or the catalyst (B).

Fuel cell catalyst layers include anode catalyst layers and cathode catalyst layers. The catalyst (A) and the catalyst (B) may be used in anyone of these layers. Because the catalyst (A) and the catalyst (B) have excellent durability and high oxygen reducing activity, they are preferably used in cathode catalyst layers.

The fuel cell catalyst layer of the present invention preferably further comprises electron conductive powder. When the fuel cell catalyst layer comprising the catalyst (A) or the catalyst (B) further comprises the electron conductive powder, the reduction current can be more increased. It is considered that the electron conductive powder can increase the reduction current because of allowing the catalyst (A) or catalyst (B) to have an electrical bond that induces electrochemical reaction.

The electron conductive particles are usually used as a carrier of the catalyst.

The catalyst (A) has conductivity to some degree, but in order for the catalyst (A) to be given more electrons or in order for a reactant to receive many electrons from the catalyst (A), the catalyst (A), in order to be provided with conductivity, may have carrier particles mixed therein. The carrier particles may be added to the catalyst (A) produced after subjected to the step (1) to the step (3), or may be added in any stage of from the step (1) to the step (3).

Examples of materials of the electron conductive particles include carbon, conductive polymers, conductive ceramics, metals and conductive inorganic oxides such as tungsten oxide and iridium oxide. These materials can be used singly or in combination with one another. In particular, the electron conductive particles composed of carbon have a large specific surface area, and moreover those having a small particle diameter are easily available inexpensively. Furthermore, they are excellent in chemical resistance and high-potential resistance. Thus, preferred is carbon or a mixture of carbon and other electron conductive particles. That is, the fuel cell catalyst layer according to a preferred embodiment comprises the catalyst (A) or the catalyst (B) and carbon.

Examples of the carbon include carbon black, graphite, activated carbon, carbon nanotube, carbon nanofiber, carbon nanohorn, fullerene, porous carbon and graphene. If the particle diameter of the electron conductive particles composed of carbon is excessively small, an electron conductive path is not readily formed. If the particle diameter is excessively large, the fuel cell catalyst layer tends to have decreased gas diffusion properties, or the catalyst usage rate tends to be lowered. Therefore, the particle diameter of the electron conductive particles composed of carbon is preferably in the range of 10 to 1000 nm, and more preferably 10 to 100 nm.

When the electron conductive particles are composed of carbon, the weight ratio of the catalyst (A) or the catalyst (B) to the electron conductive particles (catalyst:electron conductive particles) is preferably 4:1 to 1000:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

The fuel cell catalyst layer according to a preferred embodiment further comprises a polymer electrolyte. The polymer electrolytes are not particularly limited as long as being those commonly used in fuel cell catalyst layers. Specific examples thereof include perfluorocarbon polymers having a sulfonic acid group (such as NAFION (registered trade mark), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, NAFION (registered trade mark) is preferable. An example of the source of NAFION (registered trade mark) in forming the fuel cell catalyst layer is a 5% NAFION (registered trade mark) solution (DE521) manufactured by DuPont.

The fuel cell catalyst layer of the present invention may be used as an anode catalyst layer or a cathode catalyst layer. The fuel cell catalyst layer of the present invention contains the catalyst that has high oxygen reducing activity and is resistant to corrosion in acidic electrolytes even at high potential. Accordingly, the catalyst layer of the present invention is suited for use as a catalyst layer provided in a cathode of a fuel cell (as a cathode catalyst layer). In particular, the catalyst layer is suitably provided particularly in a cathode of a membrane electrode assembly in a polymer electrolyte fuel cell.

The catalyst (A) or the catalyst (B) may be dispersed on the electron conductive particles serving as a carrier by methods such as airborne dispersion methods and in-liquid dispersion methods. The in-liquid dispersion methods are preferable because a dispersion of the catalyst (A) or the catalyst (B) and the electron conductive particles in a solvent can be used in the step for forming a fuel cell catalyst layer. Exemplary in-liquid dispersion methods include an orifice-choked flow method, a rotational shear flow method and an ultrasonic method. The solvents used in the in-liquid dispersion methods are not particularly limited as long as the catalysts or the electron conductive particles are not corroded and are dispersed therein. Volatile liquid organic solvents, water or the like are generally used.

When the catalyst (A) or the catalyst (B) is dispersed on the electron conductive particles, the electrolyte described above and a dispersant may be dispersed together.

The fuel cell catalyst layer may be formed by any methods without limitation. For example, a suspension containing the catalyst (A) or the catalyst (B), the electron conductive particles and the electrolyte may be applied to an electrolyte membrane or a gas diffusion layer as described later. The application methods include dipping, screen printing, roll coating and spraying. In another embodiment, a suspension containing the catalyst (A) or the catalyst (B), the electron conductive particles and the electrolyte may be applied or filtered on a substrate to form a fuel cell catalyst layer, and the catalyst layer may be transferred to an electrolyte membrane.

The electrode of the present invention comprises the fuel cell catalyst layer and a porous support layer.

The electrode of the present invention may be used as a cathode or an anode. The electrode of the present invention has excellent durability and high catalytic performance, and thus is suitably used as a cathode, leading to higher industrial advantage.

The porous support layer is a layer which diffuses gas (hereinafter, also referred to as a "gas diffusion layer"). The gas diffusion layer is not particularly limited as long as having electron conductivity, high gas diffusion properties and high corrosion resistance. Carbon-based porous materials such as carbon paper and carbon cloth, and stainless steel and anti-corrosive-coated aluminum foils for weight reduction are generally used.

The membrane electrode assembly of the present invention comprises a cathode, an anode and an electrolyte membrane interposed between the cathode and the anode. The cathode and/or the anode is the electrode as described above.

The electrolyte membranes may be generally perfluorosulfonic acid electrolyte membranes or hydrocarbon electrolyte membranes. Further, polymer microporous membranes impregnated with liquid electrolyte, or porous membranes filled with polymer electrolyte may be used.

The fuel cell of the present invention comprises the membrane electrode assembly as described above.

The electrode reaction in fuel cells takes place at a so-called three-phase interface (electrolyte-electrode catalyst-reaction gas). The fuel cells are classified according to the electrolytes used, into several types such as molten carbonate fuel cells (MCFC), phosphoric acid fuel cells (PAFC), solid oxide fuel cells (SOFC) and polymer electrolyte fuel cells (PEFC). In particular, the membrane electrode assembly of the present invention is preferably used in polymer electrolyte fuel cells.

The fuel cell comprising the catalyst (A) or the catalyst (B) of the present invention has high performance and is considerably inexpensive as compared with platinum catalysts. The use of the fuel cell of the present invention can improve performance of an article, particularly a mobile particle having a fuel cell and equipped with a function selected from the group consisting of electricity generating function, light emitting function, heat generating function, acoustic generating function, movement function, display function and charging function. The fuel cell is held preferably on a surface or an inside of the article.

Specific Examples of Articles Comprising the Fuel Cell of the Present Invention

Specific examples of articles comprising the fuel cell of the present invention include architectural structures such as buildings, houses and tents, illumination equipment such as fluorescent light, LED, organic EL, street light, interior illumination and traffic light, machinery, automotive devices including vehicles, household appliances, agricultural equipment, electronic devices, mobile information terminals including mobile phones, beauty instruments, portable tools, sanitary goods such as bathroom goods, furniture, toys, ornaments, bulletin boards, cool boxes, outdoor goods such as exterior generators, teaching materials, artificial flowers, items of artwork, power source for cardiac pacemakers and power source for heating and cooling equipped with Peltier devices.

EXAMPLES

The present invention will be described based on examples hereinbelow without limiting the scope of the present invention.

In Examples and Comparative Examples, measurements were performed by the following methods.
[Analytical Methods]
1. Powder X-ray Diffractometry Samples were subjected to powder X-ray diffractometry using Rotaflex manufactured by Rigaku Corporation.

With regard to the counting of diffraction peaks in the powder X-ray diffractometry for each sample, a signal that was detected with a signal (S) to noise (N) ratio (S/N) of 2 or more was regarded as a single peak.

The noise (N) was the width of the baseline.
2. Elemental Analysis

Carbon: Approximately 0.1 g of a sample was weighed and measured with EMIA-110 manufactured by HORIBA, Ltd.

Nitrogen and oxygen: Approximately 0.1 g of a sample was weighed, sealed in a Ni capsule, and was measured with an oxygen/nitrogen analyzer.

Transition metal elements (e.g., titanium): Approximately 0.1 g of a sample was weighed in a platinum plate, and was thermally decomposed using an acid. This thermally-decomposed product was collected to a constant volume and diluted, and quantitatively analyzed with ICP-MS.
3. BET Specific Surface Area 0.15 g of a sample was collected and its specific surface area was measured with a fully-automatic BET specific surface area measurement apparatus, Macsorb (manufactured by MOUNTECH CO., LTD.). The treatment time and the treatment temperature were set at 30 minutes and 200° C., respectively.

Example 1-1

1. Production of Catalyst 5 mL of titanium tetraisopropoxide (Junsei Chemical Co., Ltd.) and 5 mL of acetylacetone (Junsei Chemical Co., Ltd.) were added to a solution of 15 mL of ethanol (Wako Pure Chemical Industries, Ltd.) and 5 mL of acetic acid (Wako Pure Chemical Industries, Ltd.), and stirred at room temperature, to prepare a titanium-containing mixture solution. On the other hand, 2.507 g of glycine (Wako Pure Chemical Industries, Ltd.) was added to 20 mL of pure water, and stirred at room temperature and completely dissolved, to prepare a glycine-containing mixture solution. The titanium-containing mixture solution was slowly added to the glycine-containing mixture solution, to provide a transparent catalyst precursor solution. The catalyst precursor solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was finely and homogenously crushed with a mortar, to provide a powder.

This powder was introduced to a tubular furnace. The powder was heated to 900° C. under the atmosphere of a mixed gas of 4% by volume of hydrogen and nitrogen (a mixed gas of hydrogen gas: nitrogen gas=4% by volume: 96% by volume; this applies hereinafter) at a heating rate of 10° C./min, and was held at 900° C. for 1 hour, and then allowed to cool, to provide a powder (hereinafter also referred to as a "catalyst (1)" or a "thermally-treated product (1)").

The powder X-ray diffraction spectrum of the catalyst (1) is shown in FIG. 1. The diffraction peaks of a titanium compound having a cubic structure and titanium oxide having a rutile structure were observed.

The result of elemental analysis of the catalyst (1) is shown in Table 1. The presence of carbon, nitrogen and oxygen was confirmed.

The catalyst (1) had a BET specific surface area of 146 m$^2$/g.

Example 1-2

1. Production of Catalyst 5 mL of titanium tetraisopropoxide (manufactured by Junsei Chemical Co., Ltd.) and 5 mL of acetylacetone (manufactured by Junsei Chemical Co., Ltd.) were added to a solution of 15 mL of ethanol (manufactured by Wako Pure Chemical Industries, Ltd.) and 5 mL of acetic acid (manufactured by Wako Pure Chemical Industries, Ltd.), and stirred at room temperature, to prepare a titanium-containing mixture solution. On the other hand, 2.507 g of glycine (manufactured by Wako Pure Chemical Industries, Ltd.) and 0.153 g of iron acetate (manufactured by Aldrich) were added to 20 mL of pure water, and stirred at room temperature and completely dissolved, to prepare a glycine-containing mixture solution. The titanium-containing mixture solution was slowly added to the glycine-containing mixture solution, to provide a transparent catalyst precursor solution. The catalyst precursor solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was finely and homogenously crushed with a mortar, to provide a powder.

This powder was introduced to a tubular furnace. The powder was heated to 900° C. under the atmosphere of a mixed gas of 4% by volume of hydrogen and nitrogen at a heating rate of 10° C./min, and was held at 900° C. for 1 hour, and then allowed to cool, to provide a powder (hereinafter also referred to as a "catalyst (2)" or a "thermally-treated product (2)").

Figure 2:
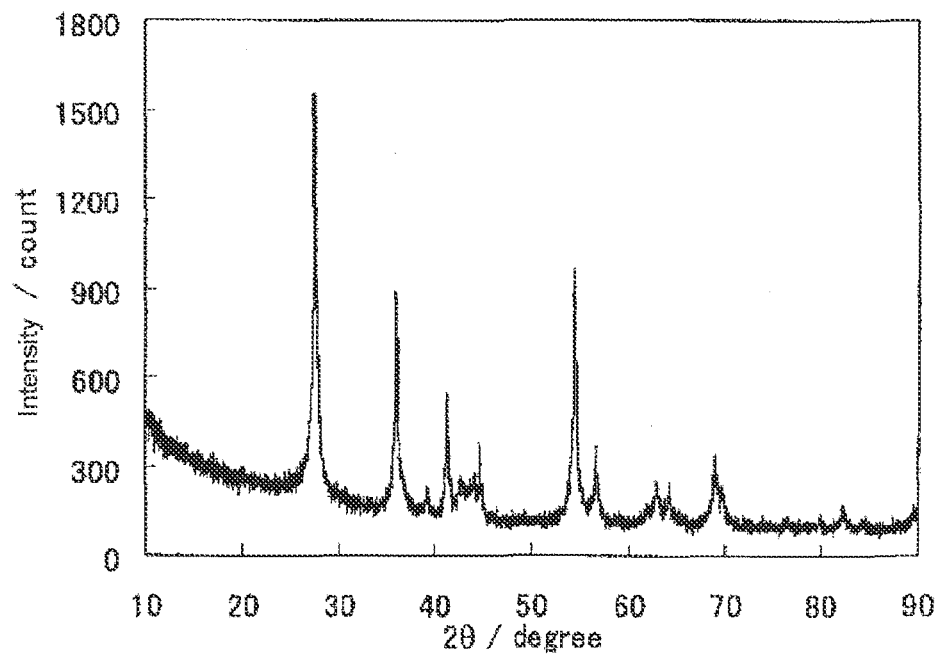
FIG. 2 is a powder X-ray diffraction spectrum of a catalyst (2) of Example 1-2.

The powder X-ray diffraction spectrum of the catalyst (2) is shown in FIG. 2. The diffraction peaks of a titanium compound having a cubic structure and titanium oxide having a rutile structure were observed.

The result of elemental analysis of the catalyst (2) is shown in Table 1. The presence of carbon, nitrogen and oxygen was confirmed.

The catalyst (2) had a BET specific surface area of 172 m$^2$/g.

Example 1-3

1. Production of catalyst 5 mL of titanium tetraisopropoxide (manufactured by Junsei Chemical Co., Ltd.) and 5 mL of acetylacetone (manufactured by Junsei Chemical Co., Ltd.) were added to a solution of 15 mL of ethanol (manufactured by Wako Pure Chemical Industries, Ltd.) and 5 mL of acetic acid (manufactured by Wako Pure Chemical Industries, Ltd.), and stirred at room temperature, to prepare a titanium-containing mixture solution. On the other hand, 2.507 g of glycine (manufactured by Wako Pure Chemical Industries, Ltd.) and 0.306 g of iron acetate (manufactured by Aldrich) were added to 20 mL of pure water, and stirred at room temperature and completely dissolved, to prepare a glycine-containing mixture solution. The titanium-containing mixture solution was slowly added to the glycine-containing mixture solution, to provide a transparent solution. The solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was finely and homogenously crushed with a mortar, to provide a powder.

This powder was introduced to a tubular furnace. The powder was heated to 900° C. under the atmosphere of an argon gas at a heating rate of 10° C./min, and was held at 900° C. for 1 hour, and then allowed to cool, to provide a powder (hereinafter also referred to as a "catalyst (3)").

Figure 3:
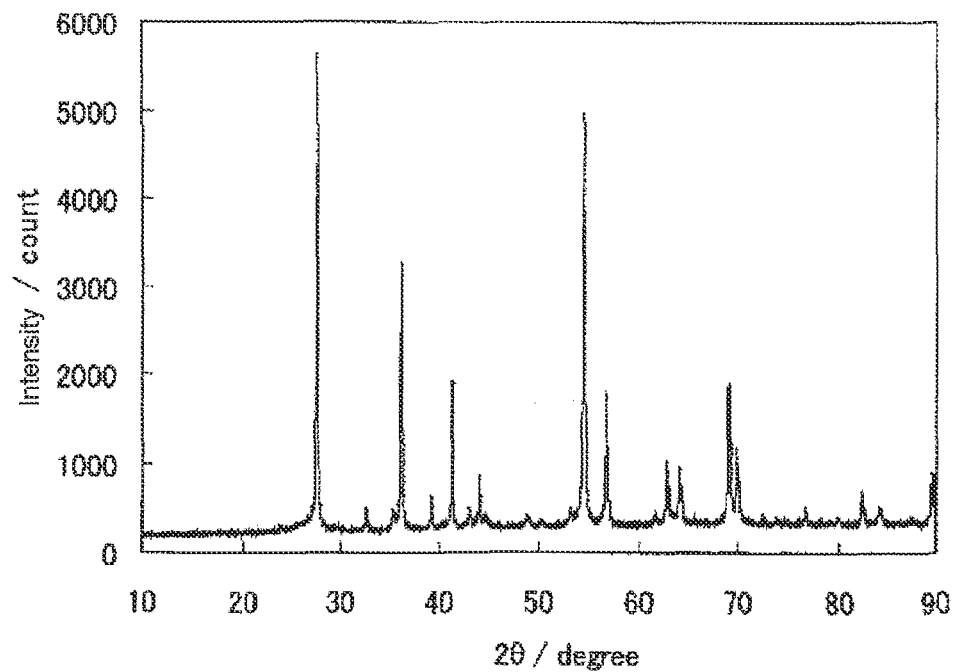
FIG. 3 is a powder X-ray diffraction spectrum of a catalyst (3) of Example 1-3.

The powder X-ray diffraction spectrum of the catalyst (3) is shown in FIG. 3. The diffraction peaks of a titanium compound having a cubic structure and titanium oxide having a rutile structure were observed.

The result of elemental analysis of the catalyst (3) is shown in Table 1. The presence of carbon, nitrogen and oxygen was confirmed.

The catalyst (3) had a BET specific surface area of 181 m$^2$/g.

Example 1-4

5 mL of titanium tetraisopropoxide (manufactured by Junsei Chemical Co., Ltd.) and 5 mL of acetylacetone (manufactured by Junsei Chemical Co., Ltd.) were added to a solution of 15 mL of ethanol (manufactured by Wako Pure Chemical Industries, Ltd.) and 5 mL of acetic acid (manufactured by Wako Pure Chemical Industries, Ltd.), and stirred at room temperature, to prepare a titanium-containing mixture solution. On the other hand, 1.254 g of glycine (manufactured by Wako Pure Chemical Industries, Ltd.) and 0.153 g of iron acetate (manufactured by Aldrich) were added to 20 mL of pure water, and stirred at room temperature and completely dissolved, to prepare a glycine-containing mixture solution. The titanium-containing mixture solution was slowly added to the glycine-containing mixture solution, to provide a transparent catalyst precursor solution. The catalyst precursor solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was finely and homogenously crushed with a mortar, to provide a powder.

This powder was introduced to a tubular furnace. The powder was heated to 800° C. under the atmosphere of an argon gas at a heating rate of 10° C./min, and was held at 800° C. for 1 hour, and then allowed to cool, to provide a powder (hereinafter also referred to as a "catalyst (4)").

Figure 4:
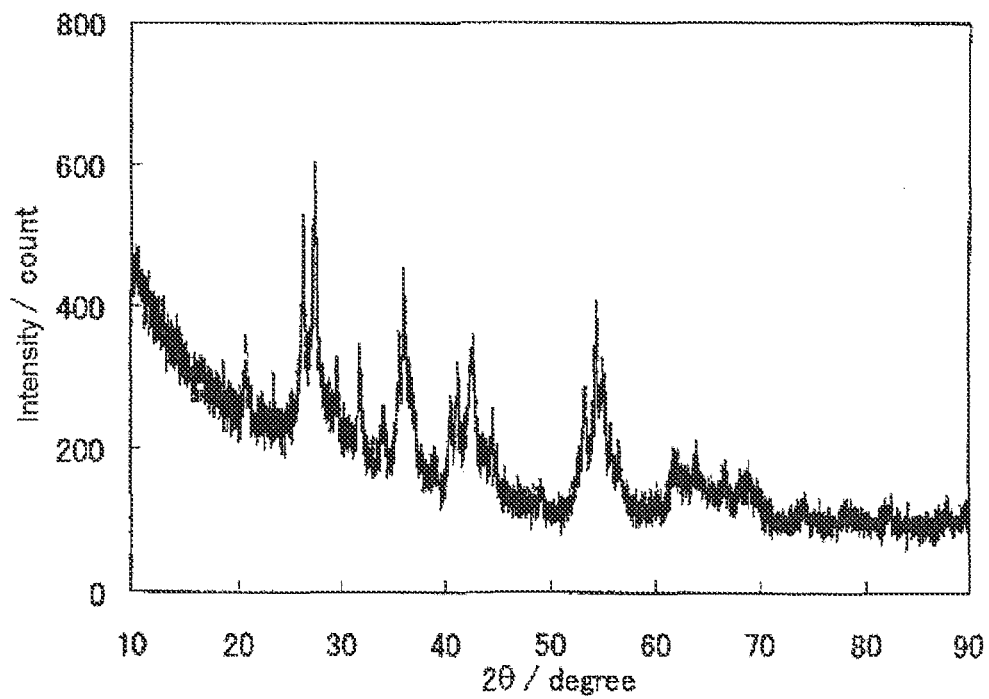
FIG. 4 is a powder X-ray diffraction spectrum of a catalyst (4) of Example 1-4.

The powder X-ray diffraction spectrum of the catalyst (4) is shown in FIG. 4. The diffraction peaks of a titanium compound having a cubic structure and titanium oxide having a rutile structure were observed.

The result of elemental analysis of the catalyst (4) is shown in Table 1. The presence of carbon, nitrogen and oxygen was confirmed.

The catalyst (4) had a BET specific surface area of 181 $m^2/g$.

Example 1-5

1. Production of Catalyst 5 mL of titanium tetraisopropoxide (manufactured by Junsei Chemical Co., Ltd.) and 5 mL of acetylacetone (manufactured by Junsei Chemical Co., Ltd.) were added to a solution of 15 mL of ethanol (manufactured by Wako Pure Chemical Industries, Ltd.) and 5 mL of acetic acid (manufactured by Wako Pure Chemical Industries, Ltd.), and stirred at room temperature, to prepare a titanium-containing mixture solution. On the other hand, 2.507 g of glycine (manufactured by Wako Pure Chemical Industries, Ltd.) was added to 20 mL of pure water, and stirred at room temperature and completely dissolved, to prepare a glycine-containing mixture solution. The titanium-containing mixture solution was slowly added to the glycine-containing mixture solution, to provide a transparent catalyst precursor solution. The catalyst precursor solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was finely and homogenously crushed with a mortar, to provide a powder.

This powder was introduced to a tubular furnace. The powder was heated to 500° C. under the atmosphere of 4% by volume of a hydrogen gas and a nitrogen gas at a heating rate of 10° C./min, and was held at 500° C. for 2 hours, and then allowed to cool, to provide a powder (hereinafter also referred to as a "catalyst (5)").

Figure 5:
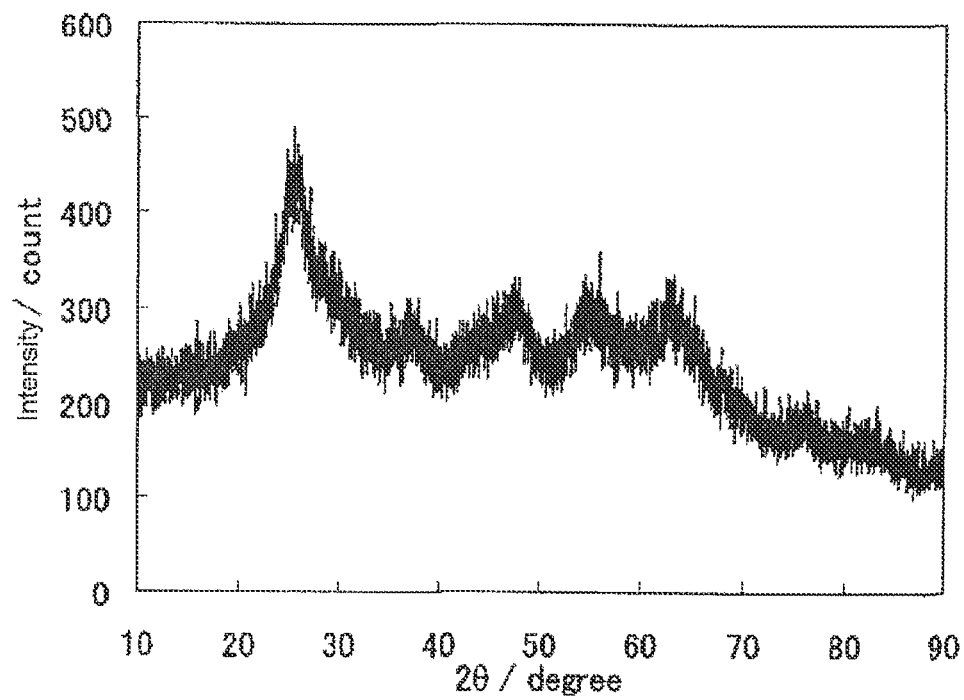
FIG. 5 is a powder X-ray diffraction spectrum of a catalyst (5) of Example 1-5.

The powder X-ray diffraction spectrum of the catalyst (5) is shown in FIG. 5. The diffraction peaks of a titanium compound having a cubic structure and titanium oxide having a rutile structure were observed.

The result of elemental analysis of the catalyst (5) is shown in Table 1. The presence of carbon, nitrogen and oxygen was confirmed.

The catalyst (5) had a BET specific surface area of 51 $m^2/g$.

Example 1-6

1. Production of catalyst 5 mL of titanium tetraisopropoxide (manufactured by Junsei Chemical Co., Ltd.) and 3 mL of acetylacetone (manufactured by Junsei Chemical Co., Ltd.) were added to a solution of 15 mL of ethanol (manufactured by Wako Pure Chemical Industries, Ltd.) and 5 mL of acetic acid (manufactured by Wako Pure Chemical Industries, Ltd.), and stirred at room temperature, to prepare a titanium containing mixture solution. On the other hand, 1.859 g of polyvinylpyrrolidone (manufactured by Aldrich) and 0.145 g of iron acetate (manufactured by Aldrich) were added to 15 mL of pure water, and stirred at room temperature and completely dissolved, to prepare a polyvinylpyrrolidone-containing mixture solution. The titanium containing mixture solution was slowly added to the polyvinylpyrrolidone-containing mixture solution, to provide a transparent catalyst precursor solution. The catalyst precursor solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was finely and homogenously crushed with a mortar, to provide a powder.

This powder was introduced to a tubular furnace. The powder was heated to 900° C. under the atmosphere of a nitrogen gas at a heating rate of 10° C./min, and was held at 900° C. for hours, and then allowed to cool, to provide a powder (hereinafter also referred to as a "catalyst (6)").

Figure 6:
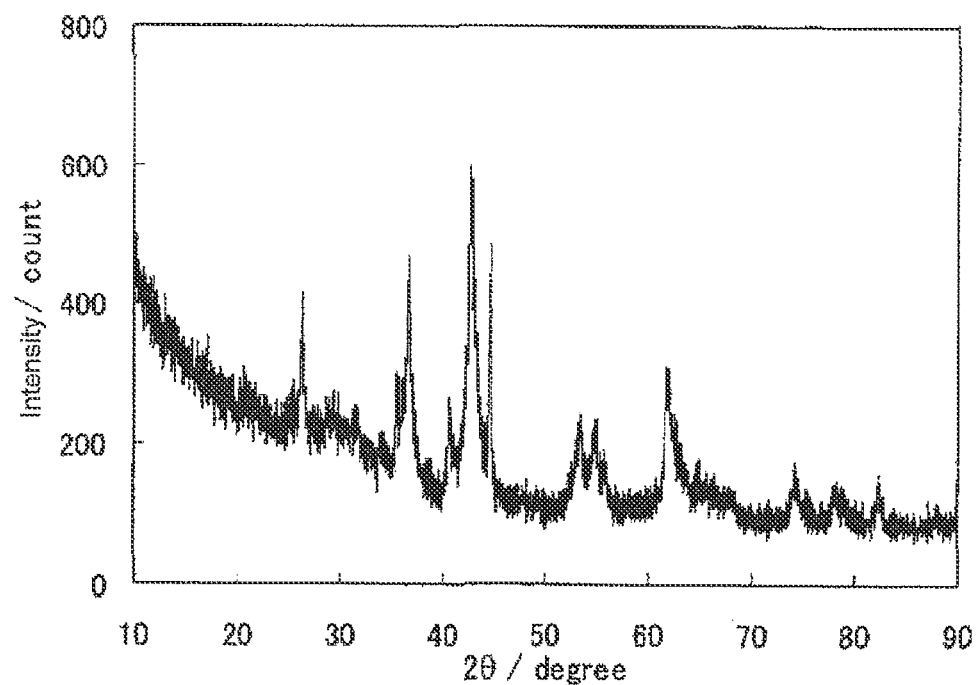
FIG. 6 is a powder X-ray diffraction spectrum of a catalyst (6) of Example 1-6.

The powder X-ray diffraction spectrum of the catalyst (6) is shown in FIG. 6. The diffraction peaks of a titanium compound having a cubic structure and titanium oxide having a rutile structure were observed.

The result of elemental analysis of the catalyst (6) is shown in Table 1. The presence of carbon, nitrogen and oxygen was confirmed.

The catalyst (6) had a BET specific surface area of 260 $m^2/g$.

Example 1-7

1. Production of Catalyst 5 mL of titanium tetraisopropoxide (manufactured by Junsei Chemical Co., Ltd.) was added to a solution of 15 mL of ethanol (manufactured by Wako Pure Chemical Industries, Ltd.) and 5 mL of acetic acid (manufactured by Wako Pure Chemical Industries, Ltd.), and stirred at room temperature, to prepare a titanium containing mixture solution. On the other hand, 1.859 g of polyvinylpyrrolidone (manufactured by Aldrich) and 0.145 g of iron acetate (manufactured by Aldrich) were added to 15 mL of pure water, and stirred at room temperature and completely dissolved, to prepare a polyvinylpyrrolidone-containing mixture solution. The titanium containing mixture solution was slowly added to the polyvinylpyrrolidone-containing mixture solution, to provide a transparent catalyst precursor solution. The catalyst precursor solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was finely and homogenously crushed with a mortar, to provide a powder.

This powder was introduced to a tubular furnace. The powder was heated to 600° C. under the atmosphere of a nitrogen gas at a heating rate of 10° C./min, and was held at 600° C. for 2 hours, and then allowed to cool, to provide a powder (hereinafter also referred to as a "catalyst (7)").

Figure 7:
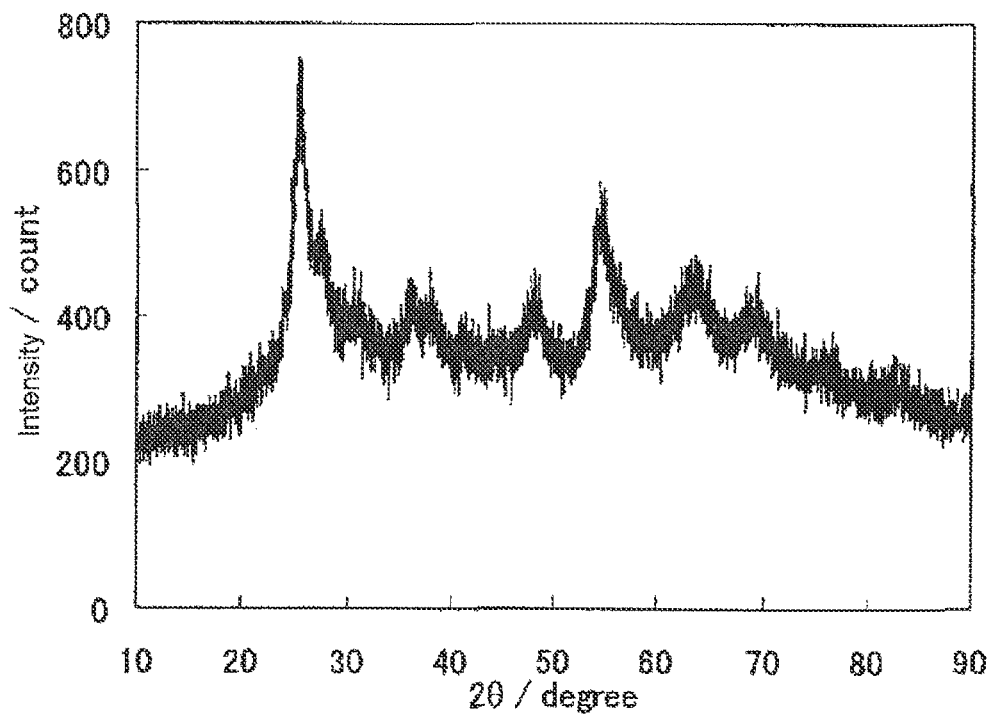
FIG. 7 is a powder X-ray diffraction spectrum of a catalyst (7) of Example 1-7.

The powder X-ray diffraction spectrum of the catalyst (7) is shown in FIG. 7. The diffraction peaks of a titanium compound having a cubic structure and titanium oxide having a rutile structure were observed.

The result of elemental analysis of the catalyst (7) is shown in Table 1. The presence of carbon, nitrogen and oxygen was confirmed.

The catalyst (7) had a BET specific surface area of 65 $m^2/g$.

Example 1-8

1. Production of Catalyst 5 mL of titanium tetraisopropoxide (manufactured by Junsei Chemical Co., Ltd.) and 5 mL of acetylacetone (manufactured by Junsei Chemical Co., Ltd.) were added to a solution of 15 mL of ethanol (manufactured by Wako Pure Chemical Industries, Ltd.) and 5 mL of acetic acid (manufactured by Wako Pure Chemical Industries, Ltd.), and stirred at room temperature, to prepare a titanium-containing mixture solution. On the other hand, 3.762 g of glycine (manufactured by Wako Pure Chemical Industries, Ltd.) and 0.306 g of iron acetate (manufactured by Aldrich) were added to 20 mL of pure water, and stirred at room temperature and completely dissolved, to prepare a glycine-containing mixture solution. The titanium-containing mixture solution was slowly added to the glycine-containing mixture solution, to provide a transparent catalyst precursor solution. The catalyst precursor solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was finely and homogenously crushed with a mortar, to provide a powder.

This powder was introduced to a tubular furnace. The powder was heated to 900° C. under the atmosphere of a mixed gas of 4% by volume of hydrogen and nitrogen at a heating rate of 10° C./min, and was held at 900° C. for 1 hour, and then allowed to cool, to provide a powder (hereinafter also referred to as a "catalyst (8)").

Figure 8:
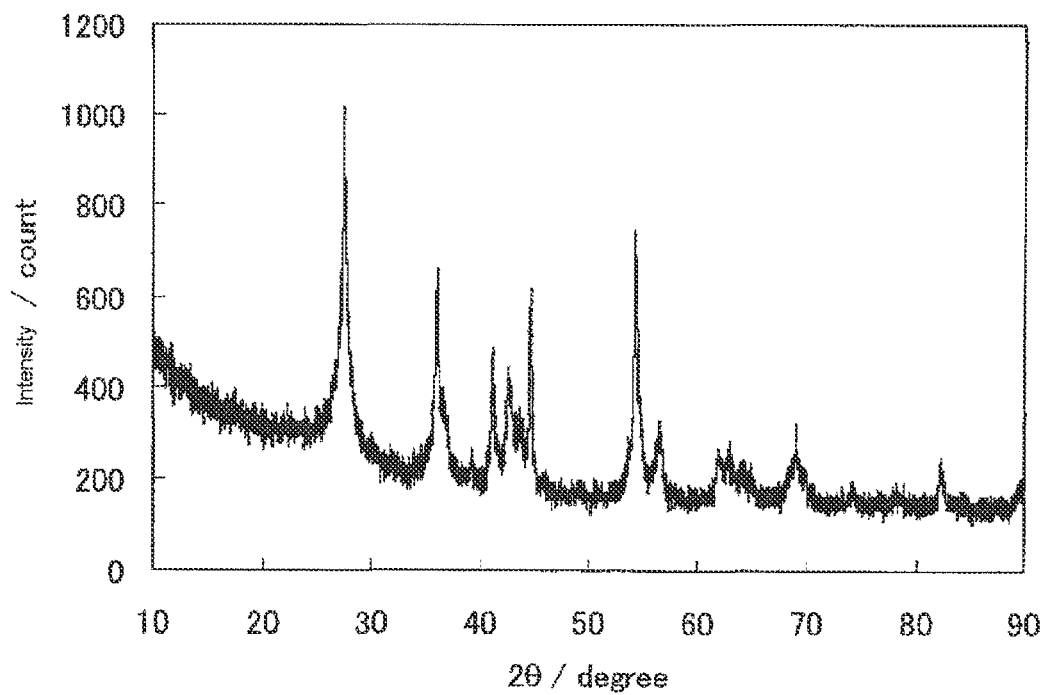
FIG. 8 is a powder X-ray diffraction spectrum of a catalyst (8) of Example 81-8.

The powder X-ray diffraction spectrum of the catalyst (8) is shown in FIG. 8. The diffraction peaks of a titanium compound having a cubic structure and titanium oxide having a rutile structure were observed.

The result of elemental analysis of the catalyst (8) is shown in Table 1. The presence of carbon, nitrogen and oxygen was confirmed.

The catalyst (8) had a BET specific surface area of 241 $m^2/g$.

Example 2-1

1. Production of Fuel Cell Electrode

The catalyst (2) in an amount of 0.095 g and carbon (XC-72 manufactured by Cabot Corporation) in an amount of 0.005 g were added to 10 g of a solution obtained by mixing isopropyl alcohol and pure water at a mass ratio between isopropyl alcohol and pure water of 2:1. The mixture was ultrasonically stirred to give a suspended mixture. 30 µl of this mixture was applied on a glassy carbon electrode (diameter: 5.2 mm, manufactured by Tokai Carbon Co., Ltd.) and was dried at 120° C. for 1 hour, thereby forming 1.0 mg or more of a fuel cell catalyst layer on the carbon electrode surface. Subsequently, 10 µl of NAFION (registered trade name) (a 5% NAFION (registered trade name) solution (DE521) manufactured by DuPont) diluted ten times with isopropyl alcohol was applied thereon and was dried at 120° C. for 1 hour. A fuel cell electrode (1) was thus obtained.

2. Evaluation of Oxygen Reducing Activity

The fuel cell electrode (1) prepared was polarized in a 0.5 mol/dm³ sulfuric acid solution at 30° C. under an oxygen atmosphere and a nitrogen atmosphere at a potential scanning rate of 5 mV/sec, thereby measuring a current-potential curve. As a reference electrode, a reversible hydrogen electrode was used in a sulfuric acid solution of the same concentration.

From the result of the above measurement, the potential at which the reduction current started to differ by 0.2 µA/cm² or more between the reduction current under the oxygen atmosphere and that under the nitrogen atmosphere was defined as an oxygen reduction onset potential. Further, a difference between the reduction current under oxygen atmosphere and the reduction current under nitrogen atmosphere at 0.7 V (vs. RHE) was calculated. The calculated value was divided by an area of the electrode to provide a value and this value was defined as an oxygen reduction current density (mA/cm²).

From the oxygen reduction onset potential and the oxygen reduction current density, the catalytic performance of the fuel cell electrode (1) prepared was evaluated.

The higher the oxygen reduction onset potential and the higher the oxygen reduction current density are, the higher the catalytic performance of the catalyst in the fuel cell electrode is.

Figure 9:
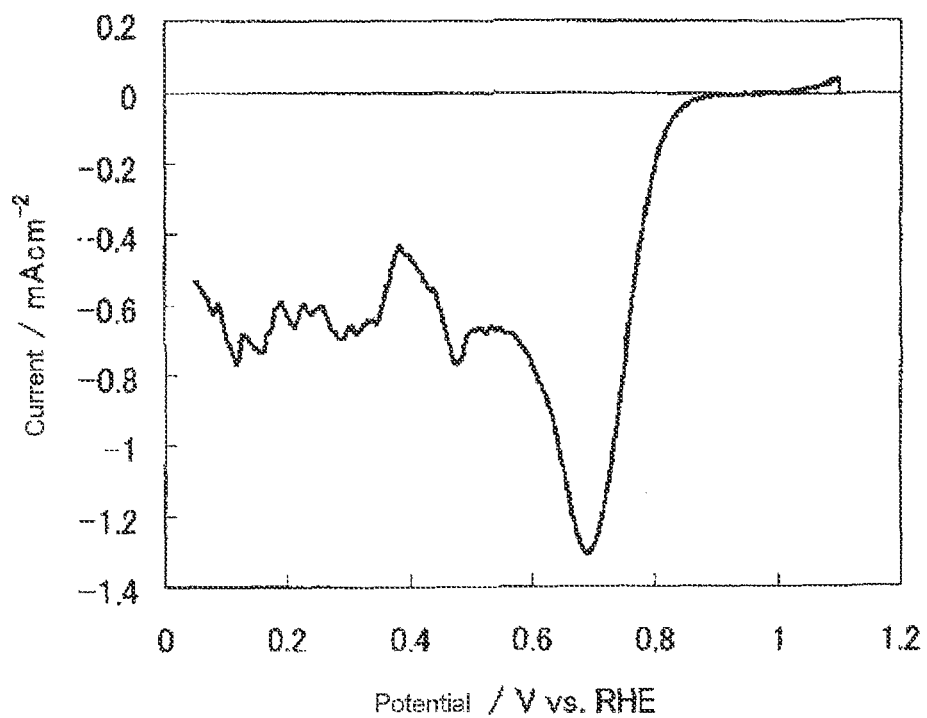
FIG. 9 shows a current-potential curve evaluating the oxygen reducing activity of a fuel cell electrode (1) of Example 2-1.

FIG. 9 shows the current-potential curve obtained in the above measurement.

The catalyst (2) prepared in Example 1-2 had an oxygen reduction onset potential of 1.01 V (vs. RHE) and an oxygen reduction current density of 1.28 mA/cm², and thus was found to have high catalytic performance (Table 2).

Example 2-2

1. Production of Fuel Cell Electrode

The catalyst (3) in an amount of 0.095 g and carbon (XC-72 manufactured by Cabot Corporation) in an amount of 0.005 g were added to 10 g of a solution obtained by mixing isopropyl alcohol and pure water at a mass ratio between isopropyl alcohol and pure water of 2:1. The mixture was ultrasonically stirred to give a suspended mixture. 30 µl of this mixture was applied on a glassy carbon electrode (diameter: 5.2 mm, manufactured by Tokai Carbon Co., Ltd.) and was dried at 120° C. for 1 hour, thereby forming 1.0 mg or more of a fuel cell catalyst layer on the carbon electrode surface. Subsequently, 10 µl of NAFION (registered trade name) (a 5% NAFION (registered trade name) solution (DE521) manufactured by DuPont) diluted ten times with isopropyl alcohol was applied thereon and was dried at 120° C. for 1 hour. A fuel cell electrode (2) was thus obtained.

2. Evaluation of Oxygen Reducing Activity

The fuel cell electrode (2) prepared was polarized in a 0.5 mol/dm³ sulfuric acid solution at 30° C. under an oxygen atmosphere and a nitrogen atmosphere at a potential scanning rate of 5 mV/sec, thereby measuring a current-potential curve. As a reference electrode, a reversible hydrogen electrode was used in a sulfuric acid solution of the same concentration.

From the result of the above measurement, the potential at which the reduction current started to differ by 0.2 µA/cm² or more between the reduction current under the oxygen atmosphere and that under the nitrogen atmosphere was defined as an oxygen reduction onset potential. Further, a difference between the reduction current under oxygen atmosphere and the reduction current under nitrogen atmosphere at 0.7 V (vs. RHE) was calculated. The calculated value was divided by an area of the electrode to provide a value and this value was defined as an oxygen reduction current density (mA/cm²).

From the oxygen reduction onset potential and the oxygen reduction current density, the catalytic performance of the fuel cell electrode (2) prepared was evaluated.

The higher the oxygen reduction onset potential and the higher the oxygen reduction current density are, the higher the catalytic performance of the catalyst in the fuel cell electrode is.

Figure 10:
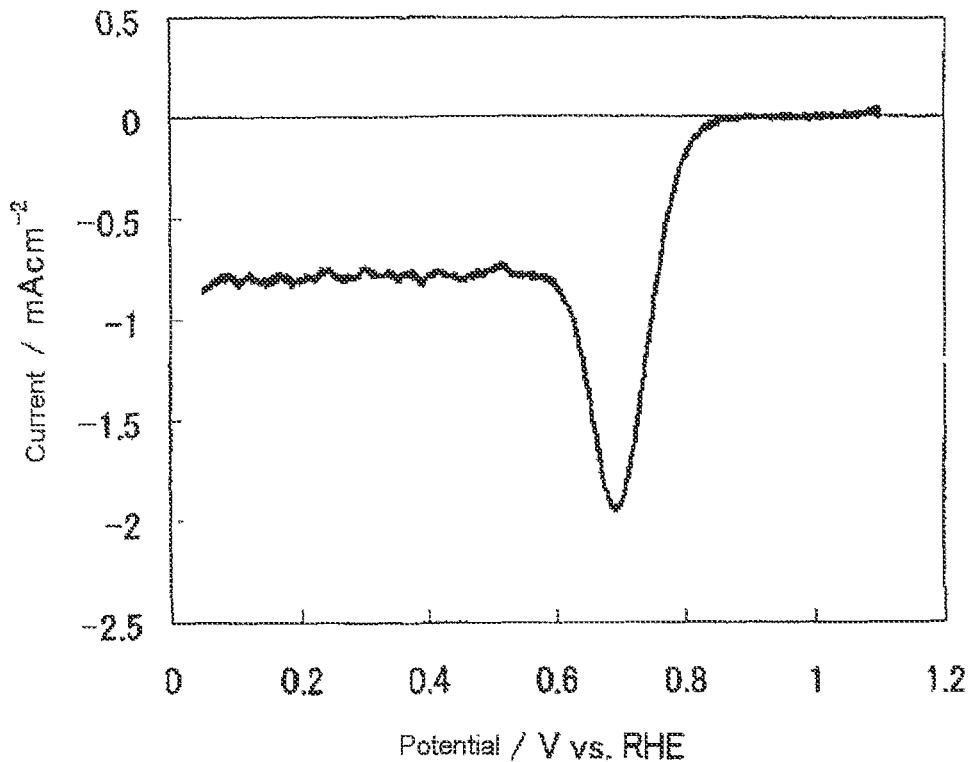
FIG. 10 shows a current-potential curve evaluating the oxygen reducing activity of a fuel cell electrode (2) of Example 2-2.

FIG. 10 shows the current-potential curve obtained in the above measurement.

The catalyst (3) prepared in Example 1-3 had an oxygen reduction onset potential of 1.01 V (vs. RHE) and an oxygen reduction current density of 1.90 mA/cm$^2$, and thus was found to have high catalytic performance (Table 2).

Example 2-3

1. Production of Fuel Cell Electrode

The catalyst (6) in an amount of 0.095 g and carbon (XC-72 manufactured by Cabot Corporation) in an amount of 0.005 g were added to 10 g of a solution obtained by mixing isopropyl alcohol and pure water at a mass ratio between isopropyl alcohol and pure water of 2:1. The mixture was ultrasonically stirred to give a suspended mixture. 30 µl of this mixture was applied on a glassy carbon electrode (diameter: 5.2 mm, manufactured by Tokai Carbon Co., Ltd.) and was dried at 120° C. for 1 hour, thereby forming 1.0 mg or more of a fuel cell catalyst layer on the carbon electrode surface. Subsequently, 10 µl of NAFION (registered trade name) (a 5% NAFION (registered trade name) solution (DE521) manufactured by DuPont) diluted ten times with isopropyl alcohol was applied thereon and was dried at 120° C. for 1 hour. A fuel cell electrode (3) was thus obtained.

2. Evaluation of Oxygen Reducing Activity

The fuel cell electrode (3) prepared was polarized in a 0.5 mol/dm$^3$ sulfuric acid solution at 30° C. under an oxygen atmosphere and a nitrogen atmosphere at a potential scanning rate of 5 mV/sec, thereby measuring a current-potential curve. As a reference electrode, a reversible hydrogen electrode was used in a sulfuric acid solution of the same concentration.

From the result of the above measurement, the potential at which the reduction current started to differ by 0.2 µA/cm$^2$ or more between the reduction current under the oxygen atmosphere and that under the nitrogen atmosphere was defined as an oxygen reduction onset potential. Further, a difference between the reduction current under oxygen atmosphere and the reduction current under nitrogen atmosphere at 0.7 V (vs. RHE) was calculated. The calculated value was divided by an area of the electrode to provide a value and this value was defined as an oxygen reduction current density (mA/cm$^2$).

From the oxygen reduction onset potential and the oxygen reduction current density, the catalytic performance of the fuel cell electrode (3) prepared was evaluated.

The higher the oxygen reduction onset potential and the higher the oxygen reduction current density are, the higher the catalytic performance of the catalyst in the fuel cell electrode is.

Figure 11:
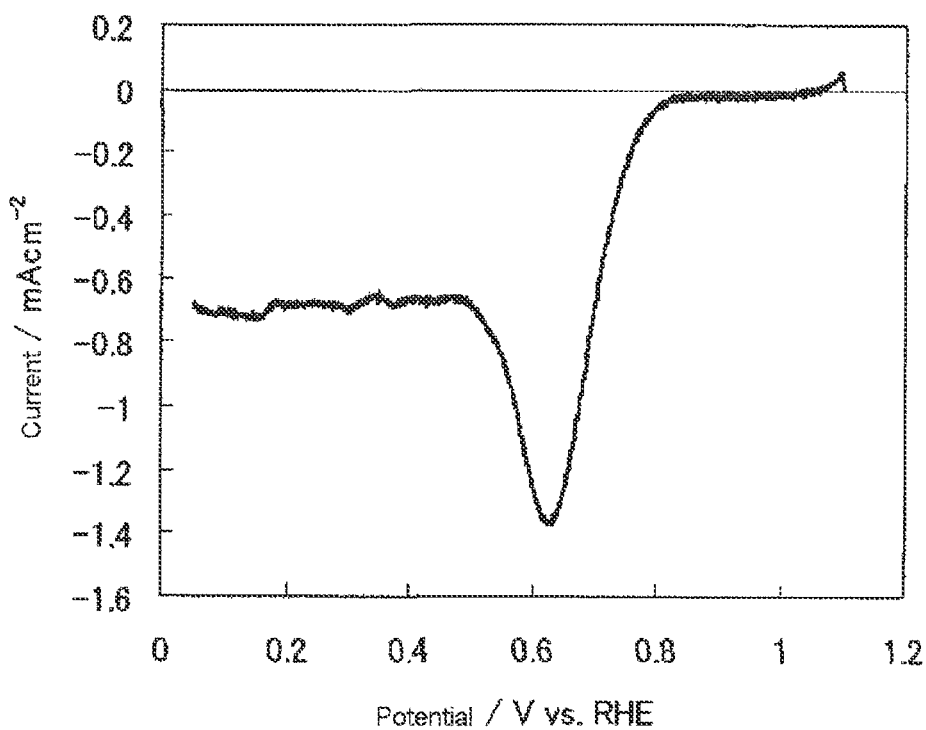
FIG. 11 shows a current-potential curve evaluating the oxygen reducing activity of a fuel cell electrode (3) of Example 2-3.

FIG. 11 shows the current-potential curve obtained in the above measurement.

The catalyst (6) prepared in Example 1-6 had an oxygen reduction onset potential of 1.04 V (vs. RHE) and an oxygen reduction current density of 0.68 mA/cm$^2$, and thus was found to have high catalytic performance (Table 2).

Example 2-4

1. Production of Fuel Cell Electrode

The catalyst (7) in an amount of 0.095 g and carbon (XC-72 manufactured by Cabot Corporation) in an amount of 0.005 g were added to 10 g of a solution obtained by mixing isopropyl alcohol and pure water at a mass ratio between isopropyl alcohol and pure water of 2:1. The mixture was ultrasonically stirred to give a suspended mixture. 30 µl of this mixture was applied on a glassy carbon electrode (diameter: 5.2 mm, manufactured by Tokai Carbon Co., Ltd.) and was dried at 120° C. for 1 hour, thereby forming 1.0 mg or more of a fuel cell catalyst layer on the carbon electrode surface. Subsequently, 10 µl of NAFION (registered trade name) (a 5% NAFION (registered trade name) solution (DE521) manufactured by DuPont) diluted ten times with isopropyl alcohol was applied thereon and was dried at 120° C. for 1 hour. A fuel cell electrode (4) was thus obtained.

2. Evaluation of Oxygen Reducing Activity

The fuel cell electrode (4) prepared was polarized in a 0.5 mol/dm$^3$ sulfuric acid solution at 30° C. under an oxygen atmosphere and a nitrogen atmosphere at a potential scanning rate of 5 mV/sec, thereby measuring a current-potential curve. As a reference electrode, a reversible hydrogen electrode was used in a sulfuric acid solution of the same concentration.

From the result of the above measurement, the potential at which the reduction current started to differ by 0.2 µA/cm$^2$ or more between the reduction current under the oxygen atmosphere and that under the nitrogen atmosphere was defined as an oxygen reduction onset potential. Further, a difference between the reduction current under oxygen atmosphere and the reduction current under nitrogen atmosphere at 0.7 V (vs. RHE) was calculated. The calculated value was divided by an area of the electrode to provide a value and this value was defined as an oxygen reduction current density (mA/cm$^2$).

From the oxygen reduction onset potential and the oxygen reduction current density, the catalytic performance of the fuel cell electrode (4) prepared was evaluated.

The higher the oxygen reduction onset potential and the higher the oxygen reduction current density are, the higher the catalytic performance of the catalyst in the fuel cell electrode is.

Figure 12:
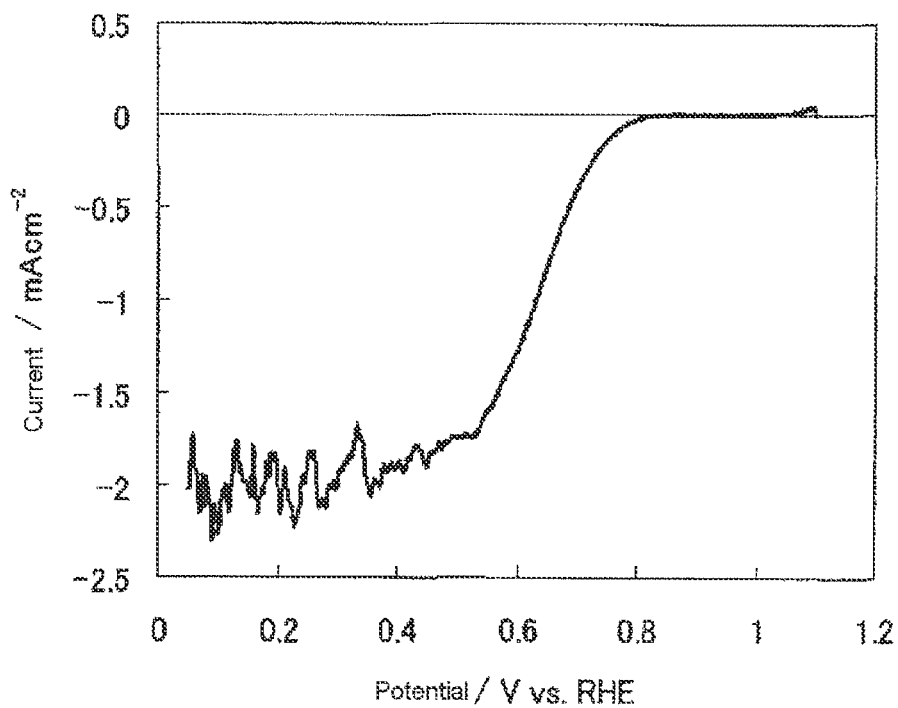
FIG. 12 shows a current-potential curve evaluating the oxygen reducing activity of a fuel cell electrode (4) of Example 2-4.

FIG. 12 shows the current-potential curve obtained in the above measurement.

The catalyst (7) prepared in Example 1-7 had an oxygen reduction onset potential of 0.82 V (vs. RHE) and an oxygen reduction current density of 0.4 mA/cm$^2$, and thus was found to have high catalytic performance (Table 2).

Example 2-5

1. Production of Fuel Cell Electrode

The catalyst (8) in an amount of 0.095 g and carbon (XC-72 manufactured by Cabot Corporation) in an amount of 0.005 g were added to 10 g of a solution obtained by mixing isopropyl alcohol and pure water at a mass ratio between isopropyl alcohol and pure water of 2:1. The mixture was ultrasonically stirred to give a suspended mixture. 30 µl of this mixture was applied on a glassy carbon electrode (diameter: 5.2 mm, manufactured by Tokai Carbon Co., Ltd.) and was dried at 120° C. for 1 hour, thereby forming 1.0 mg or more of a fuel cell catalyst layer on the carbon electrode surface. Subsequently, 10 µl of NAFION (registered trade name) (a 5% NAFION (registered trade name) solution (DE521) manufactured by DuPont) diluted ten times with isopropyl alcohol was applied thereon and was dried at 120° C. for 1 hour. A fuel cell electrode (5) was thus obtained.

2. Evaluation of Oxygen Reducing Activity

The fuel cell electrode (5) prepared was polarized in a 0.5 mol/dm$^3$ sulfuric acid solution at 30° C. under an oxygen atmosphere and a nitrogen atmosphere at a potential scanning rate of 5 mV/sec, thereby measuring a current-potential curve. As a reference electrode, a reversible hydrogen electrode was used in a sulfuric acid solution of the same concentration.

From the result of the above measurement, the potential at which the reduction current started to differ by 0.2 µA/cm$^2$ or more between the reduction current under the oxygen atmosphere and that under the nitrogen atmosphere was defined as an oxygen reduction onset potential. Further, a difference between the reduction current under oxygen atmosphere and the reduction current under nitrogen atmosphere at 0.7 V (vs. RHE) was calculated. The calculated value was divided by an area of the electrode to provide a value and this value was defined as an oxygen reduction current density (mA/cm$^2$).

From the oxygen reduction onset potential and the oxygen reduction current density, the catalytic performance of the fuel cell electrode (5) prepared was evaluated.

The higher the oxygen reduction onset potential and the higher the oxygen reduction current density are, the higher the catalytic performance of the catalyst in the fuel cell electrode is.

Figure 13:
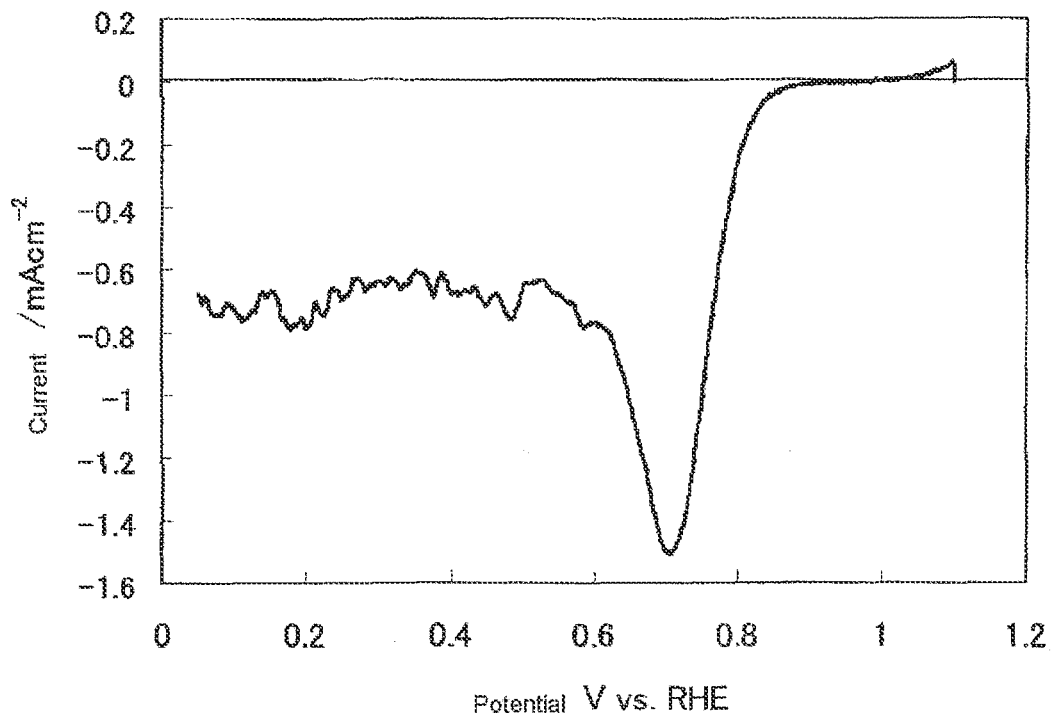
FIG. 13 shows a current-potential curve evaluating the oxygen reducing activity of a fuel cell electrode (5) of Example 2-5.
Figure 14:
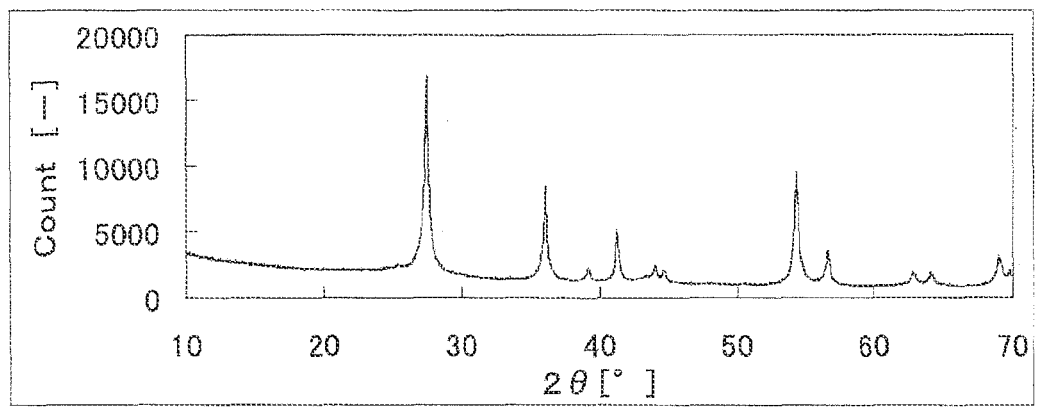
FIG. 14 is a powder X-ray diffraction spectrum of a catalyst of Example 3-1.
Figure 15:
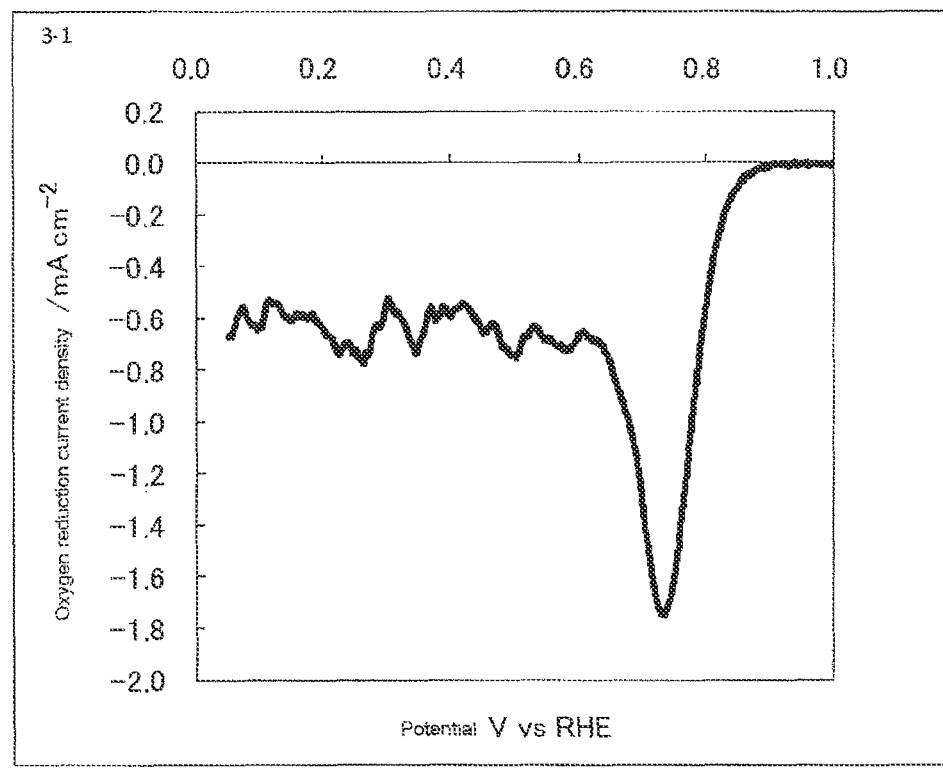
FIG. 15 shows an oxygen reduction current density potential curve evaluating the oxygen reducing activity of a fuel cell electrode of Example 3-1.
Figure 16:
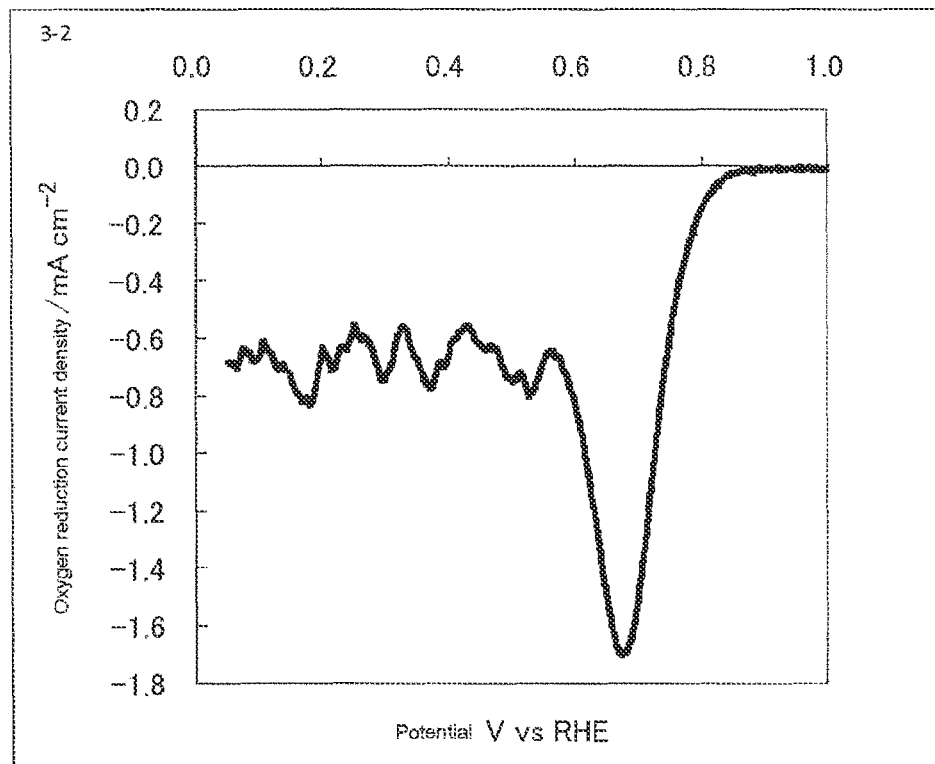
FIG. 16 shows an oxygen reduction current density potential curve evaluating the oxygen reducing activity of a fuel cell electrode of Example 3-2.
Figure 17:
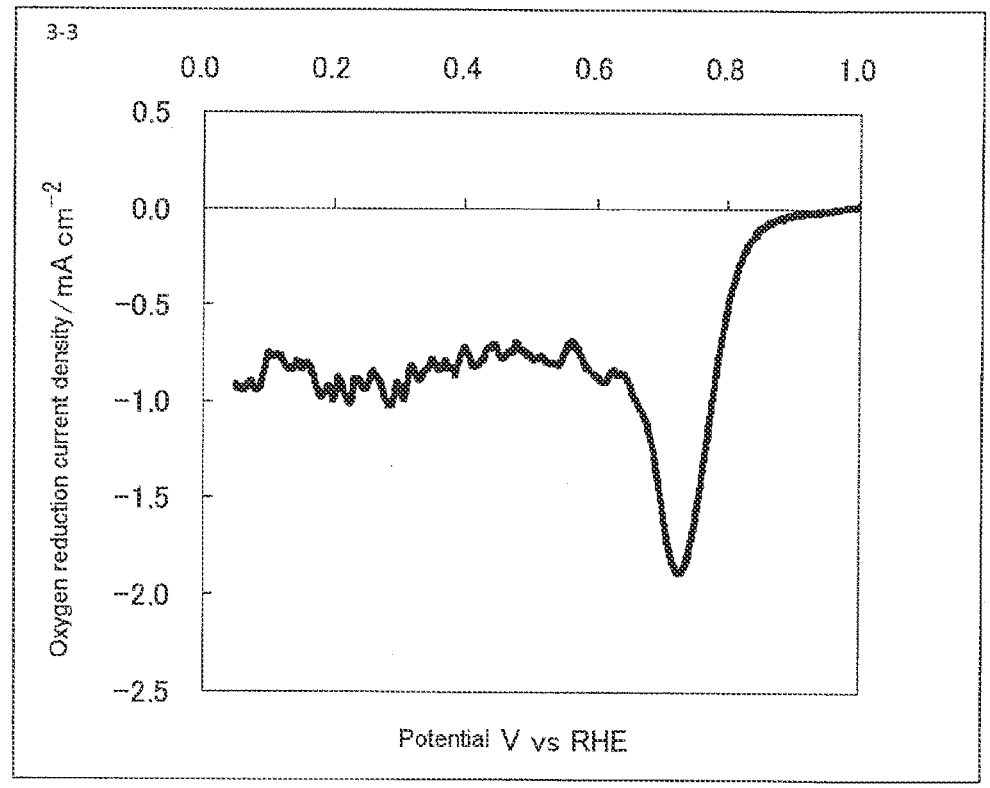
FIG. 17 shows an oxygen reduction current density potential curve evaluating the oxygen reducing activity of a fuel cell electrode of Example 3-3.
Figure 18:
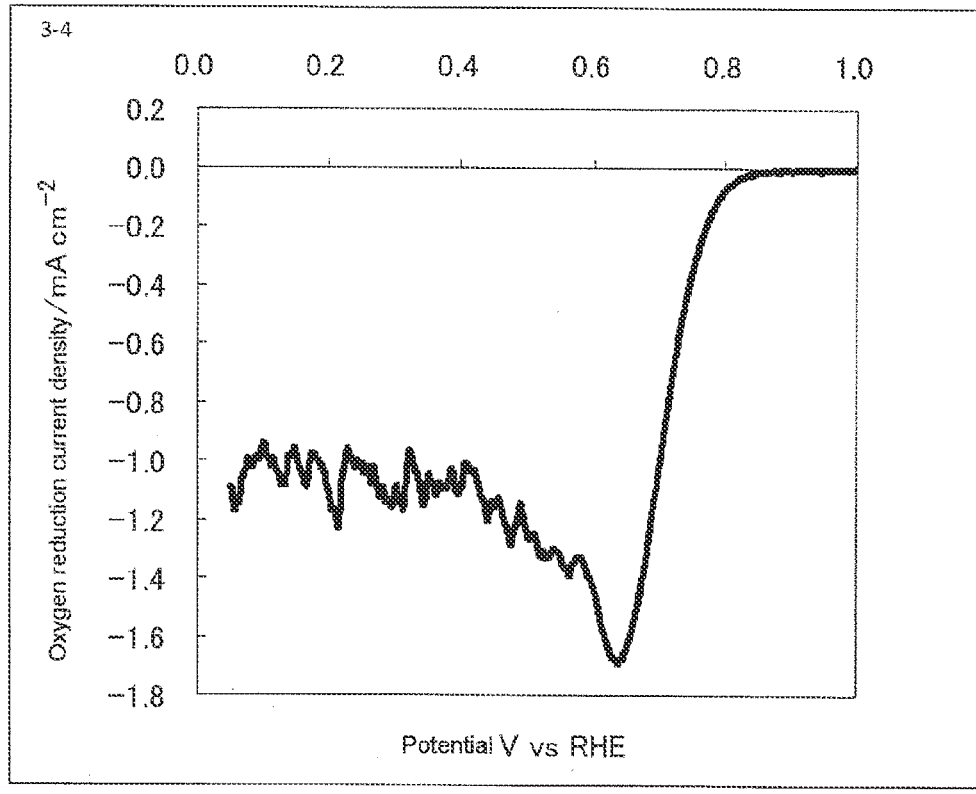
FIG. 18 shows an oxygen reduction current density potential curve evaluating the oxygen reducing activity of a fuel cell electrode of Example 3-4.
Figure 19:
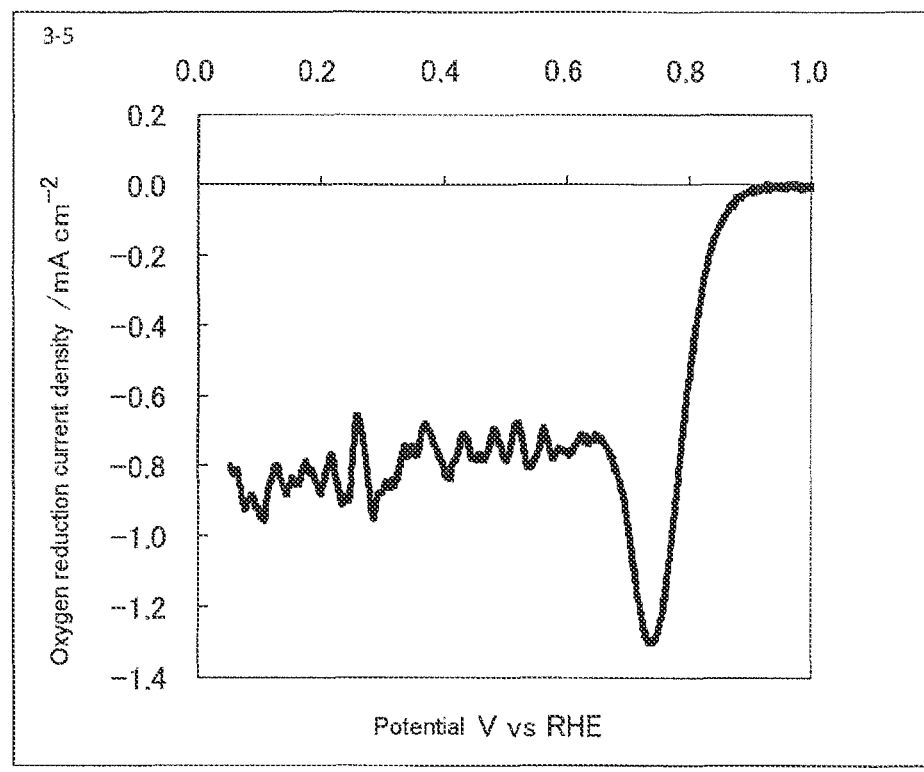
FIG. 19 shows an oxygen reduction current density potential curve evaluating the oxygen reducing activity of a fuel cell electrode of Example 3-5.
Figure 20:
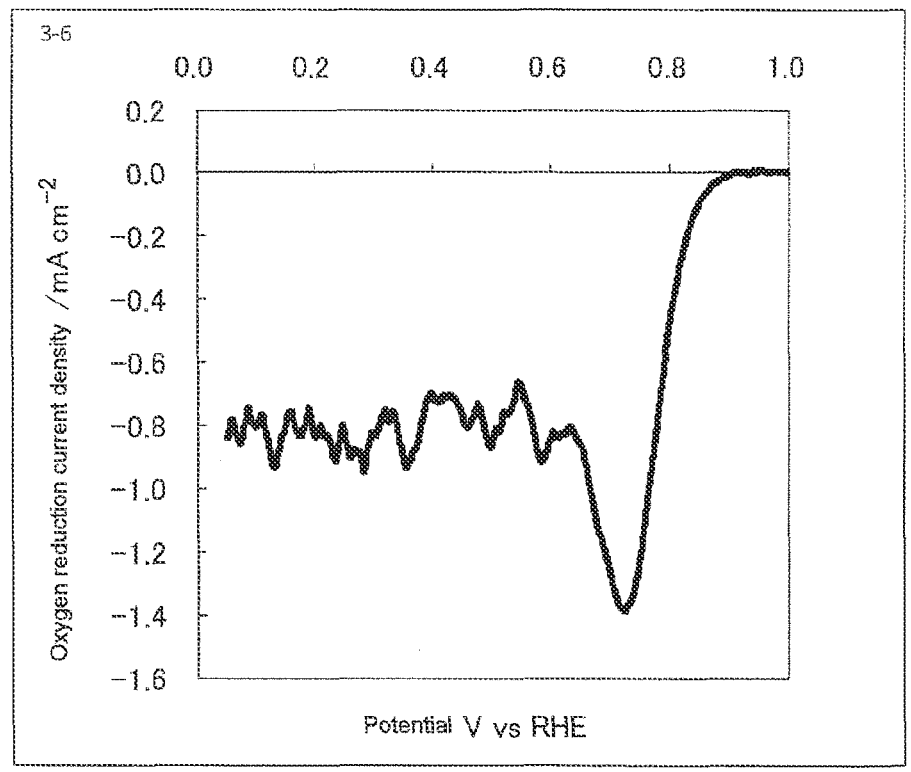
FIG. 20 shows an oxygen reduction current density potential curve evaluating the oxygen reducing activity of a fuel cell electrode of Example 3-6.
Figure 21:
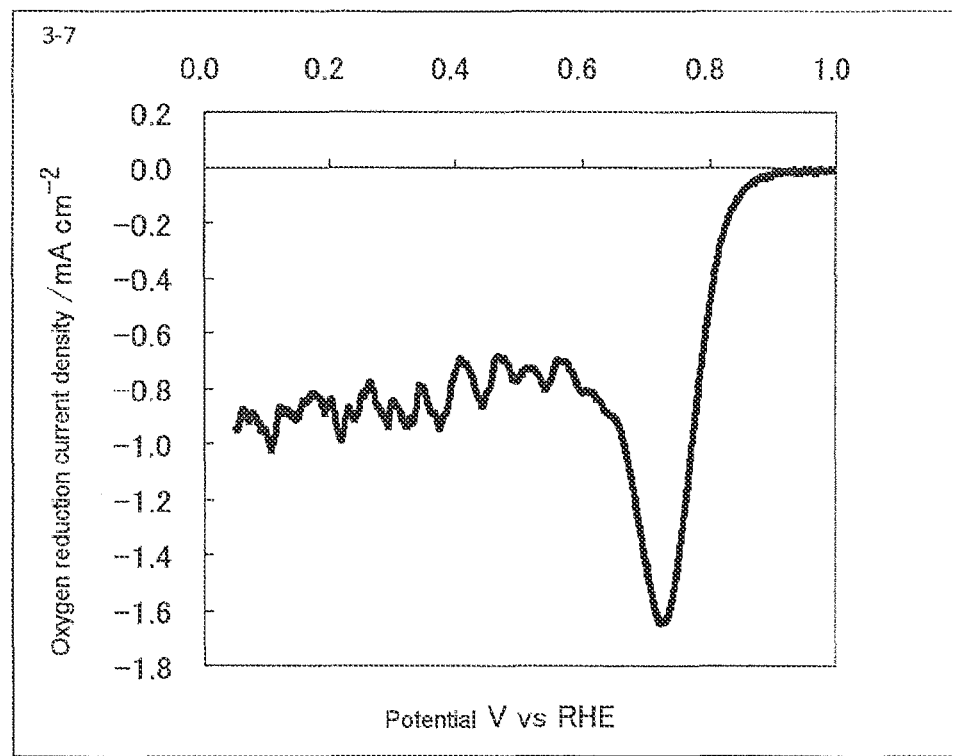
FIG. 21 shows an oxygen reduction current density potential curve evaluating the oxygen reducing activity of a fuel cell electrode of Example 3-7.
Figure 22:
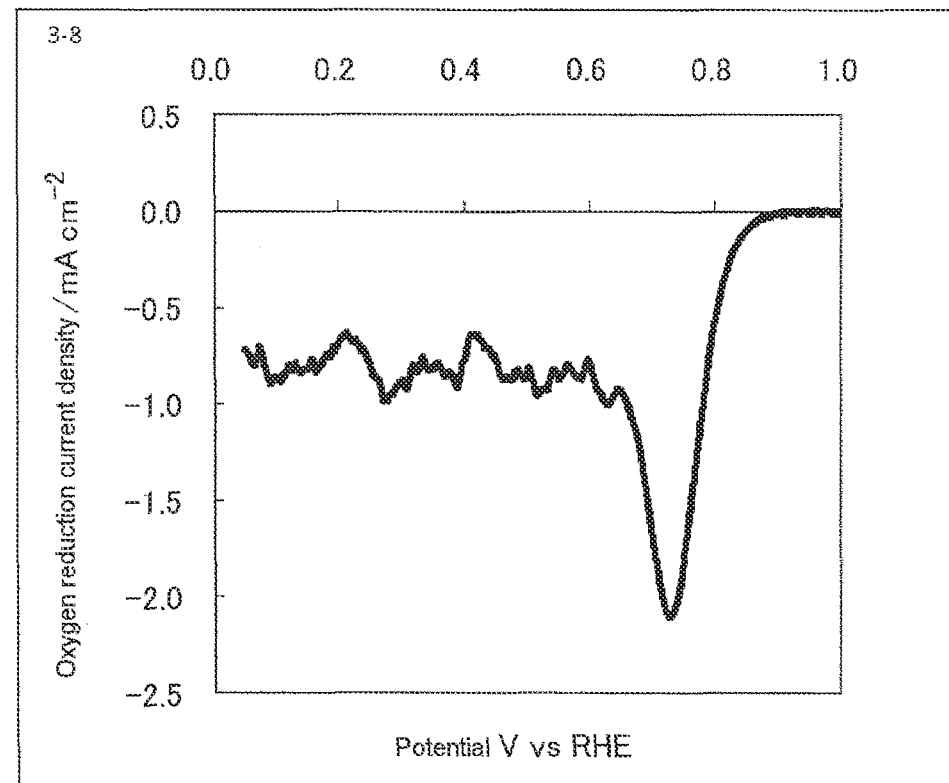
FIG. 22 shows an oxygen reduction current density potential curve evaluating the oxygen reducing activity of a fuel cell electrode of Example 3-8.
Figure 23:
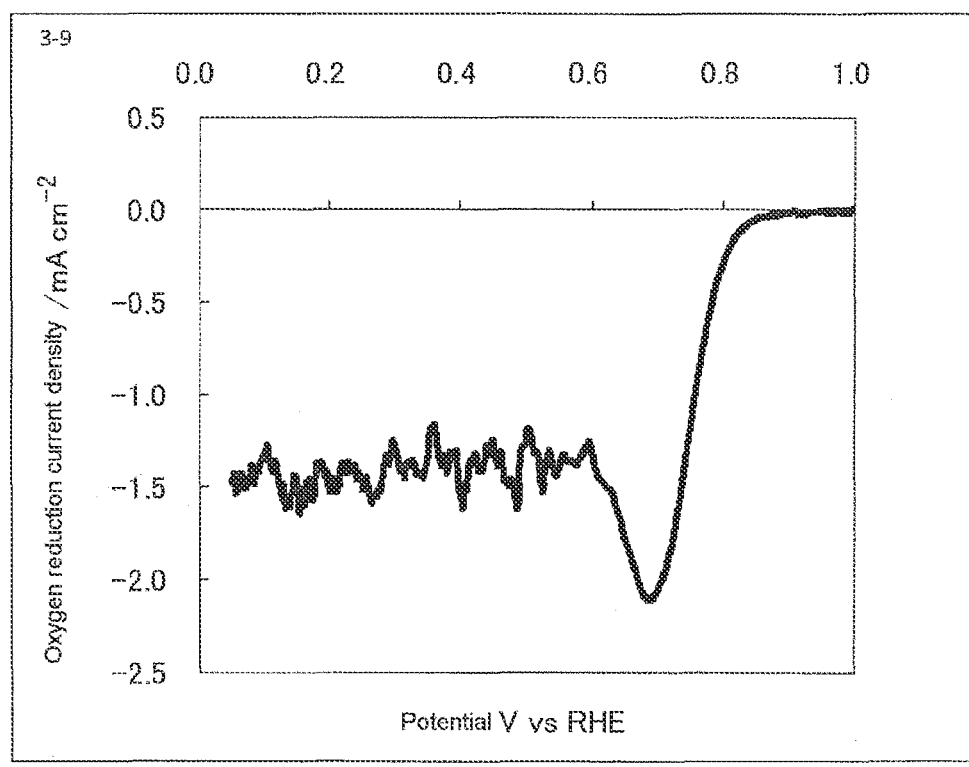
FIG. 23 shows an oxygen reduction current density potential curve evaluating the oxygen reducing activity of a fuel cell electrode of Example 3-9.
Figure 24:
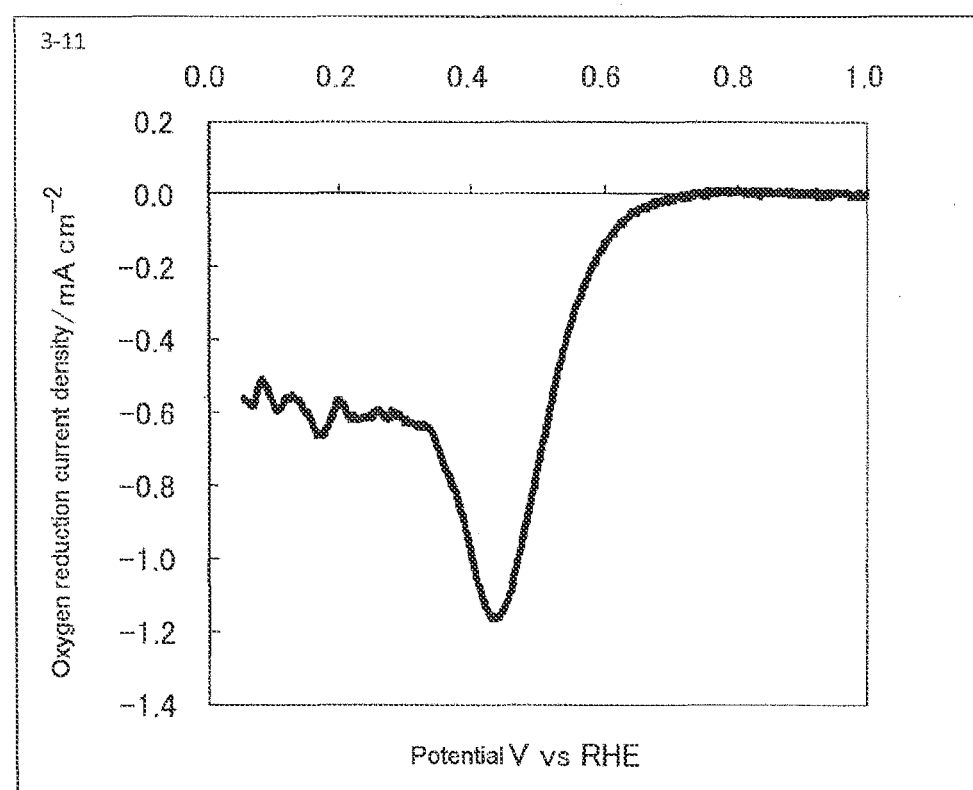
FIG. 24 shows an oxygen reduction current density potential curve evaluating the oxygen reducing activity of a fuel cell electrode of Example 3-11.
Figure 25:
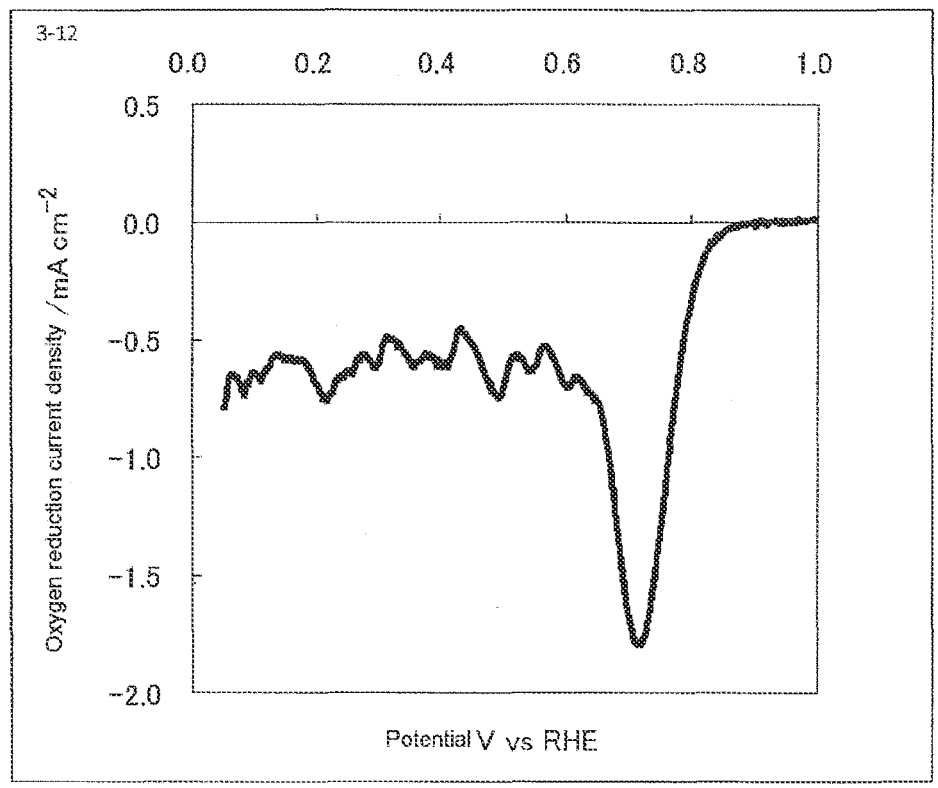
FIG. 25 shows an oxygen reduction current density potential curve evaluating the oxygen reducing activity of a fuel cell electrode of Example 3-12.
Figure 26:
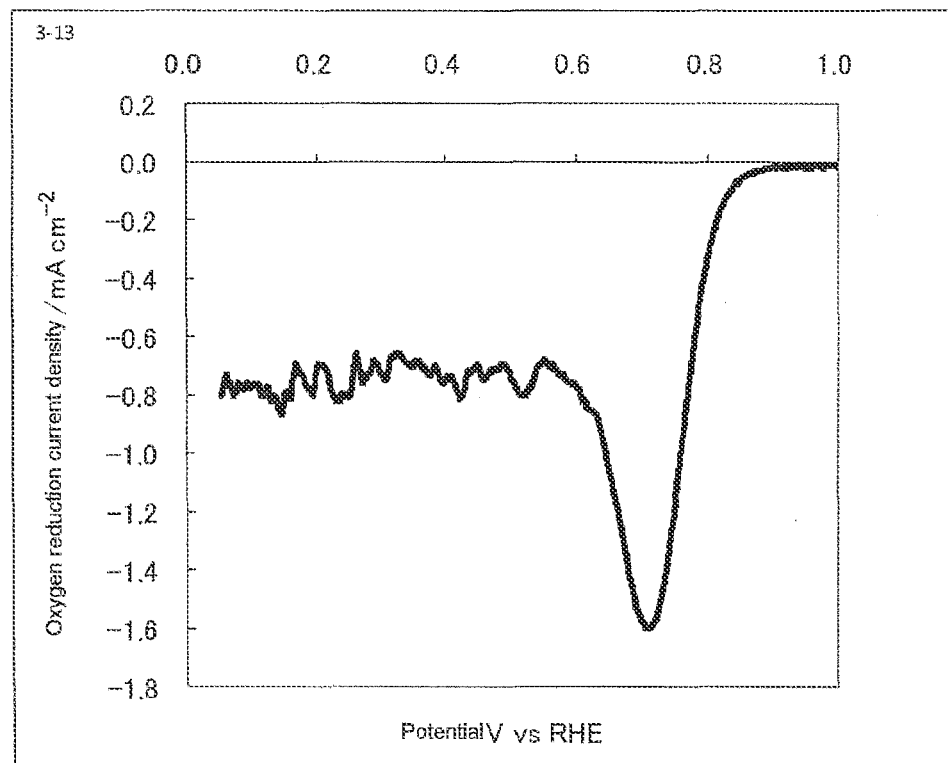
FIG. 26 shows an oxygen reduction current density potential curve evaluating the oxygen reducing activity of a fuel cell electrode of Example 3-13.
Figure 27:
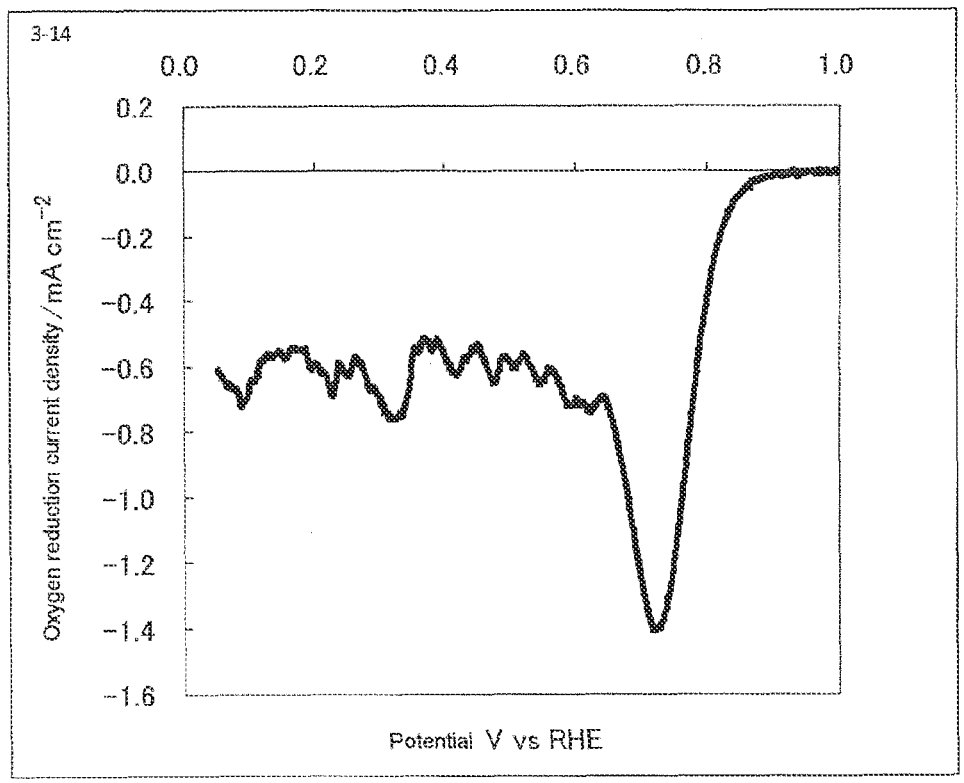
FIG. 27 shows an oxygen reduction current density potential curve evaluating the oxygen reducing activity of a fuel cell electrode of Example 3-14.
Figure 28:
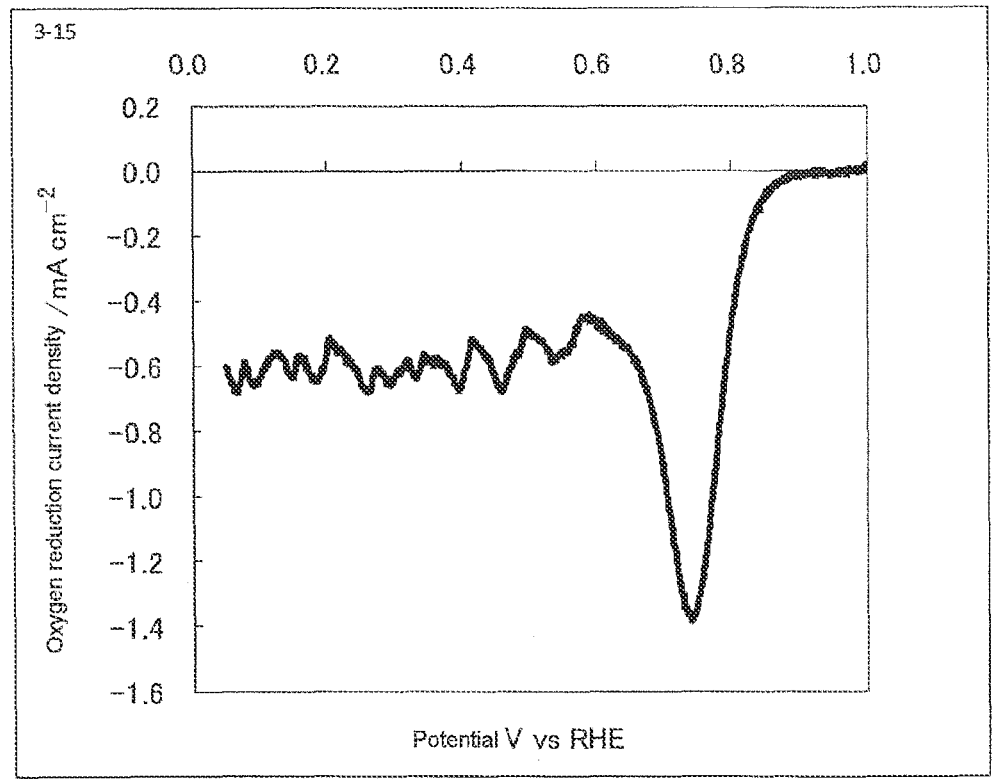
FIG. 28 shows an oxygen reduction current density potential curve evaluating the oxygen reducing activity of a fuel cell electrode of Example 3-15.
Figure 29:
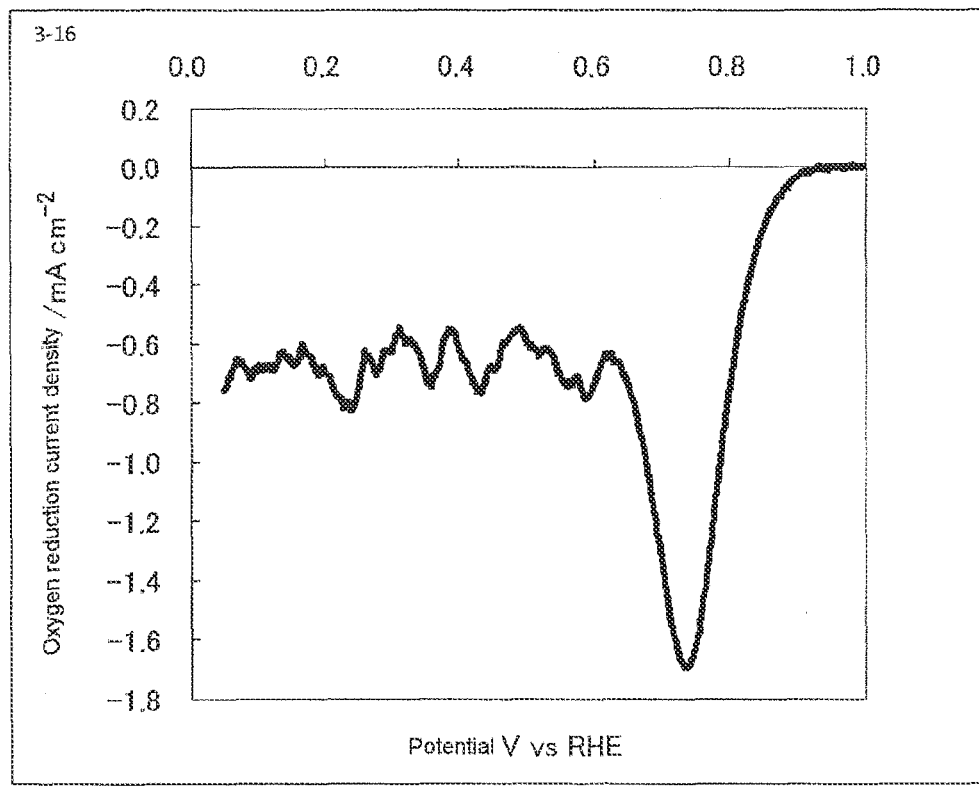
FIG. 29 shows an oxygen reduction current density potential curve evaluating the oxygen reducing activity of a fuel cell electrode of Example 3-16.
Figure 30:
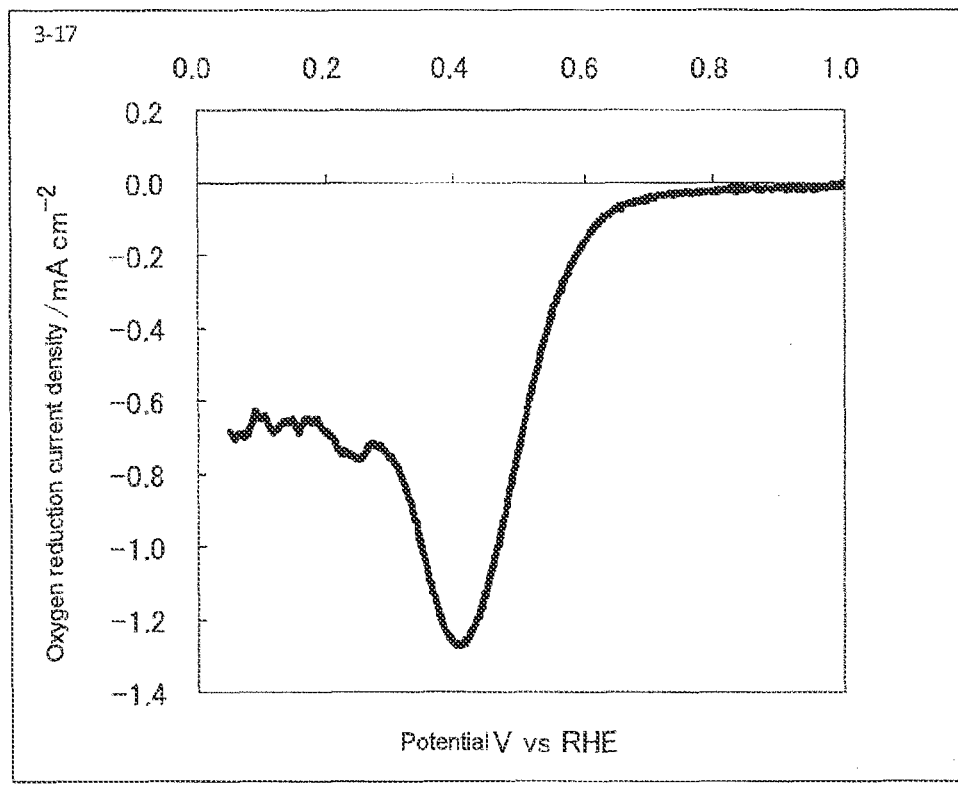
FIG. 30 shows an oxygen reduction current density potential curve evaluating the oxygen reducing activity of a fuel cell electrode of Example 3-17.
Figure 31:
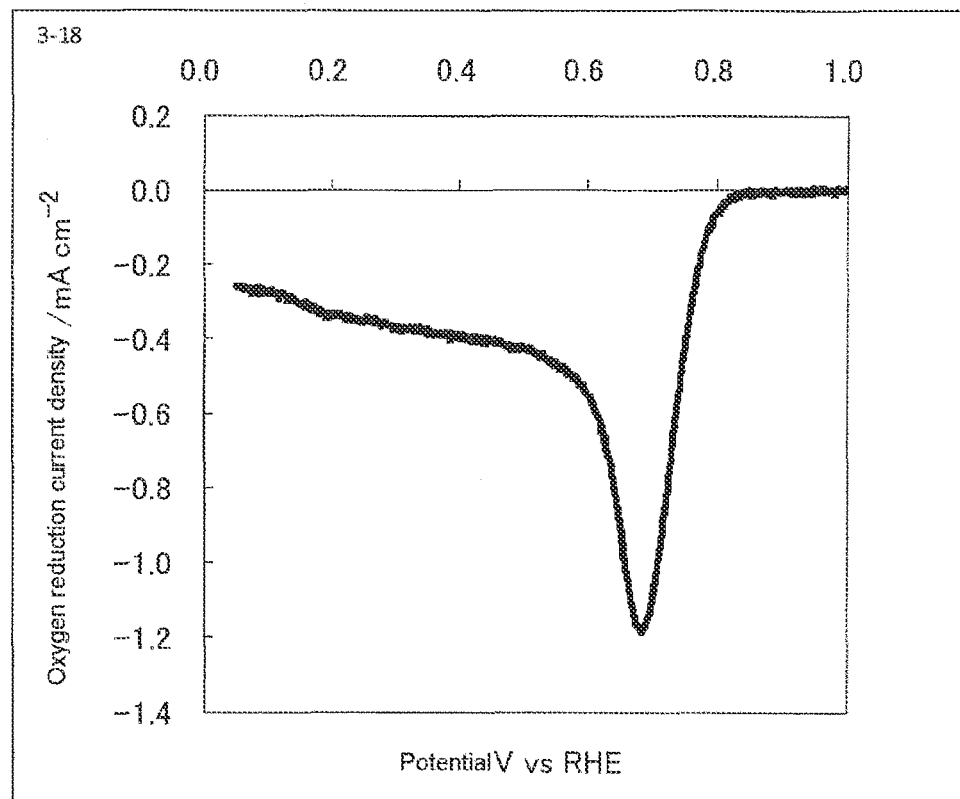
FIG. 31 shows an oxygen reduction current density potential curve evaluating the oxygen reducing activity of a fuel cell electrode of Example 3-18.
Figure 32:
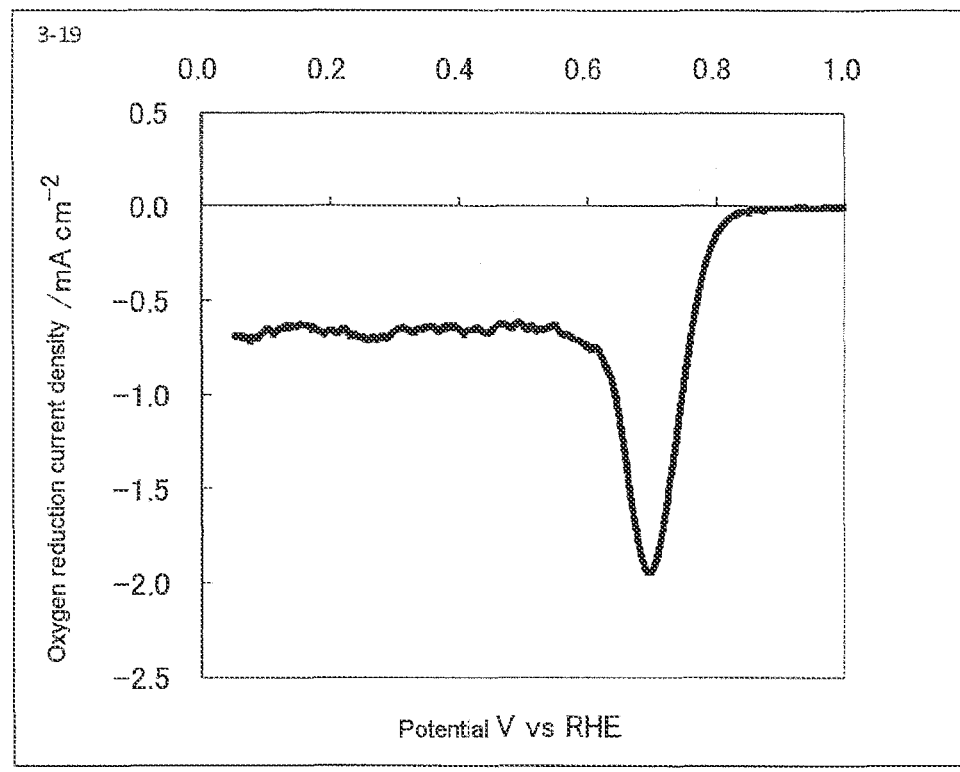
FIG. 32 shows an oxygen reduction current density potential curve evaluating the oxygen reducing activity of a fuel cell electrode of Example 3-19.
Figure 33:
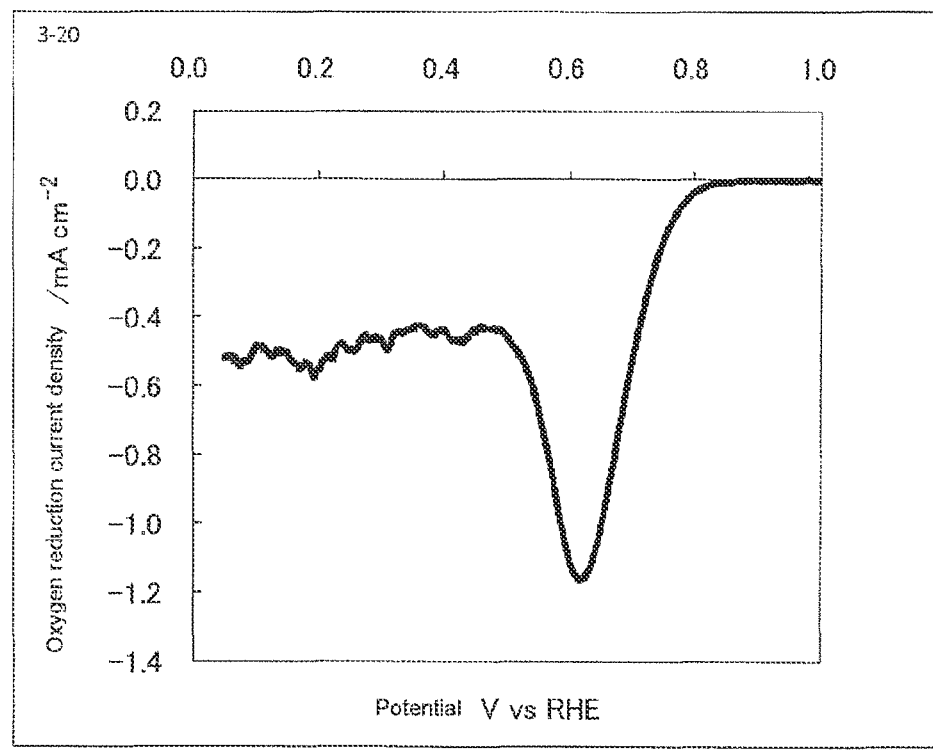
FIG. 33 shows an oxygen reduction current density potential curve evaluating the oxygen reducing activity of a fuel cell electrode of Example 3-20.
Figure 34:
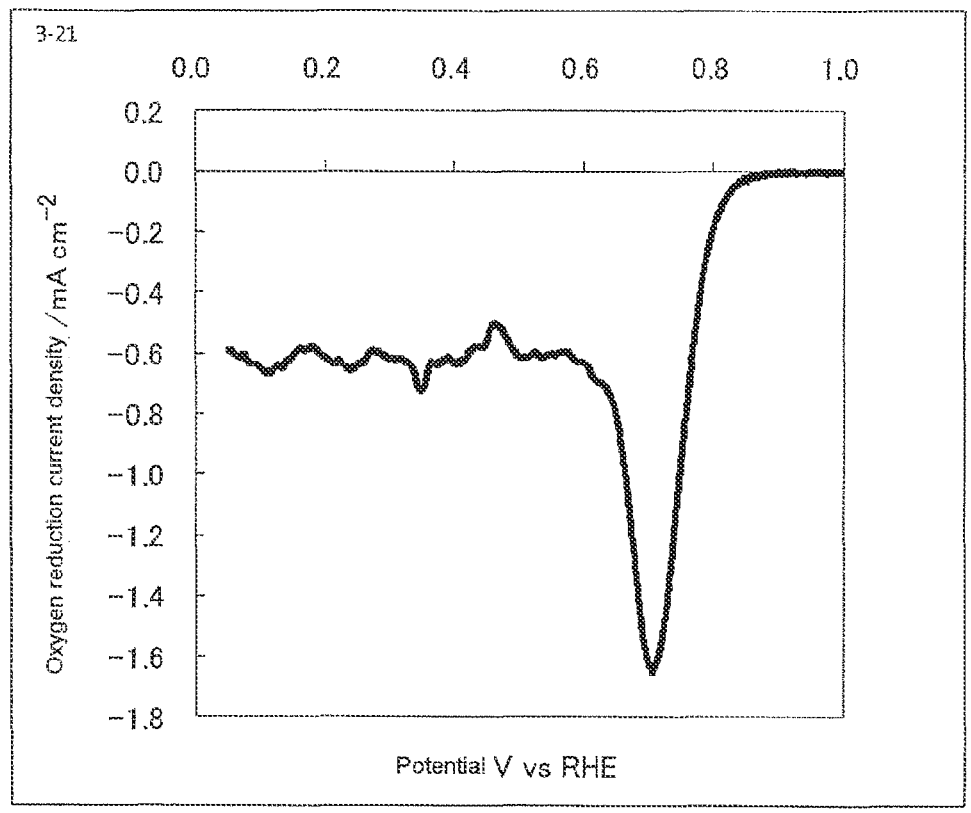
FIG. 34 shows an oxygen reduction current density potential curve evaluating the oxygen reducing activity of a fuel cell electrode of Example 3-21.
Figure 35:
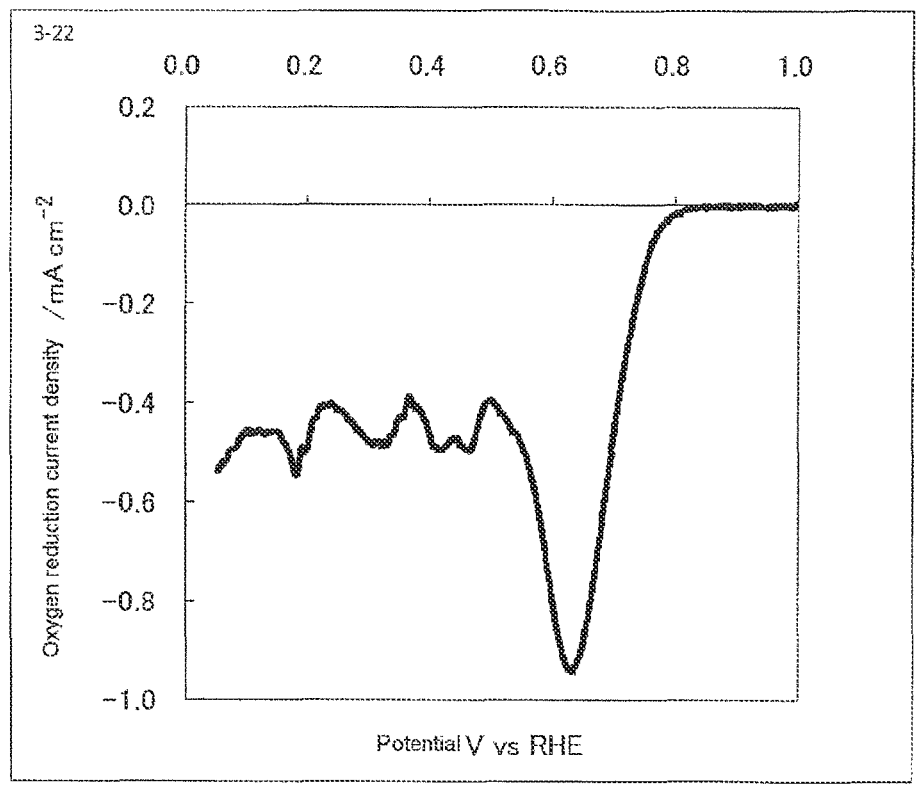
FIG. 35 shows an oxygen reduction current density potential curve evaluating the oxygen reducing activity of a fuel cell electrode of Example 3-22.
Figure 36:
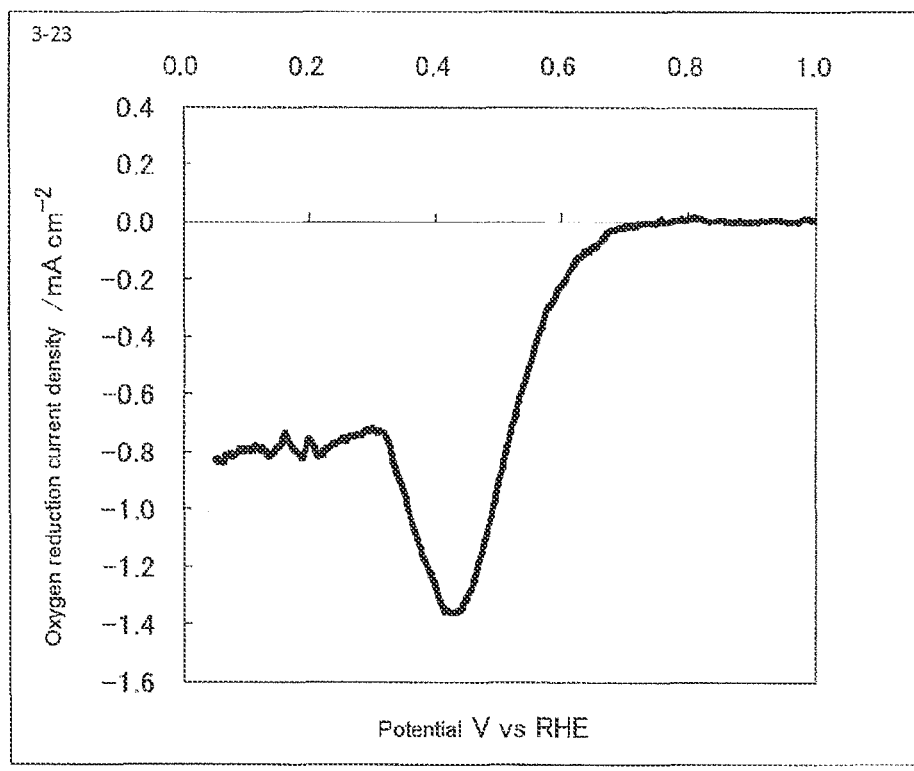
FIG. 36 shows an oxygen reduction current density potential curve evaluating the oxygen reducing activity of a fuel cell electrode of Example 3-23.
Figure 37:
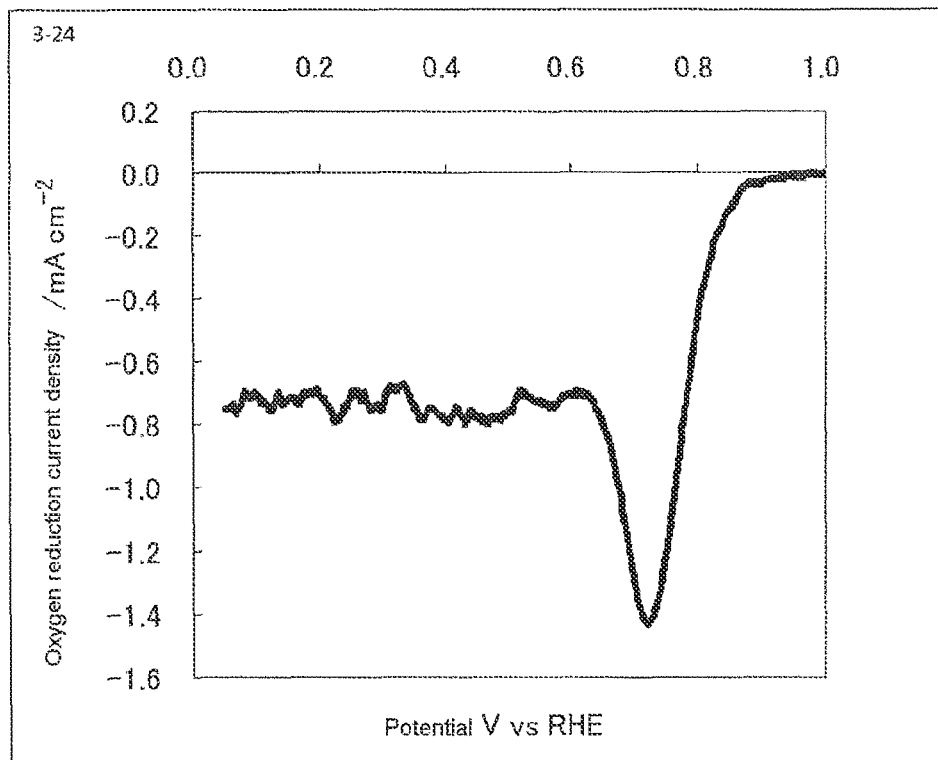
FIG. 37 shows an oxygen reduction current density potential curve evaluating the oxygen reducing activity of a fuel cell electrode of Example 3-24.
Figure 38:
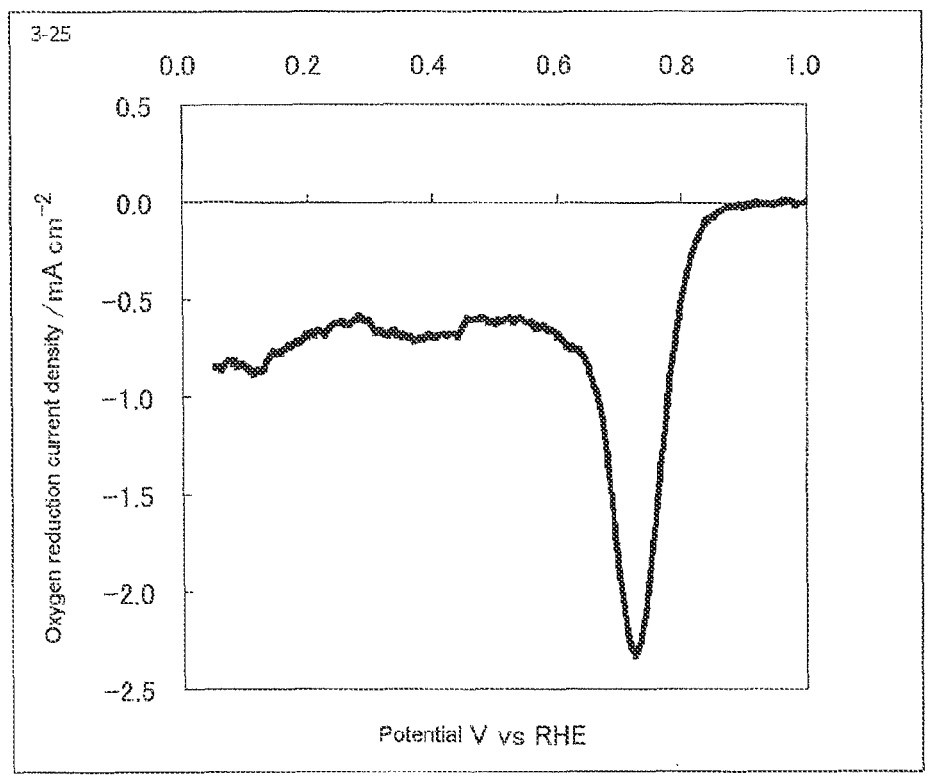
FIG. 38 shows an oxygen reduction current density potential curve evaluating the oxygen reducing activity of a fuel cell electrode of Example 3-25.
Figure 39:
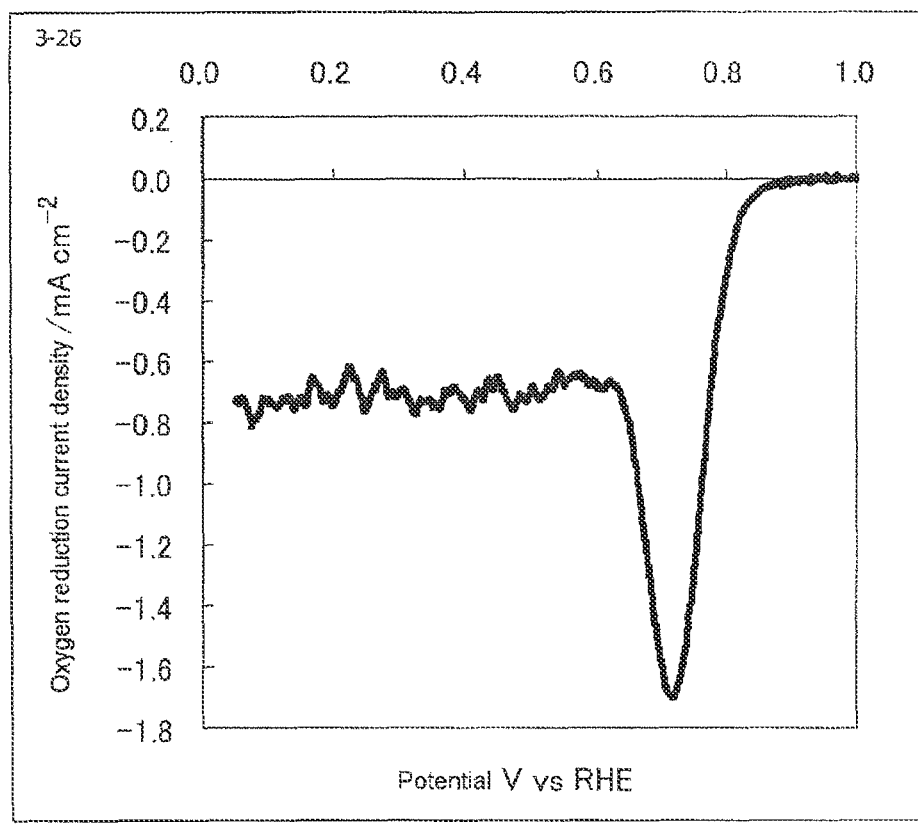
FIG. 39 shows an oxygen reduction current density potential curve evaluating the oxygen reducing activity of a fuel cell electrode of Example 3-26.
Figure 40:
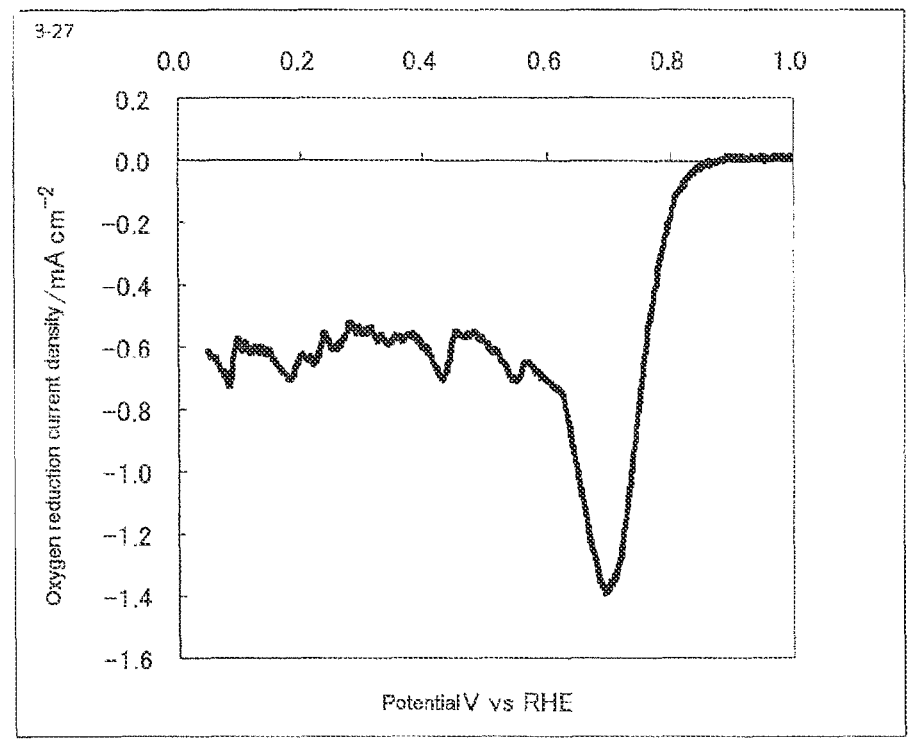
FIG. 40 shows an oxygen reduction current density potential curve evaluating the oxygen reducing activity of a fuel cell electrode of Example 3-27.
Figure 41:
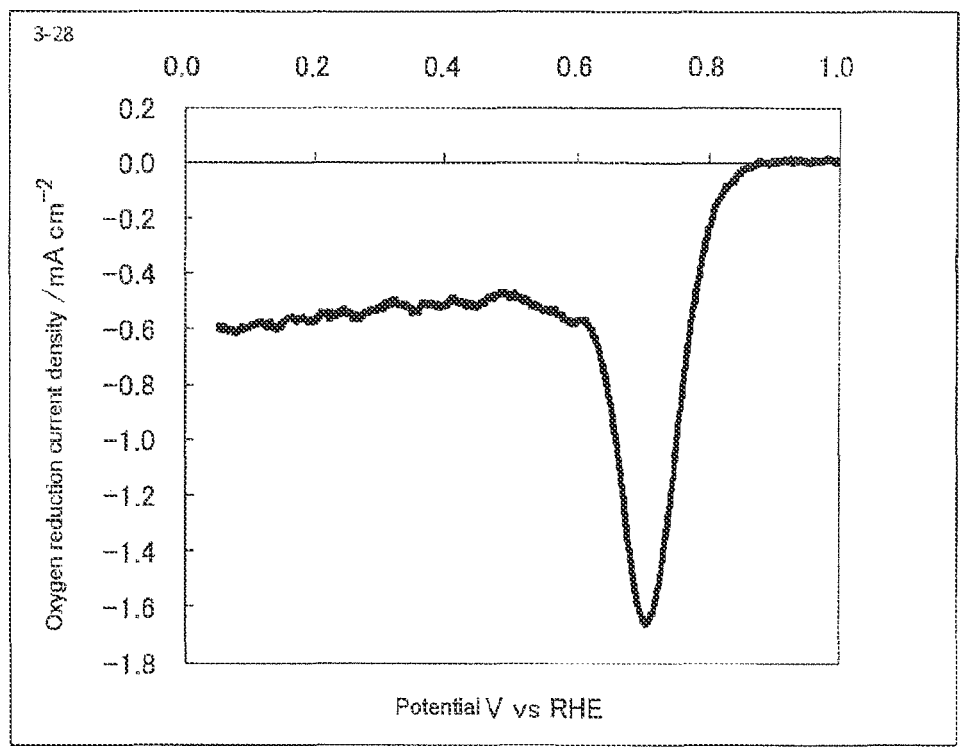
FIG. 41 shows an oxygen reduction current density potential curve evaluating the oxygen reducing activity of a fuel cell electrode of Example 3-28.
Figure 42:
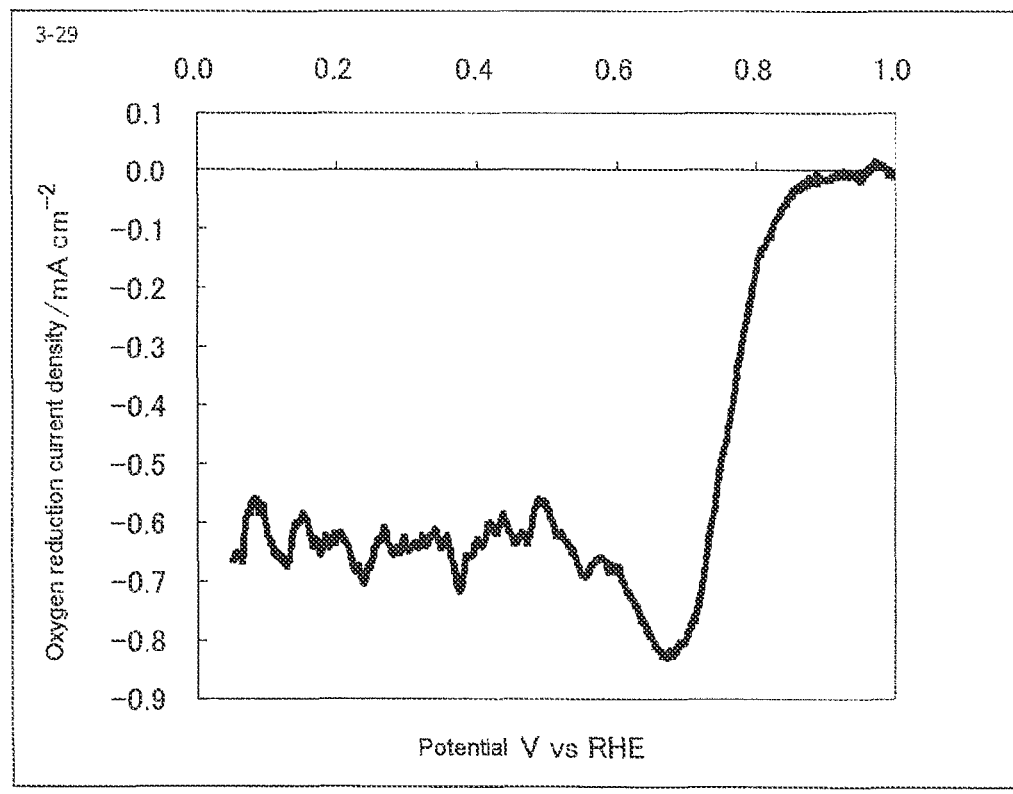
FIG. 42 shows an oxygen reduction current density potential curve evaluating the oxygen reducing activity of a fuel cell electrode of Example 3-29.
Figure 43:
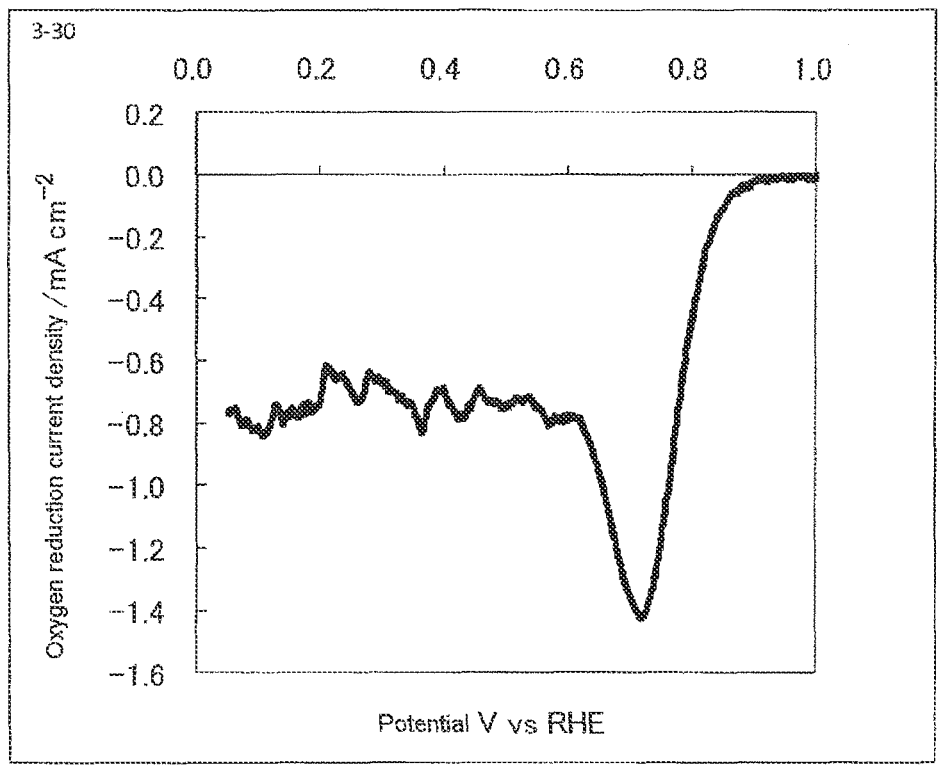
FIG. 43 shows an oxygen reduction current density potential curve evaluating the oxygen reducing activity of a fuel cell electrode of Example 3-30.
Figure 44:
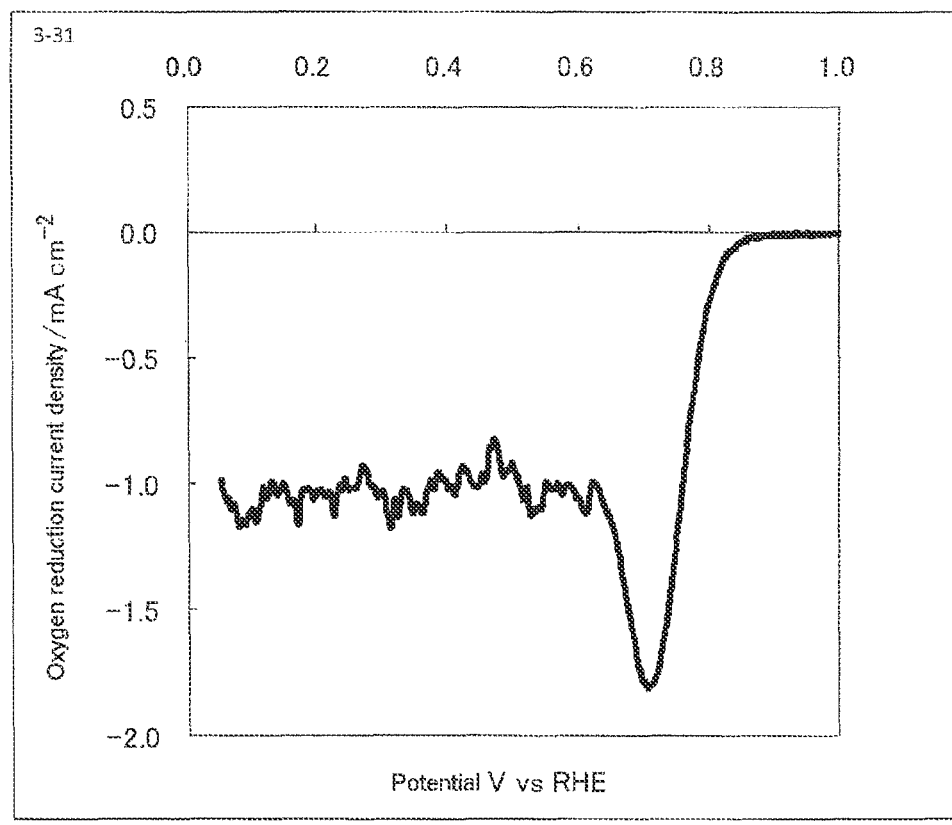
FIG. 44 shows an oxygen reduction current density potential curve evaluating the oxygen reducing activity of a fuel cell electrode of Example 3-31.
Figure 45:
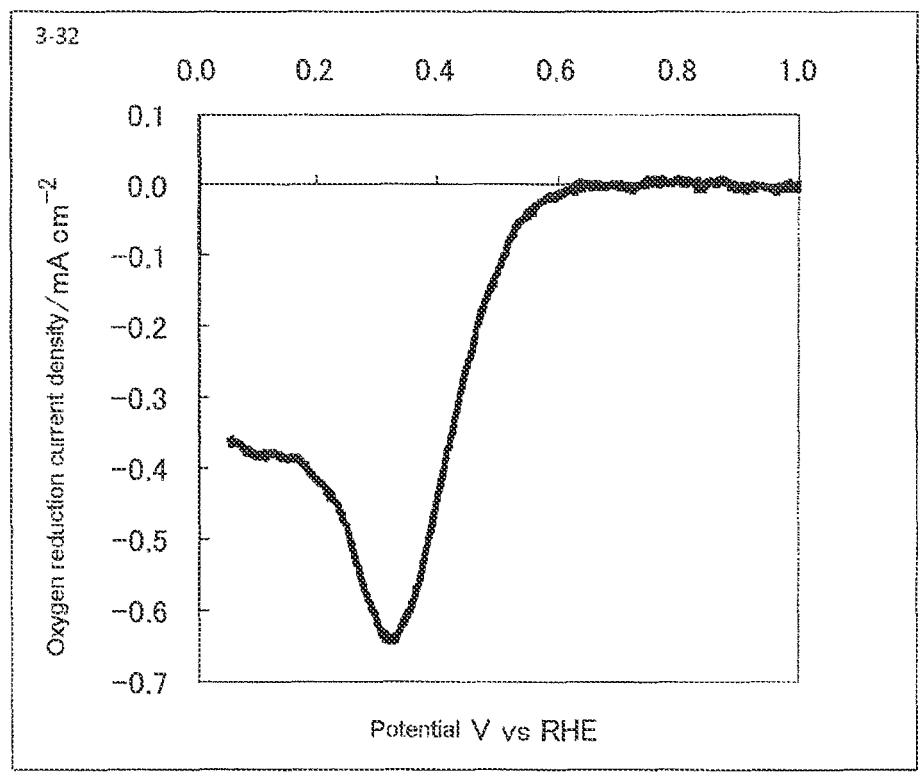
FIG. 45 shows an oxygen reduction current density potential curve evaluating the oxygen reducing activity of a fuel cell electrode of Example 3-32.
Figure 46:
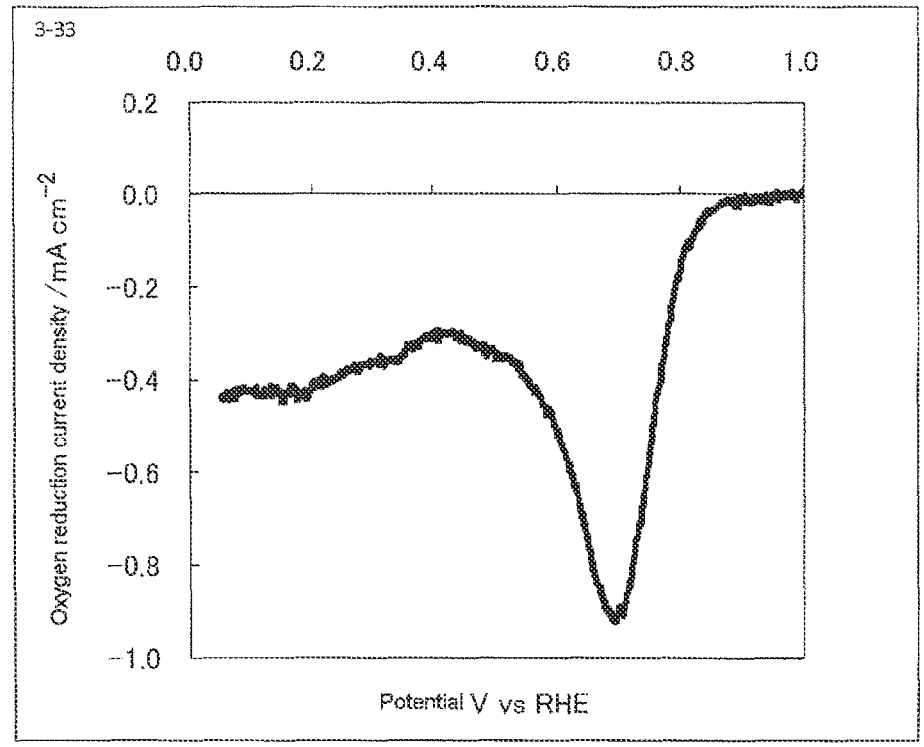
FIG. 46 shows an oxygen reduction current density potential curve evaluating the oxygen reducing activity of a fuel cell electrode of Example 3-33.
Figure 47:
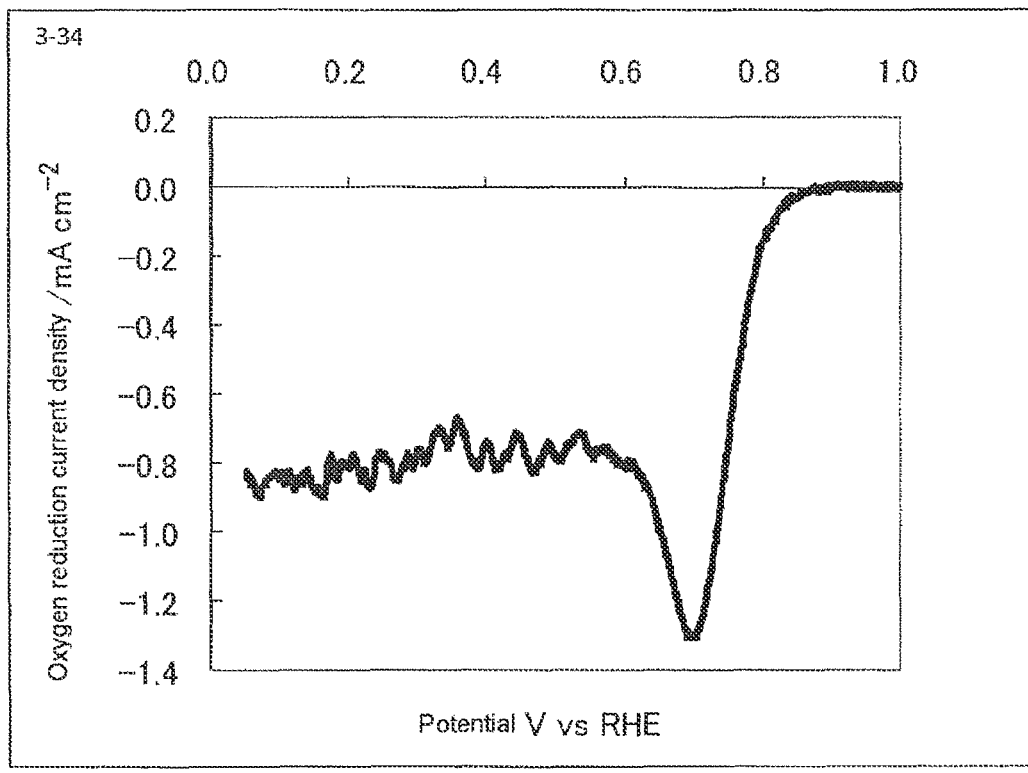
FIG. 47 shows an oxygen reduction current density potential curve evaluating the oxygen reducing activity of a fuel cell electrode of Example 3-34.
Figure 48:
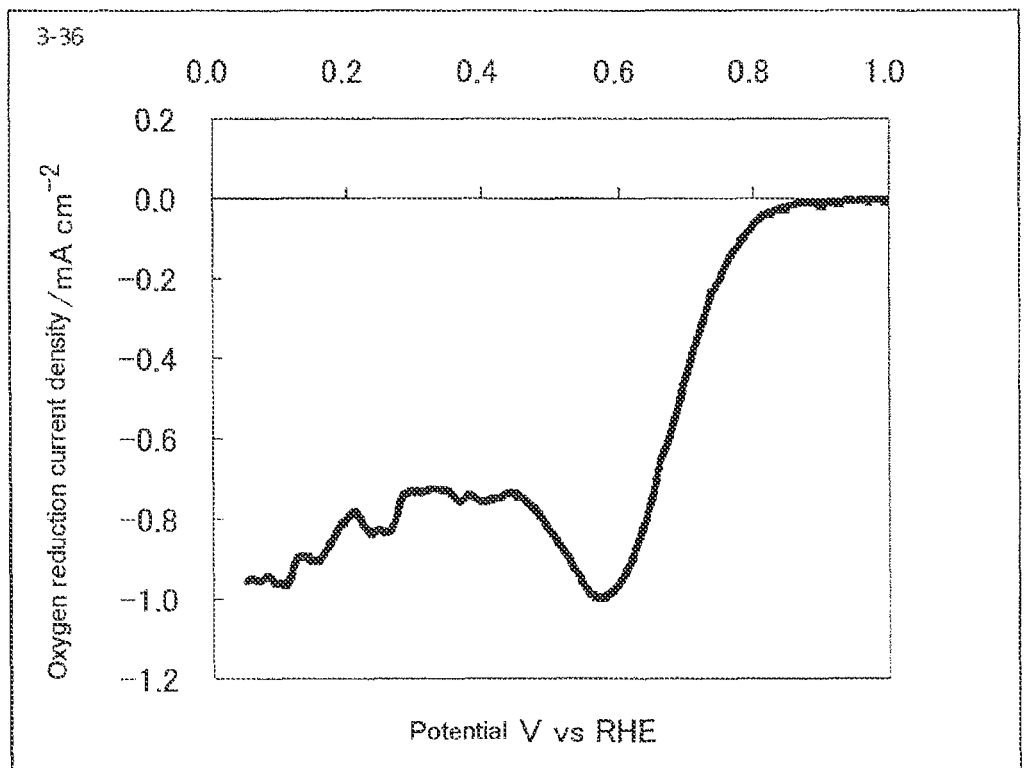
FIG. 48 shows an oxygen reduction current density potential curve evaluating the oxygen reducing activity of a fuel cell electrode of Example 3-36.
Figure 49:
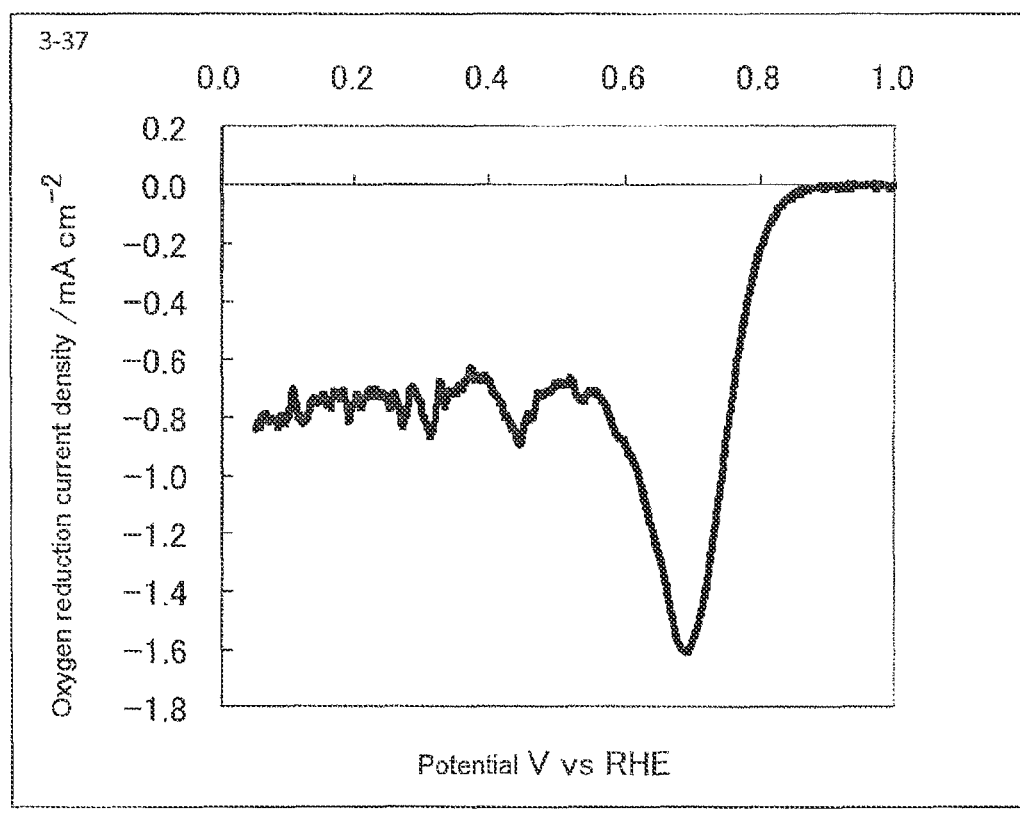
FIG. 49 shows an oxygen reduction current density potential curve evaluating the oxygen reducing activity of a fuel cell electrode of Example 3-37.
Figure 50:
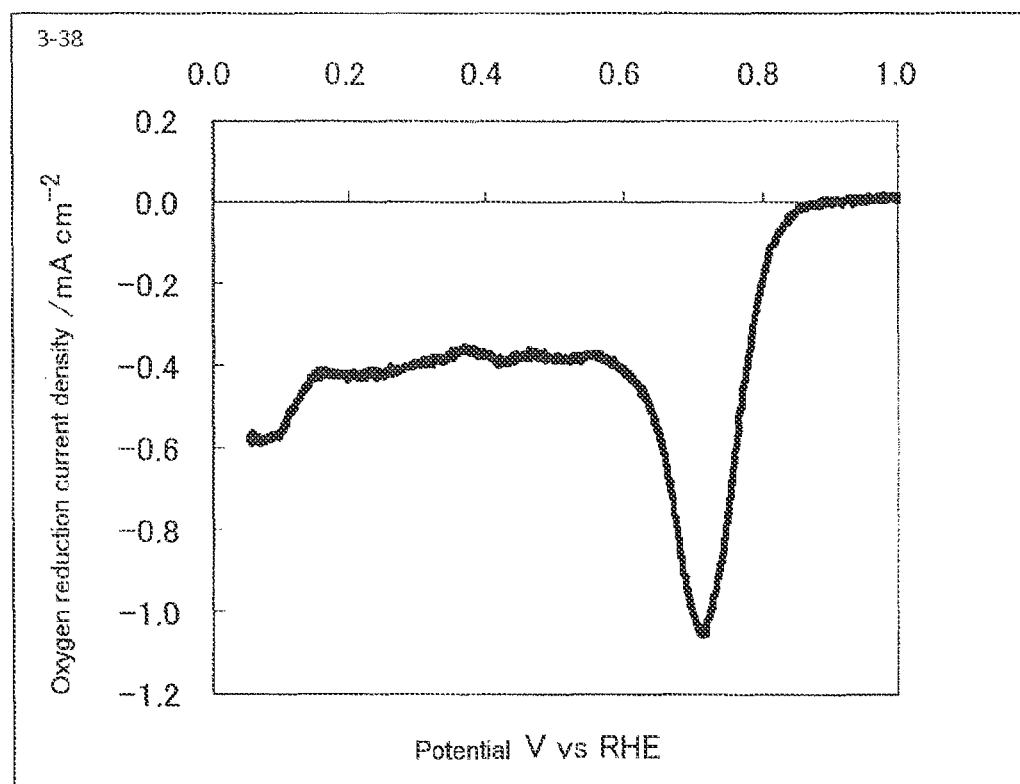
FIG. 50 shows an oxygen reduction current density potential curve evaluating the oxygen reducing activity of a fuel cell electrode of Example 3-38.
Figure 51:
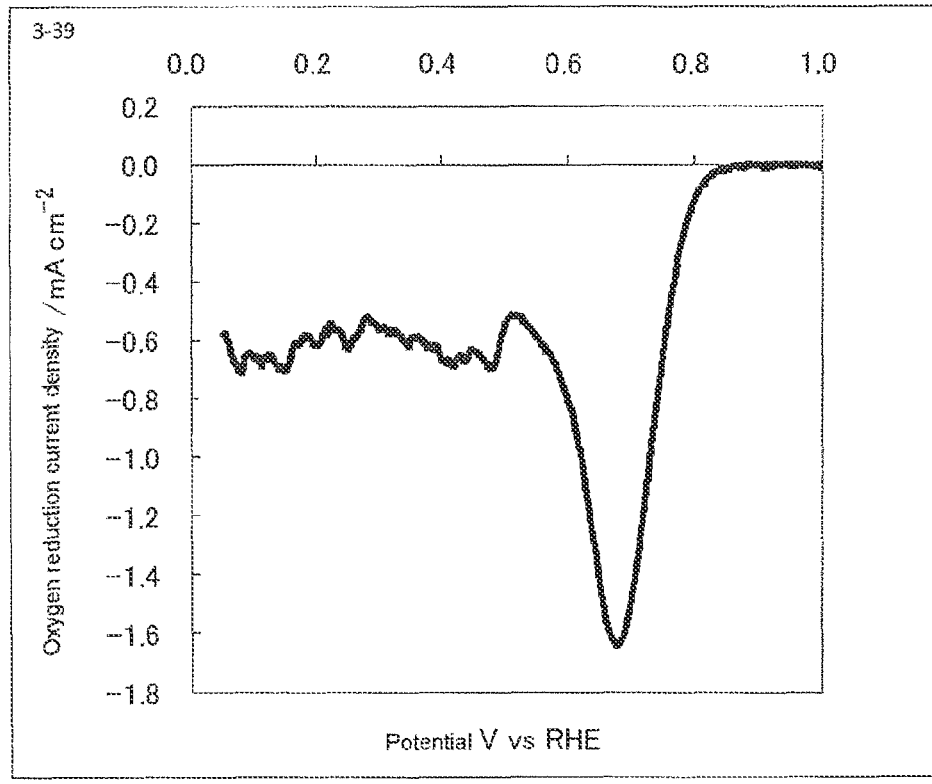
FIG. 51 shows an oxygen reduction current density potential curve evaluating the oxygen reducing activity of a fuel cell electrode of Example 3-39.
Figure 52:
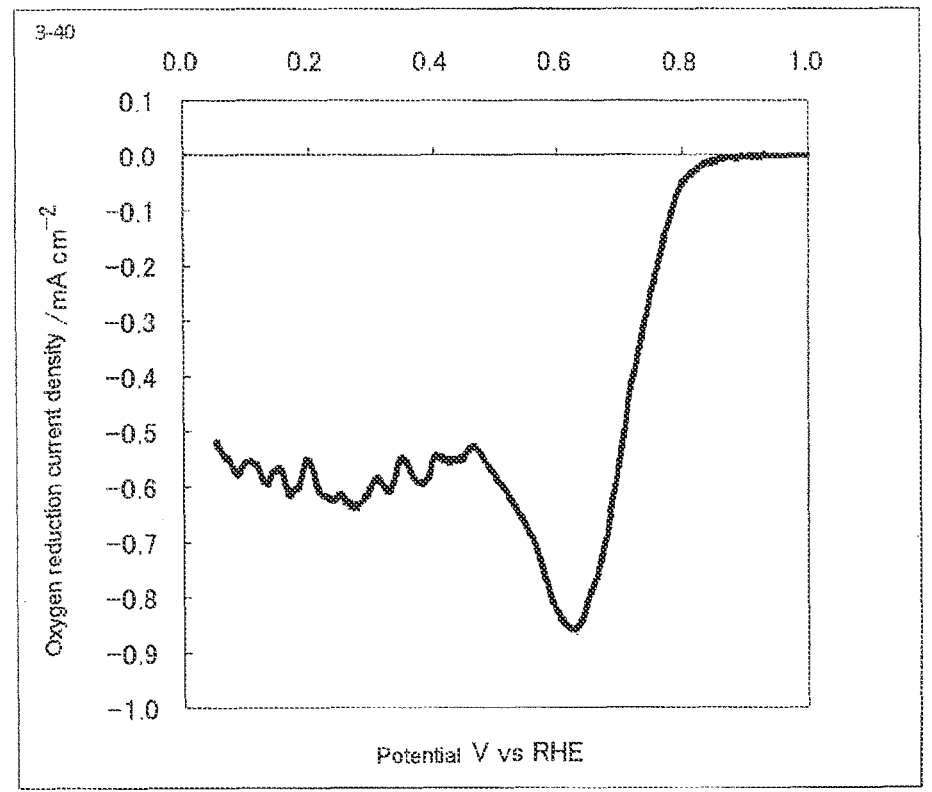
FIG. 52 shows an oxygen reduction current density potential curve evaluating the oxygen reducing activity of a fuel cell electrode of Example 3-40.
Figure 53:
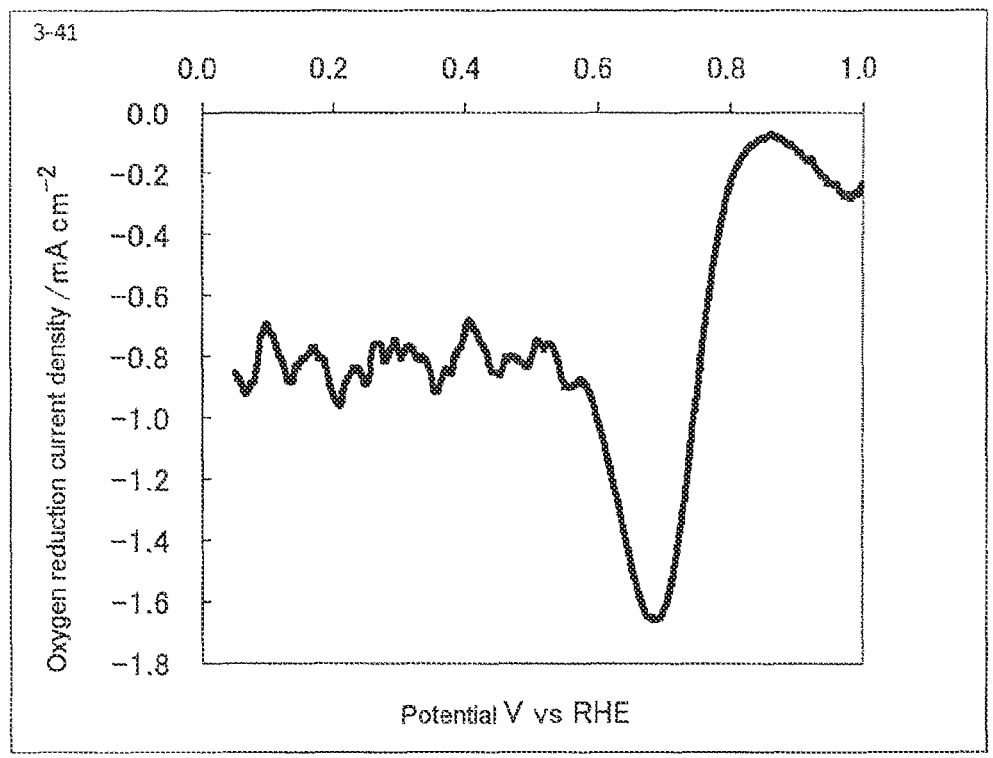
FIG. 53 shows an oxygen reduction current density potential curve evaluating the oxygen reducing activity of a fuel cell electrode of Example 3-41.
Figure 54:
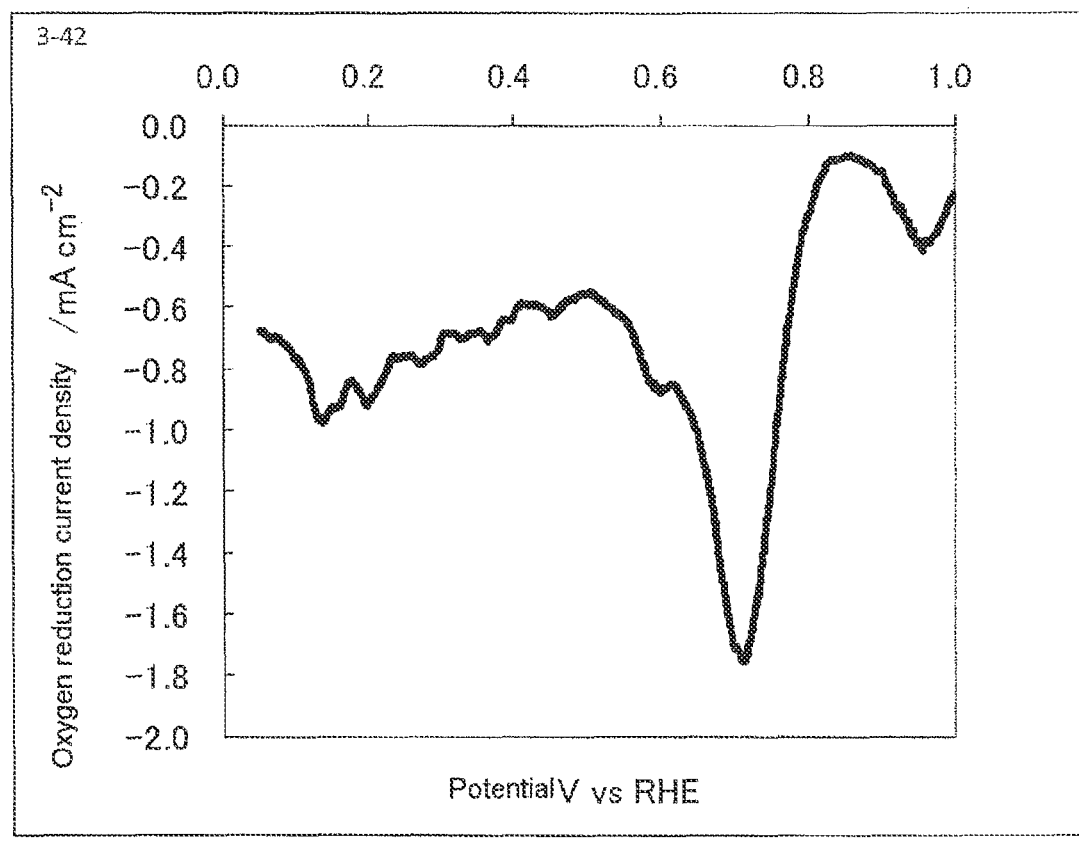
FIG. 54 shows an oxygen reduction current density potential curve evaluating the oxygen reducing activity of a fuel cell electrode of Example 3-42.
Figure 55:
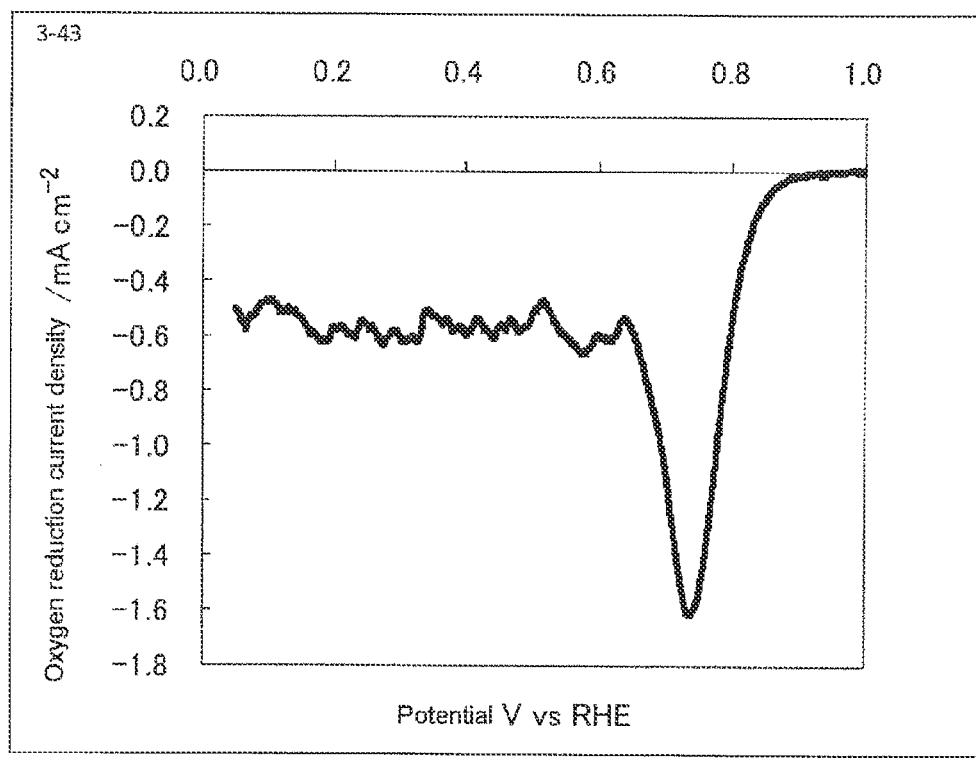
FIG. 55 shows an oxygen reduction current density potential curve evaluating the oxygen reducing activity of a fuel cell electrode of Example 3-43.
Figure 56:
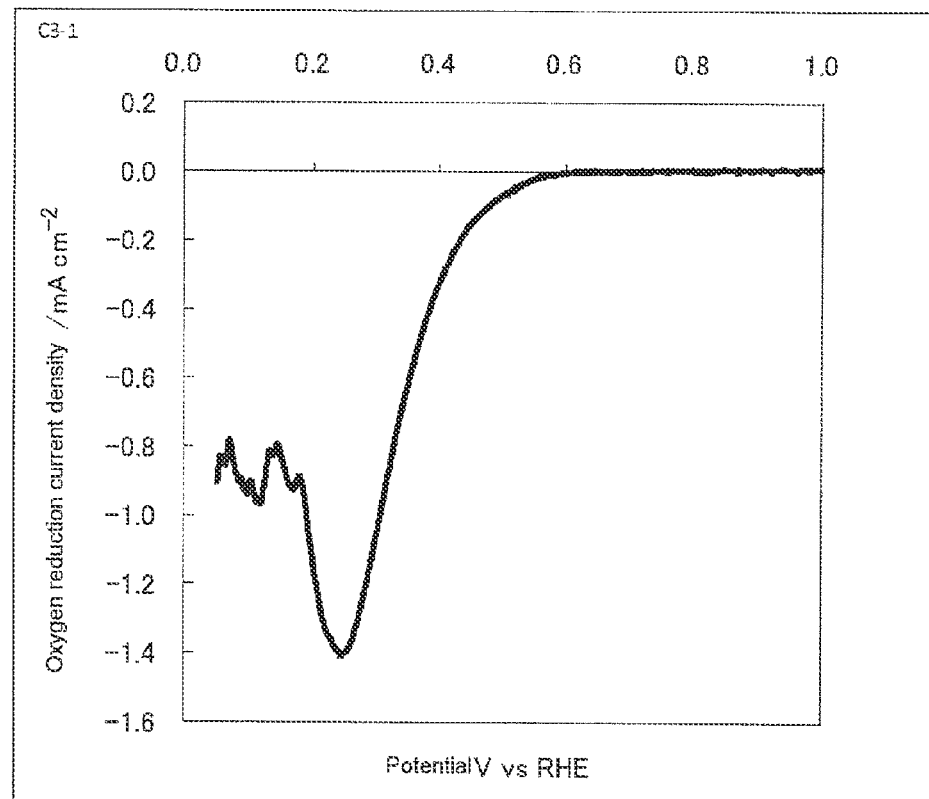
FIG. 56 shows an oxygen reduction current density potential curve evaluating the oxygen reducing activity of a fuel cell electrode of Comparative Example 3-1.
Figure 57:
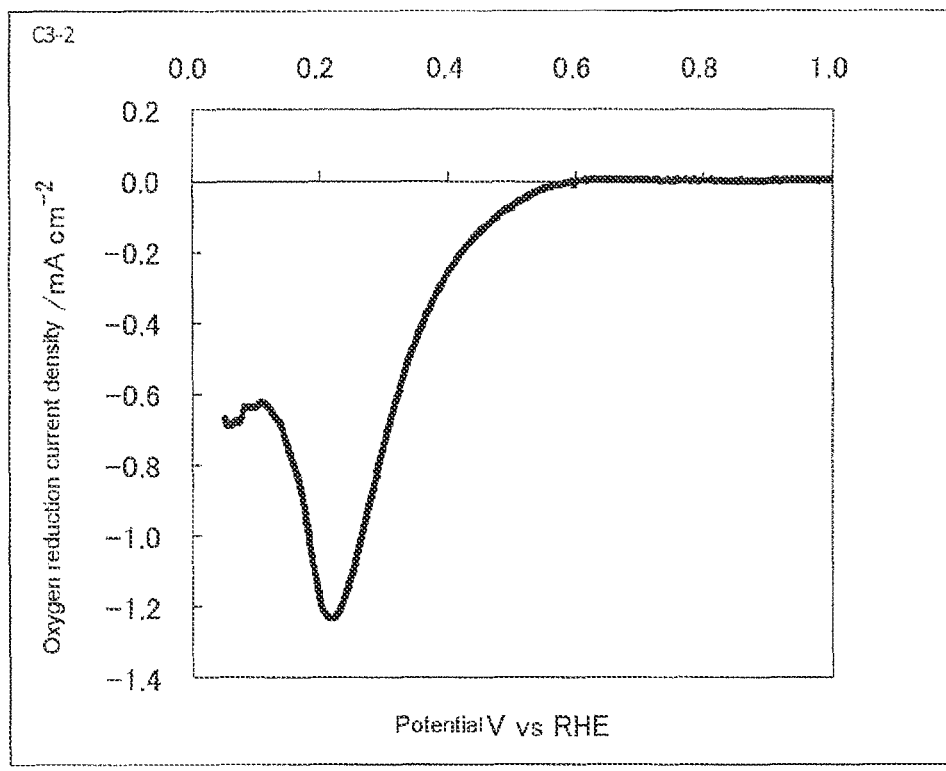
FIG. 57 shows an oxygen reduction current density potential curve evaluating the oxygen reducing activity of a fuel cell electrode of Comparative Example 3-2.
Figure 58:
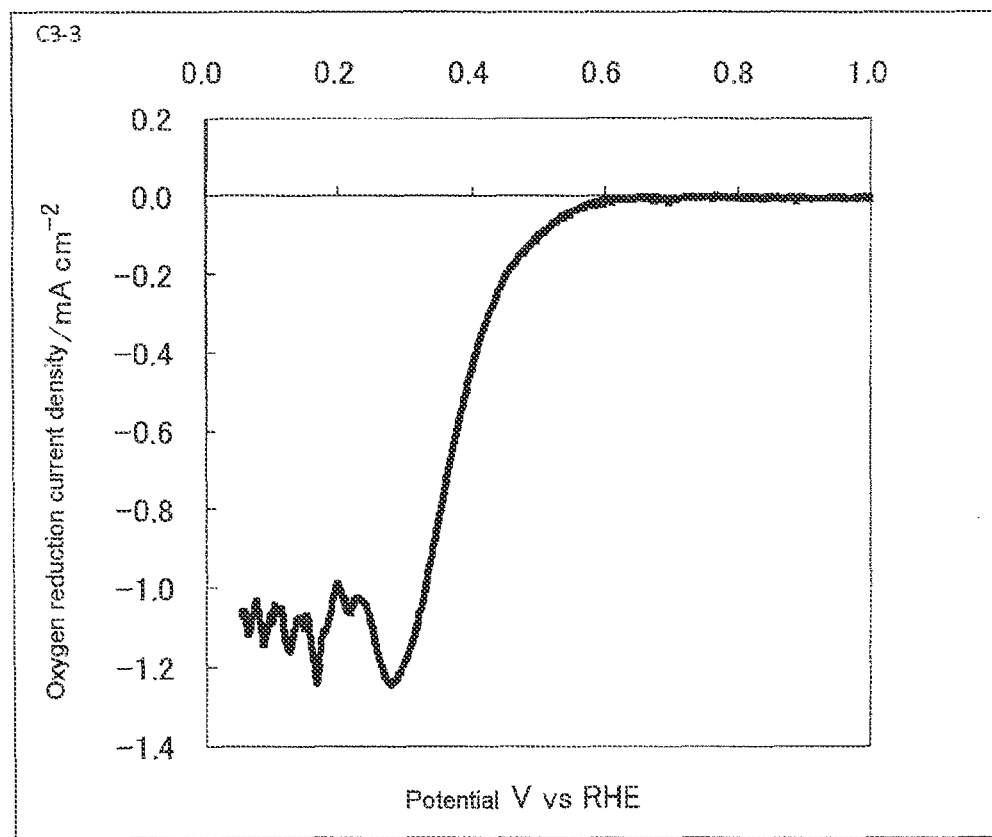
FIG. 58 shows an oxygen reduction current density potential curve evaluating the oxygen reducing activity of a fuel cell electrode of Comparative Example 3-3.

FIG. 13 shows the current-potential curve obtained in the above measurement.

The catalyst (8) prepared in Example 1-8 had an oxygen reduction onset potential of 0.95 V (vs. RHE) and an oxygen reduction current density of 1.50 mA/cm$^2$, and thus was found to have high catalytic performance (Table 2).

Example 3-1

1. Production of Catalyst 9.37 g of titanium tetraisopropoxide (manufactured by Junsei Chemical Co., Ltd.) as a first transition metal-containing compound and 5.12 g of acetylacetone (Junsei Chemical Co., Ltd.) were added to a solution of 15 mL of ethanol (manufactured by Wako Pure Chemical Industries, Ltd.) and 5 mL of acetic acid (manufactured by Wako Pure Chemical Industries, Ltd.), and stirred at room temperature, to prepare a first transition metal-containing mixture solution. On the other hand, 10.0 g of glycine (manufactured by Wako Pure Chemical Industries, Ltd.) as a nitrogen-containing organic compound and 0.582 g of iron acetate (manufactured by Aldrich) as a second transition metal-containing compound were added to 20 mL of pure water, and stirred at room temperature and completely dissolved, to prepare a mixture solution that contained a nitrogen-containing organic compound. The first transition metal-containing mixture solution was slowly added to the mixture solution that contained a nitrogen-containing organic compound, to provide a transparent catalyst precursor solution. The catalyst precursor solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was finely and homogenously crushed with a mortar, to provide a powder.

This powder was introduced to a tubular furnace. The powder was heated to 890° C. under the atmosphere of a nitrogen gas containing 4% by volume of a hydrogen gas at a heating rate of 10° C./min, and was held at 890° C. for 1 hour, and then allowed to cool, to provide a powdery catalyst. The results of the BET specific surface area and elemental analysis of this catalyst are shown in Table 3.

2. Production of Fuel Cell Electrode

This catalyst in an amount of 0.095 g and carbon (XC-72 manufactured by Cabot Corporation) in an amount of 0.005 g were added to 10 g of a solution obtained by mixing isopropyl alcohol and pure water at a mass ratio between isopropyl alcohol and pure water of 2:1. The mixture was ultrasonically stirred to give a suspended mixture. 30 µl of this mixture was applied on a glassy carbon electrode (diameter: 5.2 mm, manufactured by Tokai Carbon Co., Ltd.) and was dried at 120° C. for 5 minutes, thereby forming 1.0 mg or more of a fuel cell catalyst layer on the carbon electrode surface. Subsequently, 10 µl of NAFION (registered trade name) (a 5% NAFION (registered trade name) solution (DE521) manufactured by DuPont) diluted ten times with isopropyl alcohol was applied thereon and was dried at 120° C. for 1 hour. A fuel cell electrode was thus obtained.

3. Evaluation of Oxygen Reducing Activity

The fuel cell electrode prepared was polarized in a 0.5 mol/L sulfuric acid aqueous solution at 30° C. under an oxygen atmosphere and a nitrogen atmosphere at a potential scanning rate of 5 mV/sec, thereby measuring a current-potential curve. As a reference electrode, a reversible hydrogen electrode was used in a sulfuric acid aqueous solution of the same concentration. The potential at which the reduction current started to differ by 0.05 mA/cm$^2$ or more between the reduction current under the oxygen atmosphere and that under the nitrogen atmosphere was defined as an oxygen reduction potential E@0.05 mA/cm$^2$. From the oxygen reduction potential, the catalytic performance of the fuel cell electrode prepared was evaluated. The higher this oxygen reduction potential is, the higher the catalytic performance of the catalyst in the fuel cell electrode is.

Examples 3-2 to 3-26, 3-29 to 3-38, Comparative Examples 3-1 TO 3-3

The same procedure as that in Example 3-1 was performed, except that as a first transition metal-containing compound, a nitrogen-containing organic compound and a second transition metal-containing compound, compounds described in Table 3 were used in weights described in Table 3, to produce a catalyst. The analysis thereof was performed. Then, a fuel cell electrode was obtained and the oxygen reducing activity thereof was evaluated. The results are shown in Table 3.

Examples 3-27 to 3-28

1. Production of Catalyst

The same procedure as that in Example 3-1 was performed, except that as a first transition metal-containing compound, a nitrogen-containing organic compound and a second transition metal-containing compound, compounds described in Table 3 were used in weights described in Table 3, to produce a transparent catalyst precursor solution. The catalyst precursor solution was heated and stirred with a rotary evaporator in a nitrogen atmosphere under reduced pressure with the temperature of a hot stirrer set at about 100° C., and thereby the solvent was slowly evaporated until the amount of the solution became halved. A solid precipitated in the solution was collected by filtration operation, and this solid was dried in nitrogen. The resultant solid residue was finely and homogenously crushed with a mortar, to provide a powder.

This powder was introduced to a tubular furnace. The powder was heated to 890° C. under the atmosphere of a nitrogen gas containing 4% by volume of a hydrogen gas at a heating rate of 10° C./min, and was held at 890° C. for 1 hour, and then allowed to cool, to provide a powdery catalyst. The analysis thereof was performed. Then, a fuel cell electrode was obtained and the oxygen reducing activity thereof was evaluated. The results are shown in Table 3.

Example 3-39

The same procedure as that in Example 3-1 was performed, except that the heating temperature was changed from 890° C. to 1000° C., to produce a catalyst. The analysis thereof was performed. Then, a fuel cell electrode was obtained and the oxygen reducing activity thereof was evaluated. The results are shown in Table 3.

Example 3-40

The same procedure as that in Example 3-1 was performed, except that as a first transition metal-containing compound, a nitrogen-containing organic compound and a second transition metal-containing compound, compounds described in Table 3 were used in weights described in Table 3, and ethanol was replaced with 50 mL of methanol (special grade, Wako Chemical Ltd.) and acetic acid was not used, to produce a catalyst. The analysis thereof was performed. Then, a fuel cell electrode was obtained and the oxygen reducing activity thereof was evaluated. The results are shown in Table 3.

Example 3-41

1. Production of Catalyst

Into a beaker, 2.60 g of acetylacetone was introduced. While this was stirred, 4.30 g of vanadium isopropoxide as a first transition metal-containing compound was dropwise added. Further, 28 mL of acetic acid was dropwise added for 2 minutes. Thereby, a first transition metal-containing mixture solution was prepared.

Into a beaker, 60 mL of water, 50 mL of ethanol and 60 mL of acetic acid were introduced. Thereto, 8.74 g of pyrazinecarboxylic acid as a nitrogen-containing organic compound was added and completely dissolved to provide a solution. While the resultant solution was stirred, thereto, 0.290 g of iron acetate was added little by little and dissolved. Then, with the temperature kept at room temperature and stirring, the first transition metal-containing mixture solution was dropwise added slowly (for 10 minutes). The dropwise addition was followed by stirring for 30 minutes. Thereby, a transparent catalyst precursor solution (3-41) was obtained.

The catalyst precursor solution was heated and stirred with a rotary evaporator in a nitrogen atmosphere under reduced pressure with the temperature of a hot stirrer set at about 100° C., and thereby the solvent was slowly evaporated. The solvent was completely evaporated and the resultant solid residue was finely and homogenously crushed with a mortar, to provide a powder.

1.2 g of this powder was introduced to a rotary kiln furnace, and was heated to 890° C. under the flowing at a rate of 20 mL/min of a nitrogen gas containing 4% by volume of a hydrogen gas at a heating rate of 10° C./min, and was held at 890° C. for 0.5 hour, and then allowed to cool, to provide a powdery catalyst. The results of the BET specific surface area and elemental analysis of this catalyst are shown in Table 3.

Example 3-42

Into a beaker, 80 mL g of acetic acid was introduced. While this was stirred, 6.13 g of vanadium (III) acetylacetonato was dropwise added. Thereby, a first transition metal-containing mixture solution was prepared.

Into a 500 mL recovery flask having a stirring bar (length: 30 mm) therein, 60 mL of water, 50 mL of ethanol and 60 mL of acetic acid were introduced. Thereto, 8.74 g of pyrazine carboxylic acid as a nitrogen-containing organic compound was added and completely dissolved to provide a solution. While the resultant solution was stirred, thereto, 0.290 g of iron acetate was added little by little and dissolved. Then, with the temperature kept at room temperature and stirring, the first transition metal-containing mixture solution was dropwise added slowly (for 10 minutes). The dropwise addition was followed by stirring for 30 minutes. Thereby, a transparent catalyst precursor solution (3-42) was obtained.

The same operation as that in Example 3-41 was performed, except that the catalyst precursor solution (3-41) was replaced with the catalyst precursor solution (3-42), to provide a powdery catalyst. The results of the BET specific surface area and elemental analysis of this catalyst are shown in Table 3.

Example 3-43

1. Production of Catalyst 9.37 g of titanium tetraisopropoxide (manufactured by Junsei Chemical Co., Ltd.) as a first transition metal-containing compound and 5.12 g of acetylacetone (manufactured by Junsei Chemical Co., Ltd.) were added to a solution of 5 mL of acetic acid (manufactured by Wako Pure Chemical Industries, Ltd.), and stirred at room temperature, to prepare a first transition metal-containing mixture solution. On the other hand, 10.0 g of glycine (manufactured by Wako Pure Chemical Industries, Ltd.) as a nitrogen-containing organic compound and 0.582 g of iron acetate (manufactured by Aldrich) as a second transition metal-containing compound were added to 20 mL of pure water, and stirred at room temperature and completely dissolved, to prepare a mixture solution that contained a nitrogen-containing organic compound. The first transition metal-containing mixture solution was slowly added to the mixture solution that contained a nitrogen-containing organic compound, to provide a transparent catalyst precursor solution. The catalyst precursor solution was heated and stirred with a rotary evaporator in a nitrogen atmosphere under reduced pressure with the temperature of a hot stirrer set at about 80° C., and thereby the solvent was slowly evaporated. The solvent was completely evaporated and the resultant solid residue was finely and homogenously crushed with a mortar, to provide a powder.

This powder was introduced to a tubular furnace. The powder was heated to 890° C. under the atmosphere of a nitrogen gas containing 4% by volume of a hydrogen gas at a heating rate of 20° C./min, and was held at 890° C. for 30 minutes, and then allowed to cool, to provide a powdery catalyst. The results of the BET specific surface area and elemental analysis of this catalyst are shown in Table 3.

Comparative Example 3-4

Titanium oxide (anatase-type, 100 m$^2$/g), which is a transition metal-containing compound, was introduced to a tubular furnace, and was heated to 900° C. under the atmosphere of a nitrogen gas containing 4% by volume of a hydrogen gas at a heating rate of 10° C./min, and was held at 900° C. for 1 hour, and then allowed to cool, to provide a powdery catalyst. The analysis thereof was performed. Then, a fuel cell electrode was obtained and the oxygen reducing activity thereof was evaluated. The results are shown in Table 3.

Comparative Example 3-5

2 g of titanium oxide (anatase-type, 100 $m^2/g$), which is a transition metal-containing compound, was sufficiently mixed with 0.75 g of carbon black (manufactured by Cabot Corporation, VULCAN (registered trade name) XC72) in a mortar. The mixture was introduced to a tubular furnace, and was heated to 1700° C. under the atmosphere of a nitrogen gas containing 4% by volume of a hydrogen gas at a heating rate of 10° C./min, and was held at 1700° C. for 3 hours, and then allowed to cool, to provide a powdery catalyst. The analysis thereof was performed. Then, a fuel cell electrode was obtained and the oxygen reducing activity thereof was evaluated. The results are shown in Table 3.

Comparative Example 3-6

The powder obtained in Example 3-1 was introduced to a tubular furnace. The powder was heated to 170° C. under the atmosphere of a nitrogen gas containing 4% by volume of a hydrogen gas at a heating rate of 10° C./min, and was held at 170° C. for 1 hour, and then allowed to cool, to provide a powdery catalyst. The analysis thereof was performed. Then, a fuel cell electrode was obtained and the oxygen reducing activity thereof was evaluated. The results are shown in Table 4.

Comparative Example 3-7

The powder obtained in Example 3-1 was introduced to a tubular furnace. The powder was heated to 240° C. under the atmosphere of a nitrogen gas containing 4% by volume of a hydrogen gas at a heating rate of 10° C./min, and was held at 240° C. for 1 hour, and then allowed to cool, to provide a powdery catalyst. The analysis thereof was performed. Then, a fuel cell electrode was obtained and the oxygen reducing activity thereof was evaluated. The results are shown in Table 4.

Comparative Example 3-8

The powder obtained in Example 3-1 was introduced to a tubular furnace. The powder was heated to 300° C. under the atmosphere of a nitrogen gas containing 4% by volume of a hydrogen gas at a heating rate of 10° C./min, and was held at 300° C. for 1 hour, and then allowed to cool, to provide a powdery catalyst. The analysis thereof was performed. Then, a fuel cell electrode was obtained and the oxygen reducing activity thereof was evaluated. The results are shown in Table 4.

Comparative Example 3-9

The powder obtained in Example 3-1 was introduced to a tubular furnace. The powder was heated to 1200° C. under the atmosphere of a nitrogen gas containing 4% by volume of a hydrogen gas at a heating rate of 200° C./h, and was held at 1200° C. for 2 hours, and then allowed to cool, to provide a powdery catalyst. The analysis thereof was performed. Then, a fuel cell electrode was obtained and the oxygen reducing activity thereof was evaluated. The results are shown in Table 4.

Comparative Example 3-10

The powder obtained in Example 3-1 was introduced to a tubular furnace. The powder was heated to 1400° C. under the atmosphere of a nitrogen gas containing 4% by volume of a hydrogen gas at a heating rate of 200° C./h, and was held at 1400° C. for 2 hours, and then allowed to cool, to provide a powdery catalyst. The analysis thereof was performed. Then, a fuel cell electrode was obtained and the oxygen reducing activity thereof was evaluated. The results are shown in Table 4.

Comparative Example 3-11

The powder obtained in Example 3-1 was introduced to a tubular furnace. The powder was heated to 1600° C. under the atmosphere of a nitrogen gas containing 4% by volume of a hydrogen gas at a heating rate of 200° C./h, and was held at 1600° C. for 2 hours, and then allowed to cool, to provide a powdery catalyst. The analysis thereof was performed. Then, a fuel cell electrode was obtained and the oxygen reducing activity thereof was evaluated. The results are shown in Table 4.

Anode Preparation Example 4-1

1. Preparation of Anode Ink

Into 50 mL of pure water, 0.6 g platinum-supporting carbon (TEC10E60E, manufactured by TANAKA KIKINZOKU KOGYO K.K.) and 5 g of an aqueous solution containing 0.25 g of a proton conductive material (NAFION (registered trade name)) (5% NAFION (registered trade name) aqueous solution, manufactured by Wako Pure Chemical Industries, Ltd.) were introduced. The resultant solution was mixed with an ultrasonic wave dispersion machine (UT-106H, manufactured by Sharp Manufacturing Systems Corporation) for 1 hour, to prepare an anode ink (4-1).

2. Preparation of Electrode Having Anode Catalyst Layer

A gas diffusion layer (carbon paper (TGP-H-060, manufactured by TORAY INDUSTRIES INC.) was immersed in acetone for 30 seconds and degreased, and dried. Then, the gas diffusion layer was immersed in an aqueous 10% polytetrafluoroethylene (hereinafter also referred to as "PTFE") solution for 30 seconds.

The immersed product was dried at room temperature, and was heated at 350° C. for 1 hour, to provide a water-repellent gas diffusion layer having PTFE dispersed in the carbon paper (hereinafter also referred to as "GDL").

The above GDL was formed into the size of 5 cm×5 cm, and the surface thereof was coated with the above anode ink (4-1) using an automatic spray-coating apparatus (manufactured by SAN-EI TECH Ltd.) at 80° C. By repeating the spray-coating, an electrode having an anode catalyst layer (4-1) in which the amount of platinum (Pt) per unit area was 1 $mg/cm^2$ was prepared.

Example 4-1

Preparation of Ink

Into a mixed liquid of 25 mL of 2-propanol and 25 mL of distilled water, 0.355 g of the catalyst (1), and 0.08875 g of carbon black as an electron conductive material (ketjen black EC300J, manufactured by LION Corporation) were added. Further, 4.67 g of an aqueous solution containing a proton conductive material NAFION (NAFION (registered trade name)) (aqueous 5% NAFION (registered trade name) solution, manufactured by Wako Pure Chemical Industries, Ltd.) was added. These were mixed with an ultrasonic wave dispersion machine (UT-106H, manufactured by Sharp Manufacturing Systems Corporation) for 1 hour, to prepare a cathode ink (4-1).

2. Preparation of Electrode Having Fuel Cell Catalyst Layer

A GDL was prepared in the same manner as described in Anode Preparation Example 4-1, and this GDL was formed into the size of 5 cm×5 cm. The surface thereof was coated with the cathode ink (4-1) using an automatic spray-coating apparatus (manufactured by SAN-EI TECH Ltd.) at 100° C. By repeating the spray-coating, an electrode having a cathode catalyst layer (4-1) in which the total amount of the catalyst (4-1) and carbon black per unit area was 5 mg/cm$^2$ was prepared.

3. Preparation of Membrane Electrode Assembly (Hereinafter also Referred to as "MEA")

As an electrolyte membrane, NAFION (NAFION (registered trade name)) membrane N-212 (manufactured by DuPont) was used. As a cathode, the electrode having the cathode catalyst layer (4-1) on the surface of the GDL was used. As an anode, the electrode having the anode catalyst layer (4-1) on the surface of the GDL, prepared in Anode Preparation Example 4-1, was used. A fuel cell membrane electrode assembly (hereinafter also referred to as a "MEA") in which the electrolyte membrane was interposed between the cathode and the anode was prepared in such a manner as described below.

At first, the electrolyte membrane was held by the cathode and the anode. In such a manner that the cathode catalyst layer (4-1) and the anode catalyst layer (4-1) would adhere to the electrolyte membrane, these were thermally contact bonded with a hot pressing machine at 140° C. at 3 MPa for 6 minutes, to thereby prepare a MEA (4-1).

4. Preparation of Single Cell

The MEA (4-1) was held by two sealing materials (gaskets), two separators each having a gas flow passage, two collectors and two rubber heaters, and fixed and secured with a bolt such that the pressure of contacted surface would be a prescribed value (4N), to thereby prepare a single cell (4-1) (25 cm$^2$) of a polymer electrolyte fuel cell.

5. Evaluation of Power Generation Property (Measurement of Catalytic Performance)

The temperature of the single cell (4-1) prepared in the above 6, the temperature of an anode humidifier and the temperature of a cathode humidifier were regulated to be 90° C., 90° C. and 50° C., respectively. To the anode side, hydrogen was supplied as a fuel at a flow rate of 1 L/min, and to the cathode side, oxygen was supplied as an oxidizing agent at a flow rate of 2 L/min. While applying a back pressure of 300 kPa to both the sides, the current-voltage property of the single cell (4-1) was measured. From the current-voltage property curve obtained, a maximum output density was calculated. The higher the maximum output density is, the higher the catalytic performance in the MEA is. The catalytic performance, i.e., the maximum output density, in the MEA (4-1) was 29 mW/cm$^2$.

Example 4-2

The thermally-treated product (1) obtained in Example 1-1 was disintegrated with a planetary ball mill (Premium7 manufactured by FRITSCH, rotating radius: 2.3 cm, orbital radius: 16.3 cm) in such a manner as described below.

Into a sealable zirconia mill container (volume: 45 mL, inner diameter: 45 mm), 0.9 g of the catalyst (1), 40 g of zirconia ball having a diameter of 0.5 mm (manufactured by NIKKATO Corporation) and 7 mL of 2-propanol (dispersion solvent) were introduced. The zirconia mill container was sealed and sufficiently purged with argon. Then, the thermally-treated product (1) was disintegrated under conditions: the number of rotating revolution: 700 rpm, the number of orbital revolution: 350 rpm, rotating centrifugal acceleration: 12.6 G, orbital centrifugal acceleration: 22.3 G, disintegrating time: 5 minutes, to thereby provide a catalyst (4-2).

After the disintegrating, the whole zirconia mill container was cooled with water. After the water cooling, 2-propanol and the catalyst (4-2) were separated from zirconia ball. Further, 2-propanol and the catalyst (4-2) were filtered under reduced pressure, to separate the catalyst (4-2) from 2-propanol.

The same operation as that in Example 4-1 was performed, except that the catalyst (1) was replaced with the catalyst (4-2), to prepare a cathode catalyst layer, MEA (MEA (4-2)) and a single cell (single cell (4-2)), and the power generation property was evaluated. The catalytic performance, i.e., the maximum output density, in the MEA (4-2) was 76 mW/cm$^2$.

Example 4-3

The same operation as that in Example 4-1 was performed, except that the catalyst (1) was replaced with the catalyst (2), to prepare a cathode catalyst layer, MEA (MEA (4-3)) and a single cell (single cell (4-3)), and the power generation property was evaluated. The catalytic performance, i.e., the maximum output density, in the MEA (4-3) was 334 mW/cm$^2$.

Example 4-4

The same operation as that in Example 4-2 was performed, except that the thermally-treated product (2) was replaced with the thermally-treated product (2) obtained in Example 1-2, to provide a catalyst (4-4).

The same operation as that in Example 4-1 was performed, except that the catalyst (4-1) was replaced with the catalyst (4-4), to prepare a cathode catalyst layer, MEA (MEA (4-4)) and a single cell (single cell (4-4)), and the power generation property was evaluated. The catalytic performance, i.e., the maximum output density, in the MEA (4-4) was 520 mW/cm$^2$.

TABLE 1

Production conditions and compositional proportions of catalysts

| | Nitrogen-containing organic compound | Thermal treatment temperature | Gas atmosphere | Compositional formula |
|---|---|---|---|---|
| Example 1-1 | glycine | 900° C. | 4% $H_2$ + $N_2$ | $Ti_{1.00}C_{1.17}N_{0.34}O_{0.98}$ |
| Example 1-2 | glycine | 900° C. | 4% $H_2$ + $N_2$ | $Ti_{0.95}Fe_{0.05}C_{1.51}N_{0.15}O_{1.55}$ |
| Example 1-3 | glycine | 900° C. | Ar | $Ti_{0.93}Fe_{0.07}C_{1.94}N_{0.05}O_{1.22}$ |
| Example 1-4 | glycine | 800° C. | Ar | $Ti_{0.95}Fe_{0.05}C_{1.36}N_{0.11}O_{1.24}$ |
| Example 1-5 | glycine | 500° C. | 4% $H_2$ + $N_2$ | $Ti_{1.00}C_{2.34}N_{0.43}O_{1.36}$ |

TABLE 1-continued

Production conditions and compositional proportions of catalysts

| | Nitrogen-containing organic compound | Thermal treatment temperature | Gas atmosphere | Compositional formula |
|---|---|---|---|---|
| Example 1-6 | polyvinylpyrrolidone | 900° C. | $N_2$ | $Ti_{0.95}Fe_{0.05}C_{1.05}N_{0.18}O_{1.83}$ |
| Example 1-7 | polyvinylpyrrolidone | 600° C. | $N_2$ | $Ti_{0.95}Fe_{0.05}C_{1.4}N_{0.14}O_{1.97}$ |
| Example 1-8 | glycine | 900° C. | 4% $H_2$ + $N_2$ | $Ti_{0.93}Fe_{0.07}C_{2.31}N_{0.14}O_{1.24}$ |

TABLE 2

Evaluation results of oxygen reduction catalytic activity

| | Oxygen reduction onset potential (V vs RHE) | Oxygen current reduction (mA/cm$^2$) @ 0.7 V | Oxygen reduction potential E @ 0.05 mA/cm$^2$ (V vs RHE) |
|---|---|---|---|
| Example 2-1 | 1.01 | 1.28 | 0.85 |
| Example 2-2 | 1.01 | 1.90 | 0.86 |
| Example 2-3 | 1.04 | 0.68 | 0.81 |
| Example 2-4 | 0.82 | 0.40 | 0.79 |
| Example 2-5 | 0.95 | 1.50 | 0.84 |

Oxygen reduction potential E@0.05 mA/cm$^2$: potential at which the reduction current starts to differ by 0.05 mA/cm$^2$ or more between the reduction current under the oxygen atmosphere and that under the nitrogen atmosphere

TABLE 3

| | First transition metal element (M1)-containing compound: weight/g | Acac weight/g | Nitrogen-containing organic compound: weight/g | Second transition metal element (M2)-containing compound: weight/g | BET specific surface area m$^2$/g | Molar proportions of atoms constituting electrode catalyst | | | | Oxygen reduction potential E @0.05 mA/cm$^2$/ V vs RHE |
|---|---|---|---|---|---|---|---|---|---|---|---|
| | | | | | | M1 | M2 | C | N | O | |
| Example | | | | | | | | | | | |
| 3-1 | Ti—iP: 9.37 | 5.12 | glycine: 10.0 | iron(II) acetate: 0.582 | 230 | 0.91 | 0.09 | 2.3 | 0.08 | 1.42 | 0.86 |
| 3-2 | Ti—iP: 9.37 | 5.12 | D,L-alanine: 11.92 | iron(II) acetate: 0.582 | 230 | 0.90 | 0.1 | 2.78 | 0.03 | 1.43 | 0.83 |
| 3-3 | Ti—iP: 9.37 | 5.12 | glycylglycine: 17.68 | iron(II) acetate: 0.582 | 272 | 0.91 | 0.09 | 2.31 | 0.07 | 1.4 | 0.87 |
| 3-4 | Ti—iP: 9.37 | 5.12 | D,L-norvaline: 15.67 | iron(II) acetate: 0.582 | 154 | 0.90 | 0.1 | 2.81 | 0.02 | 1.4 | 0.81 |
| 3-5 | Ti—iP: 9.37 | 5.12 | glycine: 10.4 | ferrous chloride tetrahydrate: 0.66522 | 256 | 0.92 | 0.08 | 2.4 | 0.09 | 1.5 | 0.87 |
| 3-6 | Ti—iP: 9.37 | 5.12 | glycine: 10.4 | ferric chloride hexahydrate: 0.90414 | 246 | 0.91 | 0.09 | 2.5 | 0.08 | 1.6 | 0.86 |
| 3-7 | Ti—iP: 9.37 | 5.12 | glycine: 10.4 | iron(III) acetylacetonato: 1.18187 | 284 | 0.92 | 0.08 | 2.7 | 0.07 | 1.6 | 0.86 |
| 3-8 | Ti—iP: 9.37 | 5.12 | glycine: 10.4 | ammonium hexacyanoferrate (II): 0.95067 | 223 | 0.91 | 0.09 | 2.2 | 0.08 | 1.4 | 0.87 |
| 3-9 | Ti—iP: 9.37 | 5.12 | ethylene diamine: 8.04 | iron(II) acetate: 0.582 | 283 | 0.90 | 0.1 | 2.7 | 0.03 | 1.0 | 0.85 |
| 3-11 | Ti—iP: 9.37 | 5.12 | glycine: 10.4 | (None) | 283 | 1 | 0 | 2.35 | 0.05 | 1.4 | 0.65 |
| 3-12 | Ti—iP: 9.37 | 5.12 | glycine: 10.4 | iron(II) acetate: 0.582 | 258 | 0.91 | 0.09 | 2.7 | 0.07 | 1.3 | 0.84 |
| 3-13 | Ti—iP: 9.37 | 0 | glycine: 10.4 | iron(II) acetate: 0.582 | 251 | 0.91 | 0.09 | 2.41 | 0.09 | 1.4 | 0.85 |
| 3-14 | Ti—iP: 9.37 | 5.12 | glycine: 10.4 | iron(II) acetate: 0.291 | 247 | 0.96 | 0.04 | 2.60 | 0.09 | 1.5 | 0.86 |

TABLE 3-continued

| | First transition metal element (M1)-containing compound: weight/g | Acac weight/g | Nitrogen-containing organic compound: weight/g | Second transition metal element (M2)-containing compound: weight/g | BET specific surface area m²/g | Molar proportions of atoms constituting electrode catalyst | | | | | Oxygen reduction potential E @0.05 mA/cm²/ V vs RHE |
|---|---|---|---|---|---|---|---|---|---|---|---|
| | | | | | | M1 | M2 | C | N | O | |
| 3-15 | Ti—iP: 9.37 | 5.12 | glycine: 10.4 | iron(II) acetate: 1.164 | 191 | 0.81 | 0.19 | 3.00 | 0.09 | 1.9 | 0.86 |
| 3-16 | Ti—iP: 9.37 | 5.12 | glycine: 10.4 | iron(II) acetate: 2.328 | 141 | 0.62 | 0.38 | 2.70 | 0.06 | 1.9 | 0.83 |
| 3-17 | TiAcac complex: 14.65 | 5.12 | glycine: 10.4 | (None) | 299 | 1 | 0 | 2.14 | 0.03 | 1.4 | 0.69 |
| 3-18 | Ti—iP: 9.37 | 5.1 | glycine: 10.4 | chromium(III) acetate: 0.7648 | 263 | 0.90 | 0.1 | 2.07 | 0.06 | 1.8 | 0.80 |
| 3-19 | Ti—iP: 9.37 | 5.1 | ethylenediamine• dihydrochloride: 8.89 | chromium(III) acetate: 0.7648 | 106 | 0.93 | 0.07 | 0.49 | 0.02 | 0.7 | 0.83 |
| 3-20 | Ti—iP: 9.37 | 5.1 | ethylenediamine• dihydrochloride: 8.89 | iron(II) acetate: 0.582 | 44 | 0.93 | 0.07 | 0.22 | 0.01 | 1.5 | 0.79 |
| 3-21 | Ti—iP: 9.37 | 5.1 | ethylenediamine• dihydrochloride: 17.8 | chromium(III) acetate: 0.7648 | 122 | 0.92 | 0.08 | 0.81 | 0.02 | 0.79 | 0.83 |
| 3-22 | Ti—iP: 9.37 | 5.1 | ethylenediamine• dihydrochloride: 8.89 | chromium(III) acetate: 0.3824 | 70 | 0.96 | 0.04 | 0.37 | 0.02 | 0.75 | 0.77 |
| 3-23 | Ti—iP: 4.69 | 2.6 | pyrazine carboxylic acid: 8.74 | (None) | 224 | 1 | 0 | 1.9 | 0.13 | 1.3 | 0.67 |
| 3-24 | Ti—iP: 4.69 | 2.6 | 2-pyridine carboxylic acid: 8.66 | iron(II) acetate: 0.291 | 215 | 0.91 | 0.09 | 1.8 | 0.08 | 1.3 | 0.87 |
| 3-25 | Ti—iP: 4.69 | 2.6 | pyrazine carboxylic acid: 8.74 | iron(II) acetate: 0.291 | 196 | 0.90 | 0.1 | 1.8 | 0.17 | 1.2 | 0.86 |
| 3-26 | Ti—iP: 4.69 | 2.6 | polyethylene imine: 3.38 | iron(II) acetate: 0.291 | 259 | 0.90 | 0.1 | 1.25 | 0.1 | 1.5 | 0.85 |
| 3-27 | Ti—iP: 9.37 | 5.12 | glycine 10.0 | iron(II) acetate: 0.582 | 210 | 0.91 | 0.09 | 2.80 | 0.06 | 1.8 | 0.84 |
| 3-28 | Ti—iP: 4.69 | 2.6 | pyrazine carboxylic acid: 8.74 | iron(II) acetate: 0.291 | 225 | 0.90 | 0.1 | 1.6 | 0.18 | 1.2 | 0.84 |
| 3-29 | Ti—iP: 4.69 | 2.6 | 4-pyridine carboxylic acid: 8.66 | iron(II) acetate: 0.291 | 214 | 0.91 | 0.09 | 1.7 | 0.06 | 1.5 | 0.84 |
| 3-30 | Ti—iP: 4.69 | 2.6 | bipyridine: 10.99 | iron(II) acetate: 0.291 | 195 | 0.90 | 0.1 | 2.4 | 0.19 | 1.6 | 0.82 |
| 3-31 | Ti—iP: 4.69 | 2.6 | bipyridine: 10.99 | iron(II) acetate: 0.291 | 195 | 0.91 | 0.09 | 2.7 | 0.21 | 1.4 | 0.84 |
| 3-32 | Zr—B: 6.55 | 2.6 | pyrazine carboxylic acid: 8.74 | (None) | 33 | 1 | 0 | 4.4 | 0.15 | 1.4 | 0.55 |
| 3-33 | Zr—B: 6.55 | 2.6 | pyrazine carboxylic acid: 8.74 | iron(II) acetate: 0.291 | 163 | 0.91 | 0.09 | 4.7 | 0.09 | 1.7 | 0.83 |
| 3-34 | Zr—B: 6.55 | 3 | glycine: 5.02 | iron(II) acetate: 0.291 | 214 | 0.90 | 0.1 | 4.3 | 0.1 | 1.8 | 0.83 |
| 3-36 | Ta-E: 4.69 | 2.6 | pyrazine carboxylic acid: 6.11 | iron(II) acetate: 0.203 | 12.5 | 0.91 | 0.09 | 2.4 | 0.31 | 1.9 | 0.81 |
| 3-37 | Nb-E: 10.00 | 5.58 | glycine: 9.23 | iron(II) acetate: 0.534 | 195 | 0.90 | 0.1 | 2.70 | 0.43 | 2.0 | 0.84 |

TABLE 3-continued

| | First transition metal element (M1)- containing compound: weight/g | Acac weight/g | Nitrogen- containing organic compound: weight/g | Second transition metal element (M2)- containing compound: weight/g | BET specific surface area m²/g | Molar proportions of atoms constituting electrode catalyst | | | | | Oxygen reduction potential E @0.05 mA/cm²/ V vs RHE |
|---|---|---|---|---|---|---|---|---|---|---|---|
| | | | | | | M1 | M2 | C | N | O | |
| 3-38 | Nb-E: 4.80 | 2.6 | pyrazine carboxylic acid: 8.74 | iron(II) acetate: 0.291 | 174 | 0.91 | 0.09 | 2.3 | 0.34 | 1.9 | 0.83 |
| 3-39 | Ti—iP: 9.37 | 5.12 | glycine: 10.0 | iron(II) acetate: 0.582 | 230 | 0.91 | 0.09 | 2 | 0.06 | 1.60 | 0.82 |
| 3-40 | TiCl4: 7.76 | 0 | pyrazine carboxylic acid: 20.30 | (None) | 236 | 1 | 0 | 1.9 | 0.08 | 1.1 | 0.80 |
| 3-41 | V—iP: 4.30 | 2.6 | pyrazine carboxylic acid: 8.74 | iron(II) acetate: 0.290 | 50.6 | 0.91 | 0.09 | 6.04 | 0.81 | 1.55 | 0.86 |
| 3-42 | VAcac complex: 6.13 | 0 | pyrazine carboxylic acid: 8.74 | iron(II) acetate: 0.290 | 170.1 | 0.92 | 0.08 | 5.61 | 0.81 | 1.7 | 0.85 |
| 3-43 | Ti—iP: 9.37 | 5.12 | glycine 10.00 | iron(II) acetate: 0.582 | 212 | 0.91 | 0.09 | 4.28 | 0.06 | 2.37 | 0.87 |
| Comp. Example | | | | | | | | | | | |
| 3-1 | Ti—iP: 9.37 | 5.12 | ethylene glycol: 8.30 | iron(II) acetate: 0.582 | 77 | 0.96 | 0.04 | 0.96 | 0.01 | 1.04 | 0.50 |
| 3-2 | Ti—iP: 9.37 | 5.12 | oxalic acid: 12.05 | iron(II) acetate: 0.582 | 3.6 | 0.96 | 0.04 | 0.94 | 0.02 | 0.99 | 0.50 |
| 3-3 | Ti—iP: 9.37 | 5.12 | glycolic acid: 10.18 | iron(II) acetate: 0.582 | 229 | 0.95 | 0.05 | 0.96 | 0.01 | 1.02 | 0.53 |
| 3-4 | TiOx | | | | 9.4 | 1 | 0 | 0 | 0 | 1.8 | 0.27 |
| 3-5 | TiCN | | | | 1.8 | 1 | 0 | 0.52 | 0.48 | 0.01 | 0.39 |

TABLE 4

| Comp. Example | First transition metal element (M1)- containing compound: weight/g | Acac weight/g | Nitrogen- containing organic compound: weight/g | Second transition metal element (M2)- containing compound: weight/g | BET specific surface area m²/g | Molar proportions of atoms constituting electrode catalyst | | | | | Oxygen reduction potential E @0.05 mA/cm²/ V vs RHE |
|---|---|---|---|---|---|---|---|---|---|---|---|
| | | | | | | M1 | M2 | C | N | O | |
| 3-6 | Ti—iP: 9.37 | 5.12 | glycine: 10.0 | iron(II) acetate: 0.582 | 15.4 | 0.92 | 0.08 | 4.54 | 2.26 | 5.39 | 0.41 |
| 3-7 | Ti—iP: 9.37 | 5.12 | glycine: 10.0 | iron(II) acetate: 0.582 | 22 | 0.92 | 0.08 | 5.31 | 2.53 | 4.19 | 0.51 |
| 3-8 | Ti—iP: 9.37 | 5.12 | glycine: 10.0 | iron(II) acetate: 0.582 | 28 | 0.92 | 0.08 | 4.59 | 1.85 | 3.16 | 0.52 |
| 3-9 | Ti—iP: 9.37 | 5.12 | glycine: 10.0 | iron(II) acetate: 0.582 | 170 | | | | | | 0.64 |
| 3-10 | Ti—iP: 9.37 | 5.12 | glycine: 10.0 | iron(II) acetate: 0.582 | 88 | | | | | | 0.53 |
| 3-11 | Ti—iP: 9.37 | 5.12 | glycine: 10.0 | iron(II) acetate: 0.582 | 6 | | | | | | 0.48 |

Abbreviations in Tables 3 and 4 denote as follows.
Acac: acetylacetone
Ti-iP: titanium tetraisopropoxide
TiAcac complex: titanium tetraacetylacetonato
Zr—B: zirconium tetrabutoxide
Ta-E: tantalum pentaethoxide Nb-E: niobium pentaethoxide
V-iP: vanadium oxytriisopropoxide (VO(O-iPr)$_3$)
VAcac complex: vanadium acetylacetonato (V(acac)$_3$)

The invention claimed is:

1. A process for producing a fuel cell electrode catalyst comprising:
   a step (1) of mixing at least a transition metal-containing compound, a nitrogen-containing organic compound and a solvent to provide a catalyst precursor solution,
   a step (2) of removing the solvent from the catalyst precursor solution, and
   a step (3) of thermally treating a solid residue obtained in the step (2) at a temperature of 500 to 1100° C. to provide an electrode catalyst,
   wherein the transition metal-containing compound is partly or wholly a compound comprising at least one transition metal element (M1) selected from the group 4 and 5 elements of the periodic table as a transition metal element, and
   wherein the nitrogen-containing organic compound is at least one selected from glycine, glycylglycine, pyrazine carboxylic acid and 2-pyridine carboxylic acid.

2. The process for producing a fuel cell electrode catalyst according to claim 1, wherein the transition metal element (M1) is at least one element selected from titanium, zirconium, niobium and tantalum.

3. The process for producing a fuel cell electrode catalyst according to claim 1, wherein in the step (1), a solution of the transition metal-containing compound is mixed with the nitrogen-containing organic compound.

4. The process for producing a fuel cell electrode catalyst according to claim 1, wherein the nitrogen-containing organic compound is a compound capable of forming a chelate together with a transition metal in the transition metal-containing compound.

5. The process for producing a fuel cell electrode catalyst according to claim 1, wherein in the step (1), a precipitation suppressant comprising a compound having a diketone structure is further mixed.

6. The process for producing a fuel cell electrode catalyst according to claim 5, wherein in the step (1), a solution of the transition metal-containing compound is mixed with the precipitation suppressant, and then the resultant solution is mixed with the nitrogen-containing organic compound.

7. The process for producing a fuel cell electrode catalyst according to claim 1, wherein the transition metal-containing compound is partly a compound comprising at least one transition metal element (M2) selected from iron, nickel, chromium, cobalt, vanadium and manganese as a transition metal element.

8. The process for producing a fuel cell electrode catalyst according to claim 1, wherein the transition metal-containing compound is at least one compound selected from the group consisting of a metal nitrate, a metal organic acid salt, a metal oxychloride, a metal alkoxide, a metal halide, a metal perchlorate and a metal hypochlorite.

9. The process for producing a fuel cell electrode catalyst according to claim 1, wherein in the step (3), the solid residue is thermally treated in an atmosphere containing 0.01% by volume to 10% by volume of a hydrogen gas.

10. The process for producing a fuel cell electrode catalyst according to claim 1, wherein the step (3) is a step in which the solid residue obtained in the step (2) is thermally treated at a temperature of 500 to 1100° C. and the resultant thermally-treated product is disintegrated to provide an electrode catalyst.

* * * * *